US012523662B2

(12) United States Patent
Hahn et al.

(10) Patent No.: US 12,523,662 B2
(45) Date of Patent: Jan. 13, 2026

(54) ANTIBODIES THAT SPECIFICALLY BIND PEPTIDES ASSOCIATED WITH THE PRIMARY IMMUNODEFICIENCIES: WISKOTT-ALDRICH SYNDROME AND X-LINKED AGAMMAGLOBULINEMIA

(71) Applicant: Seattle Children's Hospital, Seattle, WA (US)

(72) Inventors: Sihoun Hahn, Clyde Hill, WA (US); Christopher Collins, Seattle, WA (US); Fan Yi, Shoreline, WA (US); Remwilyn Dayuha, Lynnwood, WA (US)

(73) Assignee: Seattle Children's Hospital, Seattle, WA (US)

( * ) Notice: Subject to any disclaimer, the term of this patent is extended or adjusted under 35 U.S.C. 154(b) by 756 days.

(21) Appl. No.: 17/995,261

(22) PCT Filed: Apr. 2, 2021

(86) PCT No.: PCT/US2021/025627
§ 371 (c)(1),
(2) Date: Sep. 30, 2022

(87) PCT Pub. No.: WO2021/203031
PCT Pub. Date: Oct. 7, 2021

(65) Prior Publication Data
US 2023/0194545 A1   Jun. 22, 2023

Related U.S. Application Data

(60) Provisional application No. 63/004,415, filed on Apr. 2, 2020.

(51) Int. Cl.
*G01N 33/68* (2006.01)

(52) U.S. Cl.
CPC ..... *G01N 33/6854* (2013.01); *G01N 33/6848* (2013.01); *G01N 2333/4703* (2013.01); *G01N 2800/222* (2013.01); *G01N 2800/24* (2013.01)

(58) Field of Classification Search
None
See application file for complete search history.

(56) References Cited

U.S. PATENT DOCUMENTS

| | | | |
|---|---|---|---|
| 4,816,567 A | 3/1989 | Cabilly | |
| 5,208,020 A | 5/1993 | Chari | |
| 5,571,894 A | 11/1996 | Wels | |
| 5,587,458 A | 12/1996 | King | |
| 5,821,337 A | 10/1998 | Carte | |
| 5,869,046 A | 2/1999 | Presta | |
| 6,982,321 B2 | 1/2006 | Winter | |
| 7,087,409 B2 | 8/2006 | Barbas, III et al. | |
| 7,521,541 B2 | 4/2009 | Eigenbrot | |
| 7,527,791 B2 | 5/2009 | Adams | |
| 7,632,686 B2 | 12/2009 | Anderson | |
| 8,383,417 B2 | 2/2013 | Lopez et al. | |
| 9,588,126 B2 | 3/2017 | Anderson | |
| 10,590,190 B2 | 3/2020 | Rosenthal et al. | |
| 10,706,955 B2 * | 7/2020 | Bremel | G16B 20/00 |
| 2007/0099251 A1 | 5/2007 | Zhang et al. | |
| 2007/0243191 A1 | 10/2007 | Mao et al. | |
| 2007/0265432 A1 | 11/2007 | Meikle et al. | |
| 2010/0003239 A1 | 1/2010 | Scales | |
| 2010/0009463 A1 | 1/2010 | Hornbeck et al. | |
| 2011/0217790 A1 | 9/2011 | Pass et al. | |
| 2012/0156710 A1 | 6/2012 | Nakayama et al. | |
| 2012/0184050 A1 | 7/2012 | Meikle et al. | |
| 2012/0225060 A1 | 9/2012 | Lee et al. | |
| 2013/0137595 A1 | 5/2013 | Zangar et al. | |
| 2013/0302399 A1 | 11/2013 | Feldhaus et al. | |
| 2014/0106981 A1 | 4/2014 | Hood et al. | |
| 2014/0273275 A1 | 9/2014 | Jacobs et al. | |
| 2015/0322423 A1 | 11/2015 | Kosugi et al. | |
| 2016/0083458 A1 | 3/2016 | Katsuragi et al. | |
| 2016/0319005 A1 | 11/2016 | Lopez-Girona et al. | |
| 2018/0086846 A1 | 3/2018 | Wiltzius et al. | |
| 2018/0164301 A1 | 6/2018 | Anderson | |
| 2019/0031754 A1 | 1/2019 | Rader et al. | |

(Continued)

FOREIGN PATENT DOCUMENTS

| | | | |
|---|---|---|---|
| EP | 0404097 A3 | 10/1991 | |
| EP | 0239400 B1 | 8/1994 | |

(Continued)

OTHER PUBLICATIONS

"Buccal Swab Collection Procedure," retrieved on Apr. 22, 2021 at <<https://www.chla.org/sites/default/files/atoms/files/CHLA-Clinical-Pathology-Buccal-Swab-Collection-Procedure.pdf>>, 1 page.
Abbatiello, et al., "Large-Scale Interlaboratory Study to Develop, Analytically Validate and Apply Highly Multiplexed, Quantitative Peptide Assays to Measure Cancer-Relevant Proteins in Plasma," Mol. Cell Proteomics, vol. 14, No. 9, 2015, pp. 2357-2374.
Almagro and Fransson, "Humanization of antibodies," Front. Biosci., vol. 13, 2008, pp. 1619-1633.
Almannai, et al., "Newborn screening: a review of history, recent advancements, and future perspectives in the era of next generation sequencing," Current Opinion in Pediatrics, vol. 28, No. 6, 2016, pp. 694-699.
America & Cordewener, "Comparative LC-MS: A landscape of peaks and valleys," Bioinformatics, vol. 8, No. 4, 2008, pp. 731-749.

(Continued)

*Primary Examiner* — Gregory S Emch
*Assistant Examiner* — Fernando Ivich
(74) *Attorney, Agent, or Firm* — Lee & Hayes, P.C.

(57) ABSTRACT

The current disclosure provides antibodies that bind to peptides associated with the primary immunodeficiency disorders (PIDD) Wiskott-Aldrich Syndrome (WAS) and X-linked agammaglobulinemia (XLA). The antibodies can be used in peptide immunoaffinity enrichment coupled to selected reaction monitoring mass spectrometry (immuno-SRM) assays for clinical diagnosis and newborn screening of WAS and XLA, among other uses.

20 Claims, 27 Drawing Sheets
Specification includes a Sequence Listing.

(56) References Cited

U.S. PATENT DOCUMENTS

| | | |
|---|---|---|
| 2019/0134164 A1 | 5/2019 | DeRosa et al. |
| 2021/0285965 A1 | 9/2021 | Hahn et al. |
| 2021/0302435 A1 | 9/2021 | Hahn et al. |
| 2021/0341492 A1 | 11/2021 | Hahn et al. |
| 2024/0248096 A1 | 7/2024 | Hahn et al. |

FOREIGN PATENT DOCUMENTS

| | | | |
|---|---|---|---|
| JP | WO2014037977 A1 | 3/2014 | |
| JP | 2017526923 A | 9/2017 | |
| WO | WO1993001161 A1 | 1/1993 | |
| WO | WO1993016185 A2 | 8/1993 | |
| WO | WO1994011026 A3 | 8/1994 | |
| WO | WO-2008144753 A2 * | 11/2008 | ......... A61K 49/0002 |
| WO | 2009033743 A1 | 3/2009 | |
| WO | WO2011015602 A2 | 2/2011 | |
| WO | WO2013148284 A1 | 3/2013 | |
| WO | WO2016110584 A1 | 7/2016 | |
| WO | WO2017062672 A2 | 4/2017 | |
| WO | WO2017106292 A2 | 6/2017 | |
| WO | WO2018097951 A | 5/2018 | |
| WO | WO2019030377 A1 | 2/2019 | |
| WO | WO2019126647 A1 | 6/2019 | |
| WO | WO2019149816 A1 | 8/2019 | |
| WO | WO2019173291 A1 | 9/2019 | |
| WO | 2019198812 A1 | 10/2019 | |
| WO | WO2020/072996 A1 | 4/2020 | |
| WO | WO2021178545 A1 | 9/2021 | |

OTHER PUBLICATIONS

Anderson & Hunter, "Quantitative Mass Spectrometric Multiple Reaction Monitoring Assays for Major Plasma Proteins," Molecular & Cellular Proteomics, vol. 5, No. 4, 2006, pp. 573-588.

Anderson, et al., "Mass spectrometric quantitation of peptides and proteins using Stable Isotope Standards and Capture by Anti-Peptide Antibodies (SISCAPA)," Journal of Proteome Research, vol. 3, No. 2, 2004, pp. 235-244.

Anderson, et al., "SISCAPA peptide enrichment on magnetic beads using an in-line bead trap device," Molecular & Cellular Proteomics, vol. 8, No. 5, 2009, pp. 995-1005.

Aydin, et al., "DOCK8 deficiency: clinical and immunological phenotype and treatment options—a review of 136 patients," Journal of Clinical Immunology, vol. 35, No. 2, 2015, 10 pages.

Baca, et al., "Antibody humanization using monovalent phage display," J. Biol Chem., vol. 272, No. 16, 1997, pp. 10768-10684.

Baker, et al., "Development of a routine newborn screening protocol for severe combined immunodeficiency," The Journal of Allergy and Clinical Immunology, vol. 124, No. 3, 2009, pp. 522-527.

Baron, et al., "Epigenetic immune cell counting in human blood samples for immunodiagnostics," Science Translational Medicine, vol. 10, No. 452, 2018, 12 pages.

BD Biosciences, "BD Vacutainer(CR) CPT(TM) Mononuclear Cell Preparation Tube—Sodium Citrate," retrieved on May 6, 2021 at <<https://www.bdbiosciences.com/us/applications/blood-collection/cell-biomarker-preservation/bd-vacutainerreg-cpttrade-mononuclear-cell-preparation-tube---sodium-citrate/p/362760>>, BD Vacutainer, 2021, 4 pages.

Beeton and Chandy, "Enrichment of NK cells from human blood with the RosetteSep kit from StemCell technologies," J. Vis. Exp., vol. 8, No. 326, 2007, 1 page.

Beynon, et al., "Multiplexed absolute quantification in proteomics using artificial QCAT proteins of concatenated signature peptides," Nature Methods, vol. 2, No. 8, 2005, pp. 587-589.

Bird, et al., "Single-chain antigen-binding proteins," Science, vol. 242, No. 4877, 1988, pp. 423-426.

Bonilla, et al., "Practice parameter for the diagnosis and management of primary immunodeficiency," The Journal of Allergy and Clinical Immunology, vol. 136, No. 5, 2015, pp. 1186-1205.E78.

Booth & Gaspar, "Pegademase bovine (PEG-ADA) for the treatment of infants and children with severe combined immunodeficiency (SCID)," Biologics, vol. 3, 2009, pp. 349-358.

Bousso, et al., "Enrichment of antigen-specific T lymphocytes by panning on immobilized MHC-peptide complexes," Immunol. Lett., vol. 59, No. 2, 1997, pp. 85-91.

Boyum A., "Isolation of mononuclear cells and granulocytes from human blood. Isolation of mononuclear cells by one centrifugation, and of granulocytes by combining centrifugation and sedimentation at 1 g," Scand. J. Clin. Lab. Invest. Suppl., vol. 97, 1968, pp. 77-89.

Boyum A., "Separation of lymphocytes, lymphocyte subgroups and monocytes: a review," Lymphology, vol. 10, No. 2, 1977, pp. 71-76.

Brocks, et al., "Isolation of human myeloid dendritic cells from tumor tissue and peripheral blood," In. Vivo., vol. 20, No. 2, 2006, pp. 239-242.

Brun, et al., "Isotope-labeled Protein Standards: Toward Absolute Quantitative Proteomics," Molecular & Cellular Proteomics, vol. 6, No. 12, 2007, pp. 2139-2149.

Carroll, et al., "Absolute quantification of the glycolytic pathway in yeast: deployment of a complete QconCAT approach," Molecular & Cellular Proteomics, vol. 10, No. 12, 2011, 15 pages.

Carter, et al., "Humanization of an anti-p185HER2 antibody for human cancer therapy," PNAS USA, vol. 89, No. 10, 1992, pp. 4285-4289.

Chace & Kalas, "A biochemical perspective on the use of tandem mass spectrometry for newborn screening and clinical testing," Clinical Biochemistry, vol. 38, No. 4, 2005, pp. 296-309.

Chan & Puck, "Development of population-based newborn screening for severe combined immunodeficiency," The Journal of Allergy and Clinical Immunology, vol. 115, No. 2, 2005, pp. 391-398.

Chari, et al., "Immunoconjugates containing novel maytansinoids: promising anticancer drugs," Cancer. Res., vol. 52, No. 1, 1992, pp. 127-131.

Chase, et al., "Mass spectrometry in newborn and metabolic screening: historical perspective and future directions," Journal of Mass Spectrometry, vol. 44, No. 2, 2009, pp. 163-170.

Chase, et al., "Newborn screening for T-cell deficiency," Current Opinion in Allergy and Clinical Immunology, vol. 10, No. 6, 2010, pp. 521-525.

Chase, et al., "Rapid diagnosis of phenylketonuria by quantitative analysis for phenylalanine and tyrosine in neonatal blood spots by tandem mass spectrometry," Clinical Chemistry, vol. 39, No. 1, 1993, pp. 66-71.

Chen, et al., "Fusion protein linkers: property, design and functionality," Adv. Drug. Deliv. Rev., vol. 65, No. 10, 2013, pp. 1357-1369.

Collins, et al., "Multiplexed Proteomic Analysis for Diagnosis and Screening of Five Primary Immunodeficiency Disorders From Dried Blood Spots," Frontiers in Immunology, vol. 11, No. 464, 2020, 16 pages.

Collins, et al., "Rapid Multiplexed Proteomic Screening for Primary Immunodeficiency Disorders From Dried Blood Spots," Frontiers in Immunology, vol. 9, 2018, 17 pages.

Corkum, et al., "Immune cell subsets and their gene expression profiles from human PBMC isolated by Vacutainer Cell Preparation Tube (CP[TM]) and standard density gradient," BMC Immunology, vol. 16, No. 48, 2015, 18 pages.

Cutillas, "Principles of Nanoflow Liquid Chromatography and Applications to Proteomics," Current Nanoscience, vol. 1, No. 1, 2005, pp. 65-71.

Dagur and McCoy, "Collection, Storage, and Preparation of Human Blood Cells," Curr. Protoc. Cytom., vol. 73, No. 5.1, 20 pages.

Dall'Acqua, et al., "Antibody humanization by framework shuffling," Methods, vol. 36, No. 1, 2005, pp. 43-60.

De Mello et al. Feasibility of using cryopreserved lymphoblastoid cells to diagnose some 12, 16 lysosomal storage diseases,n Cell Proliferation, Feb. 26, 2010 (Feb. 26, 2010). vol. 43, No. 2, pp. 164-169. entire document.

De Saint Basile et al., "Severe combined immunodeficiency caused by deficiency in either the delta or the epsilon subunit of CD3," Journal of Clinical Investigation, vol. 114, No. 10, 2004, pp. 1512-1517.

(56) References Cited

OTHER PUBLICATIONS

Ding, et al., "Quantitative analysis of cohesin complex stoichiometry and SMC3 modification-dependent protein interactions," Journal of Proteome Research, vol. 10, No. 8, 2011, pp. 3652-3659.
Dott, et al., "Metabolic disorders detectable by tandem mass spectrometry and unexpected early childhood mortality: a population-based study," American Journal of Medical Genetics Part A, vol. 140, No. 8, 2006, pp. 837-842.
Engelhardt, et al., "Large deletions and point mutations involving the dedicator of cytokinesis 8 (DOCK8) in the autosomal-recessive form of hyper-IgE syndrome," The Journal of Allergy and Clinical Immunology, vol. 124, No. 6, 2009, pp. 1289-1302.e4.
Partial European Search Report mailed Jun. 24, 2022 for European Patent Application No. 19869877.1, a foreign counterpart to U.S. Appl. No. 17/282,989, 28 pages.
Extended European Search Report mailed Sep. 27, 2022 for European Patent Applicaton No. 19869877.1, 25 pages.
Espinosa-de Aquino, et al., "Protein and RNA extraction from mucosal swabs: a minimally invasive source of ecological data for studies of natural populations," Methods in Ecology and Evolution, vol. 8, No. 3, 2017, pp. 370-378.
Faguet and Agee, "A simple technique for the rapid enrichment of class and subclass hybridoma switch variants. A 1000-fold enrichment in half the time, for half the cost," J. Immunol Methods, vol. 165, vol. 2, 1993, pp. 217-224.
Fargo, et al., "Erythrocyte adenosine deaminase: diagnostic value for Diamond-Blackfan anaemia," British Journal of Haematology, vol. 160, No. 4, 2013, pp. 547-554.
Ferrua, et al., "Lentiviral haemopoietic stem/progenitor cell gene therapy for treatment of Wiskott-Aldrich syndrome: interim results of a non-randomised, open-label, phase 1/2 clinical study," Lancet Haematology, vol. 6, No. 5, 2019, pp. E239-E253.
Flatman, et al., "Process analytics for purification of monoclonal antibodies," J Chromatogr. B. Analyt. Technol. Biomed Life Sci., vol. 848, No. 1, 2007, pp. 79-87.
Flinn & Gennery, "Adenosine deaminase deficiency: a review," Orphanet Journal of Rare Diseases, vol. 13, No. 1, 2018, 7 pages.
Futani, et al., "Bruton's tyrosine kinase is present in normal platelets and its absence identifies patients with X-linked agammaglobulinaemia and carrier females," Br. J. Haematol., vol. 114, No. 1, 2001, pp. 141-149.
Gaspar, et al., "How I treat ADA deficiency," Blood, vol. 114, No. 17, 2009, pp. 3524-3532.
Gerber, et al., "Absolute quantification of proteins and phosphoproteins from cell lysates by tandem MS," PNAS USA, vol. 100, No. 12, 2003, pp. 6940-6945.
Grievink, et al., "Comparison of Three Isolation Techniques for Human Peripheral Blood Mononuclear Cells: Cell Recovery and Viability, Population Composition, and Cell Functionality," Biopreservation and Biobanking, vol. 14, No. 5, 2016, pp. 410-415.
Grunebaum, et al., "Bone marrow transplantation for severe combined immune deficiency," JAMA, vol. 295, No. 5, 2006, pp. 508-518.
Holliger, et al., ""Diabodies": small bivalent and bispecific antibody fragments," PNAS USA, vol. 90, No. 14, 1993, pp. 6444-6448.
Holzmann, et al., "Stoichiometry determination of the MP1-p14 complex using a novel and cost-efficient method to produce an equimolar mixture of standard peptides," Analytical Chemistry, vol. 81, No. 24, 2009, pp. 10254-10261.
Hoofnagle, et al., "Quantification of thyroglobulin, a low-abundance serum protein, by immunoaffinity peptide enrichment and tandem mass spectrometry," Clinical Chemistry, vol. 54, No. 11, 2011, 2008, pp. 1796-1804.
Hoofnagle, et al., "Recommendations for the Generation, Quantification, Storage, and Handling of Peptides Used for Mass Spectrometry-Based Assays" Clinical Chemistry, vol. 62, No. 1, 2016, pp. 48-69.
Hudson and Souriau, "Engineered antibodies," Nat. Med., vol. 9, No. 1, 2003, pp. 129-134.
Huston, et al., "Protein engineering of antibody binding sites: recovery of specific activity in an anti-digoxin single-chain Fv analogue produced in *Escherichia coli*," PNAS USA, vol. 85, No. 16, 1988, pp. 5879-5883.
Invitation to Pay Addition Fees Dated Dec. 26, 2019 in International Application No. PCT/US2019/054856, 8 pages.
Invitation to Pay Additional Fees Dated Jul. 13, 2021 in International Application No. PCT/US2021/025627, 3 Pages.
Jia, et al., "A Modified Ficoll-Paque Gradient Method for Isolating Mononuclear Cells from the Peripheral and Umbilical Cord Blood of Humans for Biobanks and Clinical Laboratories," Biopreservation and Biobanking, vol. 16, No. 2, 2018, pp. 82-91.
Jin, et al., "Mutations of the Wiskott-Aldrich Syndrome Protein (WASP): hotspots, effect on transcription, and translation and phenotype/genotype correlation," Blood, vol. 104, No. 13, 2004, pp. 4010-4019.
Jing, et al., "Somatic reversion in dedicator of cytokinesis 8 immunodeficiency modulates disease phenotype," The Journal of Allergy and Clinical Immunology, vol. 133, No. 6, 2014, pp. 1667-1675.
Johnson, et al., "Rigorous determination of the stoichiometry of protein phosphorylation using mass spectrometry," Journal of the American Society for Mass Spectrometry, vol. 20, No. 12, 2009, pp. 2211-2220.
Jung, et al., "Quanitification of ATP7B Protein in Dried Blood Spots by Peptide Immuno-SRM as a Potential Screen for Wilson's Disease," J. Proteome. Res., vol. 16, No. 2, 2017, pp. 862-871.
Jung, et al., "Quantification of ATP7B protein in Dried Blood Spots by Peptide Immuno-SRM as a potential screen for Wilson Disease," Journal of Proteome, vol. 16, No. 2, 2017, pp. 862-871.
Kanariou, et al., "Long-term observational studies of chronic granulomatous disease," Current Opinion in Hematology, vol. 25, No. 1, 2018, pp. 7-12.
Kashmiri, et al., "SDR grafting—a new approach to antibody humanization," Methods., vol. 36, No. 1, 2005, pp. 25-34.
Kaveri, et al., "Intravenous immunoglobulins in immunodeficiencies: more than mere replacement therapy," Clinical and Experimental Immunology, vol. 164, Suppl. 2, 2011, pp. 2-5.
Kennedy, et al., "Demonstrating the feasibility of large-scale development of standardized assays to quantify human proteins," Nature Methods, vol. 11, No. 2, 2014, pp. 149-155.
Kerfoot, et al., "Tryptic peptide screening for primary immunodeficiency disease by LC/MS-MS," Proteomics Clin. Appl, vol. 6, No. 7-8, 2012, pp. 394-402.
Khalid, et al., "Ethnicity of children with homozygous c.985A>G medium-chain acyl-CoA dehydrogenase deficiency: findings from screening approximately 1.1 million newborn infants," J. Med. Screen, vol. 15, No. 3, 2008, pp. 112-117.
Kirkpatrick, et al., "The absolute quantification strategy: a general procedure for the quantification of proteins and post-translational modifications," Methods, vol. 35, No. 3, 2005, pp. 265-273.
Kito, et al., "A synthetic protein approach toward accurate mass spectrometric quantification of component stoichiometry of multiprotein complexes," Journal of Proteome Research, vol. 6, No. 2, 2007, pp. 792-800.
Klimka, et al., "Human anti-CD30 recombinant antibodies by guided phage antibody selection using cell panning," Br. J. Cancer., vol. 83, No. 2, 2000, pp. 252-260.
Kobrynski, et al., "Prevalence and morbidity of primary immunodeficiency diseases, United States 2001-2007," Journal of Clinical Immunology, vol. 34, No. 8, 2014, pp. 954-961.
Kuhn, et al., "Developing Multiplexed Assays for Troponin I and Interleukin-33 in Plasma by Peptide Immunoaffinity Enrichment and Targeted Mass Spectrometry" Clinical Chemistry, vol. 55, No. 6, 2009, pp. 1108-1117.
Kwan, et al., "Newborn screening for severe combined immunodeficiency in 11 screening programs in the United States," JAMA, vol. 312, No. 7, 2014, pp. 729-738.
La Marca, et al., "Diagnosis of immunodeficiency caused by a purine nucleoside phosphorylase defect by using tandem mass spectrometry on dried blood spots," Journal of Allergy and Clinical Immunology, vol. 134, No. 1, 2014, pp. 155-159.e3.

(56) References Cited

OTHER PUBLICATIONS

La Marca, et al., "Tandem mass spectrometry, but not T-cell receptor excision circle analysis, identifies newborns with late-onset adenosine deaminase deficiency," Journal of Allergy and Clinical Immunology, vol. 131, No. 6, 2013, pp. 1604-1610.

La Marca, et al., "The inclusion of ADA-SCID in expanded newborn screening by tandem mass spectrometry," Journal of Pharmaceutical and Biomedical Analysis, vol. 88, 2014, pp. 201-206.

Lange, et al., "Selected reaction monitoring for quantitative proteomics: a tutorial," Molecular Systems Biology, vol. 4, No. 1, 2008, 14 pages.

Lundgren, et al., "Role of spectral counting in quantitative proteomics," Expert Review of Proteomics, vol. 7, No. 1, 2010, pp. 39-53.

MacCoss Lab Software, "SkyLine," retrieved on May 6, 2021 at <<https://skyline.ms/project/home/begin.view>>, MacCoss Lab Software, 2021, 1 page.

Mallick, et al., "Computational prediction of proteotypic peptides for quantitative proteomics," Nature Biotechnology, vol. 25, 2007, pp. 125-131.

McCusker, et al., "Primary immunodeficiency," Allergy, Asthma & Clinical Immunology, vol. 14, No. 2, 2018, 12 pages.

Michalczyk, et al., "Fresh and cultured buccal cells as a source of mRNA and protein for molecular analysis," Bio Techniques, vol. 37, No. 2, 2004, pp. 262-269.

Millington, et al., "Tandem mass spectrometry: a new method for acylcarnitine profiling with potential for neonatal screening for inborn errors of metabolism," Journal of Inherited Metabolic Disease, vol. 13, 1990, pp. 321-324.

Moore, et al., "Application of dual affinity retargeting molecules to achieve optimal redirected T-cell killing of B-cell lymphoma," Blood, vol. 117, No. 17, 2011, pp. 4542-4551.

Moratto, et al., "Long-term outcome and lineage-specific chimerism in 194 patients with Wiskott-Aldrich syndrome treated by hematopoietic cell transplantation in the period 1980-2009: an international collaborative study," Blood, vol. 118, No. 6, 2011, pp. 1675-1684.

Moregensen and Cantrell, "Production and preparation of human leukocyte interferon," Pharm. Therap., vol. 1, No. 4, 1977, pp. 369-381.

Nelson, et al., "Mass spectrometric immunoassay," Analytical Chemistry, vol. 67, No. 7, 1995, pp. 1153-1158.

Osbourn, et al., "From rodent reagents to human therapeutics using antibody guided selection," Methods, vol. 36, No. 1, 2005, pp. 61-68.

Otogenetics Corporation, "Instruction for Buccal Swab Sample Collection," retrieved on Apr. 22, 2021 at <<https://www.otogenetics.com/wp-content/uploads/2018/01/buccal-swab-collection-instructions.pdf>>, 1 page.

Padlan E. A., "A possible procedure for reducing the immunogenicity of antibody variable domains while preserving their ligand-binding properties," Mol. Immunol., vol. 28, No. 4-5, 1991, pp. 489-498.

Parta, et al., "Allogeneic Reduced-Intensity Hematopoietic Stem Cell Transplantation for Chronic Granulomatous Disease: a Single-Center Prospective Trial," Journal of Clinical Immunology, vol. 37, No. 6, 2017, pp. 548-558.

Pathway Genomics, "Buccal DNA Collection Instructions," retrieved on Apr. 22, 2021 at <<https://www.pathway.com/wp-content/uploads/2017/06/Buccal-Swab-Collection-Instructions.pdf>>, 1 page.

Search Report & Written Opinion Dated Feb. 21, 2019 for International Application No. PCT/US19/54856, 14 pgs.

Search Report and Written Opinion Dated Jun. 4, 2021 for International Application No. PCT/US2021/0206797, 26 pages.

Search Report and Written Opinion Dated Jul. 22, 2021 in International Application No. PCT/US2021/025270, 20 pages.

The PCT Search Report and Written Opinion mailed Sep. 21, 2021 for PCT App. No. PCT/ US2021/025627, 14 pages.

PersonalizeDx Labs, "Buccal Swab collection procedure," Youtube uploaded by PersonalizeDx Labs, Nov. 28, 2017, https://www.youtube.com/watch?v=3ftvHkfM71o&t=152s, 4 pages.

Pluckthun, A., "Antibodies from *Escherichia coli*," Pharm of Monolonal Antibodies, vol. 113, 1994, pp. 270-315.

Presta, et al., "Humanization of an antibody directed against IgE," J. Immunol., vol. 151, No. 5, 1993, pp. 2623-2632.

Puleo, et al., "Isolation of Peripheral Blood Mononuclear Cells Using Vacutainer"CR" Cellular Preparation Tubes (CPTTM)," Bio-Protocol, vol. 7, No. 2, 2017, 6 pages.

Qasim, et al., "Protein assays for diagnosis of Wiskott-Aldrich syndrome and X-linked thrombocytopenia," British Journal of Haematology, vol. 113, No. 4, 2001, pp. 861-865.

Queen, et al., "A humanized antibody that binds to the interleukin 2 receptor," PNAS USA., vol. 86, No. 24, 1989, pp. 10029-10033.

Raje & Dinakar, "Overview of Immunodeficiency Disorders," Immunology and Allergy Clinics of North America, vol. 35, No. 4, 2015, pp. 599-623.

Rashed, et al., "Screening blood spots for inborn errors of metabolism by electrospray tandem mass spectrometry with a microplate batch process and a computer algorithm for automated flagging of abnormal profiles," Clin. Chem., vol. 43, No. 7, 1997, pp. 1129-1141.

Reichmann, et al., "Reshaping human antibodies for therapy," Nature, vol. 332, No. 6162, 1988, pp. 323-327.

Rosok, et al., "A combinatorial library strategy for the rapid humanization of anticarcinoma BR96 Fab," J. Biol. Chem., vol. 271, No. 37, 1996, pp. 22611-22618.

Schmalstieg, et al., "Effect of RBC Transfusions on Adenosine Deaminase(ADA) Deficient Severe Combined Immunodeficiency(SCID)," Pediatric Research, vol. 11, No. 4, 1977, 1 page.

Sims, et al., "A humanized CD18 antibody can block function without cell destruction," J. Immunol., vol. 151, No. 4, 1993, pp. 2296-2308.

Staal, et al., "Autologous Stem-Cell-Based Gene Therapy for Inherited Disorders: State of the Art and Perspectives," Frontiers in Pediatrics, vol. 7, No. 443, 2019, 9 pages.

Sweetman, et al., "Naming and counting disorders (conditions) included in newborn screening panels," Pediatrics, vol. 117, No. 5, 2006, pp. S308-S314.

Tangye, et al., "Human Inborn Errors of Immunity: 2019 Update on the Classification from the International Union of Immunological Societies Expert Committee," Journal of Clinical Immunology, vol. 40, 2020, pp. 24-64.

United States Centers for Disease Control and Prevention, "Interim Guidelines for Collecting and Handling of Clinical Specimens for COVID-19 Testing," retrieved on Apr. 22, 2021 at <<https://www.cdc.gov/coronavirus/2019-ncov/lab/guidelines-clinical-specimens.html>>, United States Centers for Disease Control and Prevention, 2021, 6 pages.

Van Doorn, et al., "Salivary a-Iduronidase Activity as a Potential New Biomarker for the Diagnosis and Monitoring the Effect of Therapy in Mucopolysaccharidosis Type I," Biology of Blood and Marrow Transplantation, vol. 24, No. 9, 2018, pp. 1808-1813.

Watson, et al., "Main Report," Genetics in Medicine, vol. 8, No. 5, 2006, pp. 12S-252S.

Whiteaker and Paulovich, "Peptide immunoaffinity enrichment coupled with mass spectrometry for peptide and protein quantification," Clin. Lab. Med., vol. 31, No. 3, 2011, pp. 385-396.

Whiteaker, et al., "High-affinity recombinant antibody fragments (Fabs) can be applied in peptide enrichment immuno—MRM assays," Journal of Proteome Research, vol. 13, No. 4, 2014, pp. 2187-2196.

Whitmore & Gaspar, "Adenosine Deaminase Deficiency—More Than Just an Immunodeficiency," Frontiers in Immunology, vol. 7, No. 314, 2016, 13 pages.

Zhou, et al., "Impact of human granulocyte and monocyte isolation procedures on functional studies," Clinical and Vaccine Immunology, vol. 19, 7, 2012, pp. 1065-1074.

OA for U.S. Appl. No. 17/282,989, mailed on Dec. 9, 2024, 18 pages.

McCarthy and Hill, "Altering the fine specificity of an anti-Legionella single chain antibody by a single amino acid insertion", Journal of Immunological Methods, vol. 251, issue 1-2, May 1, 2001, pp. 137-149.

(56) References Cited

OTHER PUBLICATIONS

Lin et al., "Improved affinity of a chicken single-chain antibody to avian infectious bronchitis virus by site-directed mutagenesis of complementarity-determining region H3", African Journal of Biotechnology, vol. 10, pp. 18294-18302, Published Dec. 12, 2011.

Mariuzza et al., "The Structural Basis of Antigen-Antibody Recognition" Annual Rev. Biphys. Biophys Chem. 1987, pp. 139-159.

Office Action for Japanese Application No. 2021-518442, Dated Jul. 9, 2024, 6 pages.

Office Action for Chinese Application No. 201980065851.5, Dated Jun. 1, 2024, 14 pages.

Search Report and Written Opinion for European Application No. 21764238.8, Dated Jun. 17, 2024, 14 pages.

Search Report and Written Opinion for European Application No. 21780186.9, Dated Jul. 22, 2024, 10 pages.

Search Report and Written Opinion for European Application No. 21779339.7, Dated Jul. 8, 2024, 12 pages.

Roos, et al, "X-CGDbase: a database of X-CGD-causing mutations", Immunology Today, vol. 17, Issue 11, Nov. 1996, pp. 517-521.

Partial European Search Report for EP Application No. 21780186.9, issued Apr. 29, 2024, 13pp.

Chen, et al., "Development of a Multiplexed Liquid Chromatography Multiple-Reaction-Monitoring Mass Spectrometry (LC-MRM/MS) Method for Evaluation of Salivary Proteins as Oral Cancer Biomarkers", Molecular & Cellular Proteomics, vol. 16, No. 5, May 1, 2017, pp. 799-811.

Chang, et al., "Proteolytic immuno-SRM-MSMS in dried blood spots to determine immunogenicity in patients with infantile Pompe disease", Molecular Genetics and Metabolism, vol. 123, Issue 2, Feb. 2018, pp.S28-S29.

Whiteaker, et al., "Antibody-based enrichment of peptides on magnetic beads for mass-spectrometry-based quantification of serum biomarkers", Analytical Biochemistry, vol. 362, Issue 1, Dec. 20, 2006, pp. 44-54.

* cited by examiner

FIG. 1

| Disease | Protein Target | Peptides | Sequence | Total Mass | Parent Ion Mass (m/z) | Daughter Ion Masses (m/z) | | |
|---|---|---|---|---|---|---|---|---|
| Wiskott-Aldrich Syndrome (WAS) | WASp | WASp 289-304 ("WASp 289") | LIYDFIED QGGLEAV R (SEQ ID NO: 1) | 1838.94 | 919.47 ++ | D [y13] - 1448.7016+<br>F [y12] - 1333.6747+<br>I [y11] - 1186.6062+<br>E [y10] - 1073.5222+<br>D [y9] - 944.4796+<br>Q [y8] - 829.4526+<br>G [y7] - 701.3941+<br>G [y6] - 644.3726+<br>L [y5] - 587.3511+<br>E [y4] - 474.2671+<br>A [y3] - 345.2245+ | I [y15] - 862.9281++<br>Y [y14] - 806.3861++<br>D [y13] - 724.8544++<br>F [y12] - 667.3410++<br>I [y11] - 593.8068++<br>E [y10] - 537.2647++<br>D [y9] - 472.7434++<br>Q [y8] - 415.2300++<br>G [y7] - 351.2007++<br>G [y6] - 322.6899++<br>L [y5] - 294.1792++<br>E [y4] - 237.6372++<br>A [y3] - 173.1159++ | Y [b3] - 390.2387+<br>D [b4] - 505.2657+<br>F [b5] - 652.3341+<br>I [b6] - 765.4182+<br>E [b7] - 894.4607+<br>D [b8] - 1009.4877+<br>Q [b9] - 1137.5463+<br>G [b10] - 1194.5677+<br>G [b11] - 1251.5892+<br>L [b12] - 1364.6733+<br>E [b13] - 1493.7159+ | Y [b3] - 195.6230++<br>D [b4] - 253.1365++<br>F [b5] - 326.6707++<br>I [b6] - 383.2127++<br>E [b7] - 447.7340++<br>D [b8] - 505.2475++<br>Q [b9] - 569.2768++<br>G [b10] - 597.7875++<br>G [b11] - 626.2982++<br>L [b12] - 682.8403++<br>E [b13] - 747.3616++<br>A [b14] - 782.8801++<br>V [b15] - 832.4143++ |

FIG. 1 cont'd

| Disease | Protein Target | Peptides | Sequence | Total Mass | Parent Ion Mass (m/z) | Daughter Ion Masses (m/z) | | |
|---|---|---|---|---|---|---|---|---|
| X-Linked Agamma-Globulinemia (XLA) | BTK | BTK 545-558 ("BTK 545") | YVLDDEYTSSVGSK (SEQ ID NO: 2) | 1563.72 | 781.86 ++ | V [y13] - 1399.6587+<br>L [y12] - 1300.5903+<br>D [y11] - 1187.5063+<br>D [y10] - 1072.4793+<br>E [y9] - 957.4524+<br>Y [y8] - 828.4098+<br>T [y7] - 665.3464+<br>S [y6] - 564.2988+<br>S [y5] - 477.2667+<br>V [y4] - 390.2347+<br>G [y3] - 291.1663+ | V [y13] - 700.3330++<br>L [y12] - 650.7988++<br>D [y11] - 594.2568++<br>D [y10] - 536.7433++<br>E [y9] - 479.2298++<br>Y [y8] - 414.7085++<br>T [y7] - 333.1769++<br>S [y6] - 282.6530++<br>S [y5] - 239.1370++<br>V [y4] - 195.6210++<br>G [y3] - 146.0868++ | L [b3] - 376.2231+<br>D [b4] - 491.2500+<br>D [b5] - 606.2770+<br>E [b6] - 735.3196+<br>Y [b7] - 898.3829+<br>T [b8] - 999.4306+<br>S [b9] - 1086.4626+<br>S [b10] - 1173.4946+<br>V [b11] - 1272.5630+<br>G [b12] - 1329.5845+<br>S [b13] - 1416.6165+ | L [b3] - 188.6152++<br>D [b4] - 246.1287++<br>D [b5] - 303.6421++<br>E [b6] - 368.1634++<br>Y [b7] - 449.6951++<br>T [b8] - 500.2189++<br>S [b9] - 543.7349++<br>S [b10] - 587.2510++<br>V [b11] - 636.7852++<br>G [b12] - 665.2959++<br>S [b13] - 708.8119++ |

FIG. 5

| Control Sample | ATP7B 1056 (pmol/L) | Patient | ATP7B 1056 (pmol/L) | Immuno-SRM Diagnosis | Clinical Diagnosis | Genotype | Notes |
|---|---|---|---|---|---|---|---|
| NC 1 | 114.29 | 1 | 113.07 | Normal | X-linked CGD | CYBB Mutation | |
| NC 2 | 130.07 | 2 | 136.36 | Normal | X-linked CGD | CYBB Mutation | |
| NC 3 | 110.14 | 3 | 217.07 | BTK | BTK | BTK c.1587_1589delA (p.N530Tfs26*) | Brother of #4 |
| NC 4 | 129.00 | 4 | 107.79 | BTK | BTK | BTK c.1587_1589delA (p.N530Tfs26*) | Brother of #3 |
| NC 5 | 65.36 | 5 | 183.46 | BTK | BTK | BTK c.1940T>C (p.L647P) | |
| NC 6 | 96.93 | 6 | 30.29 | BTK | BTK | BTK c.763C>T (p.R255*) | |
| NC 7 | 162.79 | 7 | 123.21 | BTK | BTK | BTK c.1940T>C (p.L647P) | |
| NC 8 | 116.07 | 8 | 188.61 | BTK | BTK | BTK c.1889T>A (p.M630K) | |
| NC 9 | 138.79 | 9 | 20.00 | BTK | BTK | BTK c.1908+2delTAAGTGCTT (splice) | |
| NC 10 | 98.07 | 10 | 28.43 | Normal | BTK | No mutation identified | |
| NC 11 | 115.14 | 11 | 21.57 | BTK | BTK | BTK c.1768A>T (p.I590F) | |
| NC 12 | 127.57 | 12 | 32.21 | BTK | BTK | No mutation identified | |
| NC 13 | 77.86 | 13 | 30.93 | Normal | BTK | No mutation identified | |

FIG. 5 cont'd

| Control Sample | ATP7B 1056 (pmol/L) | Patient | ATP7B 1056 (pmol/L) | Immuno-SRM Diagnosis | Clinical Diagnosis | Genotype | Notes |
|---|---|---|---|---|---|---|---|
| NC 14 | 108.57 | 14 | 19.43 | BTK | BTK | BTK c.1714_1715delTA (p.S572lfs14*) | |
| NC 15 | 162.14 | 15 | 25.21 | BTK | BTK | BTK c.953C>T (p.S318F) | |
| NC 16 | 203.71 | 16 | 30.36 | BTK | BTK | BTK c.11811028T>G (p.Y40D) | |
| NC 17 | 179.93 | 17 | 36.29 | BTK | BTK | BTK c.629insA (p.P210Tfs5*) | |
| NC 18 | 127.36 | 18 | 33.50 | BTK | BTK | BTK c.1651T>A (p.Y551N) | |
| NC 19 | 130.64 | 19 | 25.07 | BTK | BTK | BTK c.1735G>C (p.D579H) | |
| NC 20 | 130.00 | 20 | 48.86 | BTK | BTK | BTK c.752G>A (p.W251*) | |
| NC 21 | 101.64 | 21 | 50.71 | BTK | BTK | BTK c.117_119delCTA (p.del40Y) | |
| NC 22 | 115.21 | 22 | 33.64 | BTK | BTK | BTK c.521-1G>A (splice) | |
| NC 23 | 109.14 | 23 | 31.93 | BTK | BTK | BTK c.1876delG (p.A582Lfs4*) | |
| NC 24 | 100.71 | 24 | 30.86 | BTK | BTK | BTK c.763C>T (p.R255*) | |
| NC 25 | 134.64 | 25 | 62.71 | BTK | BTK | BTK c.1782delG (p.K595Rfs52*) | |
| NC 26 | 89.07 | 26 | 46.14 | BTK | BTK | BTK c.1657delA (p.S553Afs2*) | |
| NC 27 | 121.43 | 27 | 44.79 | BTK | BTK | BTK c.1610delT (p.V537Dfs18*) | |
| NC 28 | 96.07 | 28 | 69.71 | BTK | BTK | BTK c.37C>T (p.R13*) | |
| NC 29 | 88.36 | 29 | 90.25 | WAS | WAS | WAS c.1453+2T>A | Same as Pt. #30 (Pre-BMT) |

FIG. 5 cont'd

| Control Sample | ATP7B 1056 (pmol/L) | Patient | ATP7B 1056 (pmol/L) | Immuno-SRM Diagnosis | Clinical Diagnosis | Genotype | Notes |
|---|---|---|---|---|---|---|---|
| NC 30 | 118.64 | 30 | 112.57 | Normal | WAS | Normal BMT donor | Same as Pt. #29 (Post-BMT) |
| NC 31 | 131.86 | 31 | 168.64 | WAS | WAS/XLT | WAS c.223G>A (p.V75M) | |
| NC 32 | 132.64 | 32 | 108.79 | WAS | WAS | WAS c.631C>T (p.R211*) | |
| NC 33 | 106.79 | 33 | 47.71 | WAS | WAS | WAS c.838C>T (p.Q280*) | |
| NC 34 | 139.36 | 34 | 30.07 | WAS | WAS | WAS c.838delC (p.Q280Sfs28*) | |
| NC 35 | 92.93 | 35 | 31.14 | WAS | WAS | WAS c.631C>T (p.R211*) | Brother of Pt. #36 |
| NC 36 | 120.29 | 36 | 60.14 | WAS | WAS | WAS c.631C>T (p.R211*) | Brother of Pt. #35 |
| NC 37 | 85.86 | 37 | 55.79 | WAS | WAS | WAS c.1264_1267insCCTTGCCTGCCTCT (P.G422Pfs20*) | |
| NC 38 | 124.00 | 38 | 7.21 | WAS | WAS | WAS c.332_336insCC (p.F113Pfs15*) | |
| NC 39 | 99.50 | 39 | 63.36 | WAS | WAS | WAS c.756G>A (p.W252*) | |
| NC 40 | 117.43 | 40 | 139.50 | SCID | T-B-NK+ SCID | RAG1 c.2159G>A (p.G720D) - Homozygous | |
| | | 41 | 182.79 | Normal | X-SCID - Hypomorphic T-B+NK+ | IL2RG c.460C>T (p.T154S) | |
| | | 42 | 176.79 | SCID | SCID | Unknown - Gene panel & Exome negative | |

FIG. 6

| Sample | BTK 545 (pmol/L) | WASp 289 (pmol/L) | Sample | BTK 545 ATP7B Ratio | WASp 289 ATP7B Ratio |
|---|---|---|---|---|---|
| 1 | 251.07 | 5245.29 | 1 | 2.20 | 45.90 |
| 2 | 1485.71 | 11111.50 | 2 | 11.42 | 85.43 |
| 3 | 926.79 | 6995.86 | 3 | 8.41 | 63.52 |
| 4 | 177.93 | 1674.93 | 4 | 1.38 | 12.98 |
| 5 | 923.00 | 12230.57 | 5 | 14.12 | 187.13 |
| 6 | 1322.79 | 14981.07 | 6 | 13.65 | 154.56 |
| 7 | 1700.64 | 9975.57 | 7 | 10.45 | 61.28 |
| 8 | 609.36 | 6569.93 | 8 | 5.25 | 56.60 |
| 9 | 927.43 | 10630.00 | 9 | 6.68 | 76.59 |
| 10 | 1145.71 | 12893.64 | 10 | 11.68 | 131.47 |
| 11 | 970.29 | 9373.64 | 11 | 8.43 | 81.41 |
| 12 | 916.93 | 12554.64 | 12 | 7.19 | 98.41 |
| 13 | 1071.86 | 15947.21 | 13 | 13.77 | 204.83 |
| 14 | 834.86 | 18301.64 | 14 | 7.69 | 168.57 |
| 15 | 1527.86 | 11235.71 | 15 | 9.42 | 69.30 |
| 16 | 932.64 | 14357.29 | 16 | 4.58 | 70.48 |
| 17 | 1667.21 | 19107.36 | 17 | 9.27 | 106.19 |
| 18 | 601.71 | 8712.79 | 18 | 4.72 | 68.41 |
| 19 | 2520.93 | 21659.43 | 19 | 19.30 | 165.79 |
| 20 | 967.36 | 7774.50 | 20 | 7.44 | 59.80 |
| 21 | 984.00 | 6288.00 | 21 | 9.68 | 61.86 |
| 22 | 981.14 | 13103.14 | 22 | 8.52 | 113.73 |
| 23 | 1398.86 | 12621.43 | 23 | 12.82 | 115.64 |
| 24 | 489.71 | 4735.50 | 24 | 4.86 | 47.02 |

FIG. 6 cont'd

| Sample | BTK 545 (pmol/L) | WASp 289 (pmol/L) | Sample | BTK 545 ATP7B Ratio | WASp 289 ATP7B Ratio |
|---|---|---|---|---|---|
| 25 | 892.29 | 7971.86 | 25 | 6.63 | 59.21 |
| 26 | 1620.93 | 16762.21 | 26 | 18.20 | 188.19 |
| 27 | 317.93 | 3036.50 | 27 | 2.62 | 25.01 |
| 28 | 701.71 | 15102.14 | 28 | 7.30 | 157.20 |
| 29 | 1562.21 | 10278.71 | 29 | 17.68 | 116.33 |
| 30 | 935.43 | 10191.71 | 30 | 7.88 | 85.90 |
| 31 | 461.21 | 4190.21 | 31 | 3.50 | 31.78 |
| 32 | 835.93 | 5269.57 | 32 | 6.30 | 39.73 |
| 33 | 1248.43 | 11329.57 | 33 | 11.69 | 106.10 |
| 34 | 474.43 | 3114.79 | 34 | 3.40 | 22.35 |
| 35 | 1648.64 | 9638.43 | 35 | 17.74 | 103.72 |
| 36 | 959.50 | 9043.00 | 36 | 7.98 | 75.18 |
| 37 | 1440.57 | 7468.00 | 37 | 16.78 | 86.98 |
| 38 | 948.21 | 8484.86 | 38 | 7.65 | 68.43 |
| 39 | 717.21 | 13417.57 | 39 | 7.21 | 134.85 |
| 40 | 1437.36 | 9699.21 | 40 | 12.24 | 82.60 |

FIG. 7

| Patient | BTK 545 (pmol/L) | BTK 407 (pmol/L) | WASp 274 (pmol/L) | WASp 289 (pmol/L) | Immuno-SRM Diagnosis | Clinical Diagnosis | Genotype | Notes |
|---|---|---|---|---|---|---|---|---|
| 1 | 2221.71 | 1362.07 | 2609.43 | 27763.21 | Normal | X-linked CGD | CYBB Mutation | |
| 2 | 1148.86 | 744.21 | 1028.71 | 11880.21 | Normal | X-linked CGD | CYBB Mutation | |
| 3 | 3.79 | 13.79 | 1919.71 | 23893.21 | BTK | BTK | BTK c.1587_1589delA (p.N530Tfs26*) | Brother of #4 |
| 4 | 11.79 | 13.93 | 1623.07 | 17947.86 | BTK | BTK | BTK c.1587_1589delA (p.N530Tfs26*) | Brother of #3 |
| 5 | 26.96 | 16.96 | 1280.39 | 17413.25 | BTK | BTK | BTK c.1940T>C (p.L647P) | |
| 6 | 20.21 | 11.36 | 257.00 | 4310.21 | BTK | BTK | BTK c.763C>T (p.R255*) | |
| 7 | 19.64 | 12.43 | 1121.29 | 18177.57 | BTK | BTK | BTK c.1940T>C (p.L647P) | |
| 8 | 23.36 | 23.82 | 637.00 | 8699.25 | BTK | BTK | BTK c.1889T>A (p.M630K) | |
| 9 | 21.71 | 13.36 | 495.00 | 6009.64 | BTK | BTK | BTK c.1908+2delTAAGTGCTT | |
| 10 | 237.64 | 113.14 | 548.00 | 7162.29 | Normal | BTK | No mutation identified | |
| 11 | 10.86 | 10.93 | 781.79 | 9599.00 | BTK | BTK | BTK c.1768A>T (p.I590F) | |
| 12 | 13.79 | 11.36 | 618.50 | 7024.36 | BTK | BTK | No mutation identified | |
| 13 | 339.21 | 213.00 | 760.64 | 7695.14 | Normal | BTK | No mutation identified | |
| 14 | 12.71 | 15.50 | 776.93 | 6535.57 | BTK | BTK | BTK c.1714_1715delTA (p.S572Ifs14*) | |
| 15 | 10.36 | 12.07 | 444.21 | 3723.29 | BTK | BTK | BTK c.953C>T (p.S318F) | |
| 16 | 8.79 | 13.29 | 745.00 | 6118.79 | BTK | BTK | BTK c.1811028T>G (p.Y40D) | |

FIG. 7 cont'd

| Patient | BTK 545 (pmol/L) | BTK 407 (pmol/L) | WASp 274 (pmol/L) | WASp 289 (pmol/L) | Immuno-SRM Diagnosis | Clinical Diagnosis | Genotype | Notes |
|---|---|---|---|---|---|---|---|---|
| 17 | 24.29 | 32.36 | 1001.79 | 7820.93 | BTK | BTK | BTK c.629insA (p.P210Tfs5*) | |
| 18 | 7.93 | 167.86 | 609.71 | 5347.21 | BTK | BTK | BTK c.1651T>A (p.Y551N) | |
| 19 | 25.93 | 28.50 | 427.29 | 4181.00 | BTK | BTK | BTK c.1735G>C (p.D579H) | |
| 20 | 16.36 | 23.86 | 786.50 | 5407.93 | BTK | BTK | BTK c.752G>A (p.W251*) | |
| 21 | 6.93 | 19.00 | 801.07 | 8769.71 | BTK | BTK | BTK c.117_119delCTA (p.del40Y) | |
| 22 | 18.50 | 9.29 | 684.64 | 5988.29 | BTK | BTK | BTK c.521-1G>A (splice) | |
| 23 | 4.93 | 8.29 | 508.79 | 5970.86 | BTK | BTK | BTK c.1876delG (p.A582Lfs4*) | |
| 24 | 10.57 | 19.64 | 537.50 | 7728.86 | BTK | BTK | BTK c.763C>T (p.R255*) | |
| 25 | 13.50 | 20.36 | 602.29 | 6838.79 | BTK | BTK | BTK c.1782delG (p.K595Rfs52*) | |
| 26 | 9.21 | 20.36 | 1030.00 | 8832.43 | BTK | BTK | BTK c.1657delA (p.S553Afs2*) | |
| 27 | 10.36 | 21.71 | 751.29 | 6371.79 | BTK | BTK | BTK c.1610delT (p.V537Dfs18*) | |
| 28 | 14.43 | 8.21 | 557.93 | 5896.29 | BTK | BTK | BTK c.37C>T (p.R13*) | |
| 29 | 784.25 | 547.86 | 182.68 | 2041.46 | WAS | WAS | WAS c.1453+2T>A | Pt. #30 (Pre-BMT) |
| 30 | 1397.93 | 786.00 | 938.93 | 12758.86 | Normal | WAS (Post-BMT) | Normal BMT donor | Pt. #29 (Post-BMT) |

FIG. 7 cont'd

| Patient | BTK 545 (pmol/L) | BTK 407 (pmol/L) | WASp 274 (pmol/L) | WASp 289 (pmol/L) | Immuno-SRM Diagnosis | Clinical Diagnosis | Genotype | Notes |
|---|---|---|---|---|---|---|---|---|
| 31 | 415.00 | 202.36 | 113.86 | 1812.00 | WAS | WAS/XLT | WAS c.223G>A (p.V75M) | |
| 32 | 768.93 | 492.21 | 11.29 | 375.86 | WAS | WAS | WAS c.631C>T (p.R211*) | |
| 33 | 342.36 | 346.86 | 11.71 | 248.14 | WAS | WAS | WAS c.838C>T (p.Q280*) | |
| 34 | 275.57 | 206.57 | 10.64 | 238.50 | WAS | WAS | WAS c.838delC (p.Q280Sfs28*) | |
| 35 | 258.79 | 187.50 | 10.29 | 204.64 | WAS | WAS | WAS c.631C>T (p.R211*) | Brother of Pt. #36 |
| 36 | 448.07 | 236.00 | 4.71 | 237.43 | WAS | WAS | WAS c.631C>T (p.R211*) | Brother of Pt. #35 |
| 37 | 307.79 | 167.00 | 33.14 | 476.79 | WAS | WAS | WAS c.1264_1267insCCTTGCCTGCCTCT (P.G422Pfs20*) | |
| 38 | 123.64 | 106.21 | 6.79 | 148.79 | WAS | WAS | WAS c.332_336insCC (p.F113Pfs15*) | |
| 39 | 788.79 | 520.50 | 20.71 | 359.36 | WAS | WAS | WAS c.756G>A (p.W252*) | |
| 40 | 851.71 | 648.71 | 624.43 | 6892.07 | SCID | T-B-NK+ SCID | RAG1 c.2159G>A (p.G720D), Homozygous | |
| 41 | 1012.36 | 567.14 | 1295.93 | 20174.64 | Normal | X-SCID - Hypomorphic | IL2RG c.460C>T (p.T154S) | |
| 42 | 1414.36 | 872.43 | 1898.29 | 16707.14 | SCID | T-B+NK+ SCID | Unknown - Gene panel & Exome negative | |

| Peptide | Area Under Curve | p-value |
|---|---|---|
| BTK 545 | 0.999 | <0.0001 |
| WASp 289 | 0.930 | <0.0001 |

FIG. 9

| Sample | BTK 545 (pmol/L) | WASp 289 (nmol/L) | Sample | BTK 545 (pmol/L) | WASp 289 (nmol/L) |
|---|---|---|---|---|---|
| 1 | 355.71 | 31.99 | 32 | 224.50 | 20.97 |
| 2 | 358.71 | 16.74 | 33 | 138.51 | 12.57 |
| 3 | 242.96 | 17.72 | 34 | 219.06 | 24.63 |
| 4 | 301.43 | 11.06 | 35 | 263.99 | 27.65 |
| 5 | 209.14 | 8.33 | 36 | 213.20 | 15.04 |
| 6 | 123.86 | 7.44 | 37 | 120.76 | 3.41 |
| 7 | 196.74 | 6.68 | 38 | 108.89 | 9.06 |
| 8 | 265.86 | 9.15 | 39 | 107.60 | 12.00 |
| 9 | 165.41 | 5.40 | 40 | 220.50 | 15.72 |
| 10 | 231.29 | 10.19 | 41 | 161.69 | 13.94 |
| 11 | 207.33 | 14.46 | 42 | 249.11 | 6.56 |
| 12 | 186.14 | 8.27 | 43 | 264.57 | 23.85 |
| 13 | 260.42 | 19.75 | 44 | 759.79 | 52.00 |
| 14 | 252.55 | 18.15 | 45 | 120.48 | 9.28 |
| 15 | 203.61 | 17.82 | 46 | 816.16 | 19.17 |
| 16 | 261.13 | 4.96 | 47 | 823.46 | 22.77 |
| 17 | 519.83 | 5.65 | 48 | 838.91 | 15.96 |
| 18 | 456.87 | 6.19 | 49 | 623.42 | 9.37 |
| 19 | 641.17 | 10.76 | 50 | 789.83 | 19.75 |
| 20 | 167.55 | 4.77 | 51 | 454.58 | 8.24 |
| 21 | 329.81 | 7.41 | 52 | 624.14 | 6.36 |
| 22 | 427.25 | 7.25 | 53 | 360.58 | 5.39 |
| 23 | 325.95 | 3.20 | 54 | 166.55 | 4.89 |
| 24 | 233.52 | 3.55 | 55 | 141.23 | 5.52 |
| 25 | 255.69 | 5.07 | 56 | 263.71 | 6.85 |
| 26 | 246.39 | 5.95 | 57 | 163.12 | 5.19 |
| 27 | 185.30 | 6.13 | 58 | 253.55 | 6.82 |
| 28 | 208.91 | 5.42 | 59 | 267.28 | 7.79 |
| 29 | 253.98 | 6.67 | 60 | 149.10 | 4.99 |
| 30 | 168.27 | 4.42 | 61 | 118.33 | 3.92 |
| 31 | 139.37 | 12.01 | 62 | 244.68 | 2.49 |
| | | | Mean | 300.86 | 11.37 |
| | | | SD | 191.74 | 8.47 |

FIG. 10

| Patient | BTK 545 ATP7B Ratio | BTK 407 ATP7B Ratio | WASp 274 ATP7B Ratio | WASp 289 ATP7B Ratio | CD3ε 197 ATP7B Ratio | Immuno-SRM Diagnosis | Clinical Diagnosis | Genotype | Notes |
|---|---|---|---|---|---|---|---|---|---|
| 1 | 19.65 | 12.05 | 23.08 | 245.54 | 2.18 | Normal | X-linked CGD | CYBB Mutation | |
| 2 | 8.43 | 5.46 | 7.54 | 87.13 | 1.69 | Normal | X-linked CGD | CYBB Mutation | |
| 3 | 0.02 | 0.06 | 8.84 | 110.07 | 0.40 | BTK | BTK | BTK c.1587_1589delA (p.N530Tfs26*) | Brother of #4 |
| 4 | 0.11 | 0.13 | 15.06 | 166.51 | 1.86 | BTK | BTK | BTK c.1587_1589delA (p.N530Tfs26*) | Brother of #3 |
| 5 | 0.15 | 0.09 | 6.98 | 94.91 | 0.54 | BTK | BTK | BTK c.1940T>C (p.L647P) | |
| 6 | 0.67 | 0.38 | 8.49 | 142.32 | 5.86 | BTK | BTK | BTK c.763C>T (p.R255*) | |
| 7 | 0.16 | 0.10 | 9.10 | 147.53 | 0.58 | BTK | BTK | BTK c.1940T>C (p.L647P) | |
| 8 | 0.12 | 0.13 | 3.38 | 46.12 | 0.55 | BTK | BTK | BTK c.1889T>A (p.M630K) | |
| 9 | 1.09 | 0.67 | 24.75 | 300.48 | 3.18 | BTK | BTK | BTK c.1908+2delTAAGTGCTT | |
| 10 | 8.36 | 3.98 | 19.28 | 251.94 | 2.31 | Normal | BTK | No mutation identified | |
| 11 | 0.50 | 0.51 | 36.24 | 444.99 | 3.79 | BTK | BTK | BTK c.1768A>T (p.I590F) | |
| 12 | 0.43 | 0.35 | 19.20 | 218.05 | 2.04 | BTK | BTK | No mutation identified | |
| 13 | 10.97 | 6.89 | 24.59 | 248.80 | 3.56 | Normal | BTK | BTK c.1714_1715delTA (p.S572lfs14*) | |
| 14 | 0.65 | 0.80 | 39.99 | 336.39 | 4.84 | BTK | BTK | BTK c.953C>T (p.S318F) | |
| 15 | 0.41 | 0.48 | 17.62 | 147.67 | 2.28 | BTK | BTK | BTK c.11811028T>G (p.Y40D) | |
| 16 | 0.29 | 0.44 | 24.54 | 201.56 | 2.17 | BTK | BTK | BTK c.629insA (p.P210Tfs5*) | |
| 17 | 0.67 | 0.89 | 27.61 | 215.54 | 3.02 | BTK | BTK | BTK c.1651T>A (p.Y551N) | |
| 18 | 0.24 | 5.01 | 18.20 | 159.62 | 2.55 | BTK | BTK | BTK c.1735G>C (p.D579H) | |
| 19 | 1.03 | 1.14 | 17.04 | 166.76 | 3.19 | BTK | BTK | BTK c.752G>A (p.W251*) | |
| 20 | 0.33 | 0.49 | 16.10 | 110.69 | 2.06 | BTK | BTK | BTK c.117_119delCTA (p.del40Y) | |
| 21 | 0.14 | 0.37 | 15.80 | 172.92 | 1.52 | BTK | BTK | BTK c.521-1G>A (splice) | |
| 22 | 0.55 | 0.28 | 20.35 | 178.00 | 2.28 | BTK | BTK | BTK c.1876delG (p.A582Lfs4*) | |
| 23 | 0.15 | 0.26 | 15.94 | 187.01 | 2.43 | BTK | BTK | BTK c.763C>T (p.R255*) | |
| 24 | 0.34 | 0.64 | 17.42 | 250.47 | 2.95 | BTK | BTK | BTK c.763C>T (p.R255*) | |
| 25 | 0.22 | 0.32 | 9.60 | 109.05 | 1.04 | BTK | BTK | BTK c.1782delG (p.K595Rfs52*) | |
| 26 | 0.20 | 0.44 | 22.32 | 191.41 | 3.19 | BTK | BTK | BTK c.1657delA (p.S553Afs2*) | |
| 27 | 0.23 | 0.48 | 16.78 | 142.27 | 2.09 | BTK | BTK | BTK c.1610delT (p.V537Dfs18*) | |

FIG. 10 cont'd

| Patient | BTK 545 ATP7B Ratio | BTK 407 ATP7B Ratio | WASp 274 ATP7B Ratio | WASp 289 ATP7B Ratio | CD3ε 197 ATP7B Ratio | Immuno-SRM Diagnosis | Clinical Diagnosis | Genotype | Notes |
|---|---|---|---|---|---|---|---|---|---|
| 28 | 0.21 | 0.12 | 8.00 | 84.58 | 0.73 | BTK | BTK | BTK c.37C>T (p.R13*) | |
| 29 | 8.69 | 6.07 | 2.02 | 22.62 | 3.99 | WAS | WAS | WAS c.1453+2T>A | Same as Pt. #30 (Pre-BMT) |
| 30 | 12.42 | 6.98 | 8.34 | 113.34 | 0.94 | Normal | WAS (Post-BMT) | Normal BMT donor | Same as Pt. #29 (Post-BMT) |
| 31 | 2.46 | 1.20 | 0.68 | 10.74 | 0.41 | WAS | WAS/XLT | WAS c.223G>A (p.V75M) | |
| 32 | 7.07 | 4.52 | 0.10 | 3.46 | 0.75 | WAS | WAS | WAS c.631C>T (p.R211*) | |
| 33 | 7.18 | 7.27 | 0.25 | 5.20 | 1.62 | WAS | WAS | WAS c.838C>T (p.Q280*) | |
| 34 | 9.16 | 6.87 | 0.35 | 7.93 | 1.41 | WAS | WAS | WAS c.838delC (p.Q280Sfs28*) | |
| 35 | 8.31 | 6.02 | 0.33 | 6.57 | 1.78 | WAS | WAS | WAS c.631C>T (p.R211*) | Brother of Pt. #36 |
| 36 | 7.45 | 3.92 | 0.08 | 3.95 | 0.77 | WAS | WAS | WAS c.631C>T (p.R211*) | Brother of Pt. #35 |
| 37 | 5.52 | 2.99 | 0.59 | 8.55 | 2.26 | WAS | WAS | WAS c.1264_1267insCCTTGCCTGCCTCT (P.G422Pfs20*) | |
| 38 | 17.14 | 14.72 | 0.94 | 20.62 | 18.35 | WAS | WAS | WAS c.332_336insCC (p.F113Pfs15*) | |
| 39 | 12.45 | 8.22 | 0.33 | 5.67 | 0.57 | WAS | WAS | WAS c.756G>A (p.W252*) | |
| 40 | 6.11 | 4.65 | 4.48 | 49.41 | 0.24 | SCID | T-B-NK+ SCID | RAG1 c.2159G>A (p.G720D), Homozygous | |
| 41 | 5.54 | 3.10 | 7.09 | 110.37 | 0.47 | Normal | X-SCID - Hypomorphic | IL2RG c.460C>T (p.T154S) | |
| 42 | 8.00 | 4.93 | 10.74 | 94.51 | 0.10 | SCID | T-B+NK+ SCID | Unknown - Gene panel & Exome negative | |

FIG. 14

>Anti-WASp 289 variable heavy domain coding sequence (EB0610A-9G7-H1) with leader sequence. The leader sequence is underlined.
<u>ATGGAGACTGGGCTGCGCTGGCTTCTCCTGGTCGCTGTGCTCAAAGGTGTCCAGTGT</u>CAG
TCAGTGGAGGAGTCCGGGGGTCGCCTGGTCACGCCTGGGACACCCCTGACACTCACCTG
CACCGTCTCTGGATTCTCCCTCAGCAGCTCCGACATGACCTGGGTCCGCCAGGCTCCAGG
GAAGGGGCTGGAATACATCGGATACATGAGTAGTAATGATAGGCCATACTACGCGAGCTG
GGCAAATGGTCGATTCACCATCTCCAAAACCTCGACCACGGTGACTCTGAAAATCACCAGT
CCGACAACCGAGGACACGGCCACCTATTTCTGTTGTAGAGGTGTTCTTGGTACTAGGTCGA
TTCACATCTGGGGCCCAGGCACCCTGGTCACCGTCTCCTTA (SEQ ID NO: 31)

>Anti-WASp 289 variable light domain coding sequence (EB0610A-9G7-K1) with leader sequence. The leader sequence is underlined.
<u>ATGGACACGAGGGCCCCCACTCAGCTGCTGGGGCTCCTGCTGCTCTGGCTCCCAGGTGC
CACATTTGCC</u>ATCGTGATGACCCAGACTCCATCCCCCGTGTCTGCAGCTGTGGGAGGCAC
AGTCACCATCAATTGCCAGGCCAGTGAGAGTGTCTATAGTGACAACCGCTTATCCTGGTAT
CAGCAGAAACCAGGGCAGCCTCCCAAGCAACTGATCTATGGTGCATCCACTCTGGCATCT
GAGGTCTCATCGCGATTCAAAGGCAGTGGATCTGGGACACAGTTCACTCTCACCATCAAC
GATGTGGTGTGTGACGATGCTGCCACTTACTACTGTGCAGGATATAAAAGTAGTAATCAAG
ATGGTATTGGTTTCGGCGGAGGGACCGAGGTGGTCGTCAAA (SEQ ID NO: 32)

>Anti-WASp 289 heavy chain coding sequence (EB0610A-9G7-H1) with leader sequence. The leader sequence is underlined.
<u>ATGGAGACTGGGCTGCGCTGGCTTCTCCTGGTCGCTGTGCTCAAAGGTGTCCAGTGT</u>CAG
TCAGTGGAGGAGTCCGGGGGTCGCCTGGTCACGCCTGGGACACCCCTGACACTCACCTG
CACCGTCTCTGGATTCTCCCTCAGCAGCTCCGACATGACCTGGGTCCGCCAGGCTCCAGG
GAAGGGGCTGGAATACATCGGATACATGAGTAGTAATGATAGGCCATACTACGCGAGCTG
GGCAAATGGTCGATTCACCATCTCCAAAACCTCGACCACGGTGACTCTGAAAATCACCAGT
CCGACAACCGAGGACACGGCCACCTATTTCTGTTGTAGAGGTGTTCTTGGTACTAGGTCGA
TTCACATCTGGGGCCCAGGCACCCTGGTCACCGTCTCCTTAGGGCAACCTAAGGCTCCAT
CAGTCTTCCCACTGGCCCCCTGCTGCGGGGACACACCCAGCTCCACGGTGACCCTGGGC
TGCCTGGTCAAAGGCTACCTCCCGGAGCCAGTGACCGTGACCTGGAACTCGGGCACCCT
CACCAATGGGGTACGCACCTTCCCGTCCGTCCGGCAGTCCTCAGGCCTCTACTCGCTGAG
CAGCGTGGTGAGCGTGACCTCAAGCAGCCAGCCCGTCACCTGCAACGTGGCCCACCCAG
CCACCAACACCAAAGTGGACAAGACCGTTGCGCCCTCGACATGCAGCAAGCCCATGTGCC
CACCCCCTGAACTCCTGGGGGGACCGTCTGTCTTCATCTTCCCCCCAAAACCCAAGGACA
CCCTCATGATCTCACGCACCCCCGAGGTCACATGCGTGGTGGTGGACGTGAGCCAGGAT
GACCCCGAGGTGCAGTTCACATGGTACATAAACAACGAGCAGGTGCGCACCGCCCGGCC
GCCGCTACGGGAGCAGCAGTTCAACAGCACGATCCGCGTGGTCAGCACCCTCCCCATCG
CGCACCAGGACTGGCTGAGGGGCAAGGAGTTCAAGTGCAAAGTCCACAACAAGGCACTC
CCGGCCCCCATCGAGAAACCATCTCCAAAGCCAGAGGGCAGCCCCTGGAGCCGAAGGT
CTACACCATGGGCCCTCCCCGGGAGGAGCTGAGCAGCAGGTCGGTCAGCCTGACCTGCA
TGATCAACGGCTTCTACCCTTCCGACATCTCGGTGGAGTGGGAGAAGAACGGGAAGGCAG
AGGACAACTACAAGACCACGCCGGCCGTGCTGGACAGCGACGGCTCCTACTTCCTCTACA
GCAAGCTCTCAGTGCCCACGAGTGAGTGGCAGCGGGGCGACGTCTTCACCTGCTCCGTG
ATGCACGAGGCCTTGCACAACCACTACACGCAGAAGTCCATCTCCCGCTCTCCGGGTAAA
TGA (SEQ ID NO: 33)

FIG. 14 cont'd.

>Anti-WASp 289 light chain coding sequence (EB0610A-9G7-K1) with leader sequence. The leader sequence is underlined.
<u>ATGGACACGAGGGCCCCCACTCAGCTGCTGGGGCTCCTGCTGCTCTGGCTCCCAGGTGC
CACATTTGCC</u>ATCGTGATGACCCAGACTCCATCCCCCGTGTCTGCAGCTGTGGGAGGCAC
AGTCACCATCAATTGCCAGGCCAGTGAGAGTGTCTATAGTGACAACCGCTTATCCTGGTAT
CAGCAGAAACCAGGGCAGCCTCCCAAGCAACTGATCTATGGTGCATCCACTCTGGCATCT
GAGGTCTCATCGCGATTCAAAGGCAGTGGATCTGGGACACAGTTCACTCTCACCATCAAC
GATGTGGTGTGTGACGATGCTGCCACTTACTACTGTGCAGGATATAAAAGTAGTAATCAAG
ATGGTATTGGTTTCGGCGGAGGGACCGAGGTGGTCGTCAAAGGTGATCCAGTTGCACCTA
CTGTCCTCATCTTCCCACCATCTGCTGATCTTGTGGCAACTGGAACAGTCACCATCGTGTG
TGTGGCGAATAAATACTTTCCCGATGTCACCGTCACCTGGGAGGTGGATGGCACCACCCA
AACAACTGGCATCGAGAACAGTAAAACACCGCAGAATTCTGCAGATTGTACCTACAACCTC
AGCAGCACTCTGACACTGACCAGCACACAGTACAACAGCCACAAAGAGTACACCTGCAAG
GTGACCCAGGGCACGACCTCAGTCGTCCANAGCTTCAATAGGGGTGACTGTTAG (SEQ ID
NO: 34)

>Anti-BTK 545 variable heavy domain coding sequence (EB0611A-3F7-H2) with leader sequence. The leader sequence is underlined.
<u>ATGGAGACTGGGCTGCGCTGGCTTCTCCTGGTCGCTGTGCTCAAAGGTGTCCGGTGT</u>CAG
TCGCTGCAGGGGTCCGGGGGAGGCCTGTTCCAGCCTGGGGGATTCCTGGCACTCACCTG
CAAAGCCTCTGGATTCTCCTTCAGTAGCACGTTCGTGGTGTCCTTGATCCGCCAGGCTCCA
GGGAAGGGGCTGGAGTGGATCGCGTCCATTGATGTTGGTAGTAGTGGTATCACTTACTAC
GCGAGCTGGGCGAAAGGCCGCTTCACCATCTCCAAAACCTCGTCGACCACGGTGACTCTG
CAAATGACCAGTCTGACAGCCGCGGACACGGCCACCTATTTCTGTGCGAGAGGGACCAAC
TTTGGCTTCTGGGGCCCAGGCACCCTGGTCACCGTCTCCTCA (SEQ ID NO: 35)

>Anti-BTK 545 variable light domain coding sequence (EB0611A-3F7-K2) with leader sequence. The leader sequence is underlined.
<u>ATGGACACGAGGGCCCCCACTCAGCTGCTGGGGCTCCTGCTGCTCTGGCTCCCAGGTGC
CACATTTGCC</u>ATCGTGATGACCCAGACTCCATCTTCCAAGTCTGTCCCTGTGGGAGACACA
GTCACCATCAATTGCCAGGCCAGTGAGAGTGTTTATAGTGACAACCGCTTATCCTGGTTTC
AGCAGAAACAAGGGCAGCCTCCCAAGCTCCTGATCTACCAGGCATCCAAATTGGAAACTG
GGGTCCCATCGCGGTTCAGCGGCAGTGGATCTGGGACACAGTTCACTCTCACCATCAGCG
ATGTGGTGTGTGACGATGCTGCCACTTACTACTGTGCAGGATATAAAGGTAGTAGTAGTGA
TGGCCATGGTTTCGGCGGAGGGACCGAGGTGGTGGTCAAA (SEQ ID NO: 36)

FIG. 14 cont'd.

>Anti-BTK 545 heavy chain coding sequence (EB0611A-3F7-H2) with leader sequence. The leader sequence is underlined.
<u>ATGGAGACTGGGCTGCGCTGGCTTCTCCTGGTCGCTGTGCTCAAAGGTGTCCGGTGTCAG</u>TCGCTGCAGGGGTCCGGGGGAGGCCTGTTCCAGCCTGGGGGATTCCTGGCACTCACCTGCAAAGCCTCTGGATTCTCCTTCAGTAGCACGTTCGTGGTGTCCTTGATCCGCCAGGCTCCAGGGAAGGGGCTGGAGTGGATCGCGTCCATTGATGTTGGTAGTAGTGGTATCACTTACTACGCGAGCTGGGCGAAAGGCCGCTTCACCATCTCCAAAACCTCGTCGACCACGGTGACTCTGCAAATGACCAGTCTGACAGCCGCGGACACGGCCACCTATTTCTGTGCGAGAGGGACCAACTTTGGCTTCTGGGGCCCAGGCACCCTGGTCACCGTCTCCTCAGGGCAACCTAAGGCTCCATCAGTCTTCCCACTGGCCCCCTGCTGCGGGGACACACCCAGCTCCACGGTGACCCTGGGCTGCCTGGTCAAAGGCTACCTCCCGGAGCCAGTGACCGTGACCTGGAACTCGGGCACCCTCACCAATGGGGTACGCACCTTCCCGTCCGTCCGGCAGTCCTCAGGCCTCTACTCGCTGAGCAGCGTGGTGAGCGTGACCTCAAGCAGCCAGCCCGTCACCTGCAACGTGGCCCACCCAGCCACCAACACCAAAGTGGACAAGACCGTTGCGCCCTCGACATGCAGCAAGCCCATGTGCCCACCCCCTGAACTCCTGGGGGGACCGTCTGTCTTCATCTTCCCCCCAAAACCCAAGGACACCCTCATGATCTCACGCACCCCCGAGGTCACATGCGTGGTGGTGGACGTGAGCCAGGATGACCCCGAGGTGCAGTTCACATGGTACATAAACAACGAGCAGGTGCGCACCGCCCGGCCGCCGCTACGGGAGCAGCAGTTCAACAGCACGATCCGCGTGGTCAGCACCCTCCCCATCGCGCACCAGGACTGGCTGAGGGGCAAGGAGTTCAAGTGCAAAGTCCACAACAAGGCACTCCCGGCCCCCATCGAGAAACCATCTCCAAAGCCAGAGGGCAGCCCCTGGAGCCGAAGGTCTACACCATGGGCCCTCCCCGGGAGGAGCTGAGCAGCAGGTCGGTCAGCCTGACCTGCATGATCAACGGCTTCTACCCTTCCGACATCTCGGTGGAGTGGGAGAAGAACGGGAAGGCAGAGGACAACTACAAGACCACGCCGGCCGTGCTGGACAGCGACGGCTCCTACTTCCTCTACAGCAAGCTCTCAGTGCCCACGAGTGAGTGGCAGCGGGGCGACGTCTTCACCTGCTCCGTGATGCACGAGGCCTTGCACAACCACTACACGCAGAAGTCCATCTCCCGCTCTCCGGGTAAATGA (SEQ ID NO: 37)

>Anti-BTK 545 light chain coding sequence (EB0611A-3F7-K2) with leader sequence. The leader sequence is underlined.
<u>ATGGACACGAGGGCCCCCACTCAGCTGCTGGGGCTCCTGCTGCTCTGGCTCCCAGGTGCCACATTTGCC</u>ATCGTGATGACCCAGACTCCATCTTCCAAGTCTGTCCCTGTGGGAGACACAGTCACCATCAATTGCCAGGCCAGTGAGAGTGTTTATAGTGACAACCGCTTATCCTGGTTTCAGCAGAAACAAGGGCAGCCTCCCAAGCTCCTGATCTACCAGGCATCCAAATTGGAAACTGGGGTCCCATCGCGGTTCAGCGGCAGTGGATCTGGGACACAGTTCACTCTCACCATCAGCGATGTGGTGTGTGACGATGCTGCCACTTACTACTGTCAGGATATAAAGGTAGTAGTAGTGATGGCCATGGTTTCGGCGGAGGGACCGAGGTGGTGGTCAAAGGTGATCCAGTTGCACCTACTGTCCTCATCTTCCCACCAGCTGCTGATCAGGTGGCAACTGGAACAGTCACCATCGTGTGTGTGGCGAATAAATACTTTCCCGATGTCACCGTCACCTGGGAGGTGGATGGCACCACCCAAACAACTGGCATCGAGAACAGTAAAACACCGCAGAATTCTGCAGATTGTACCTACAACCTCAGCAGCACTCTGACACTGACCAGCACACAGTACAACAGCCACAAAGAGTACACCTGCAAGGTGACCCAGGGCACGACCTCAGTCGTCCAGAGCTTCAATAGGGGTGACTGTTAG (SEQ ID NO: 38)

>Exemplary His tag
HHHHHH (SEQ ID NO: 45)

>Exemplary Flag tag
DYKDDDD (SEQ ID NO: 46)

FIG. 14 cont'd.

>Exemplary Flag tag
DYKDDDDK (SEQ ID NO: 47)

>Exemplary Flag tag
DYKDDDK (SEQ ID NO: 48)

>Exemplary Xpress tag
DLYDDDDK (SEQ ID NO: 49)

>Exemplary Avi tag
GLNDIFEAQKIEWHE (SEQ ID NO: 50)

>Exemplary calmodulin binding peptide (CBP) tag
KRRWKKNFIAVSAANRFKKISSSGAL (SEQ ID NO: 51)

>Exemplary Polyglutamate tag
EEEEEE (SEQ ID NO: 52)

>Exemplary HA tag
YPYDVPDYA (SEQ ID NO: 53)

>Exemplary HA tag
YAYDVPDYA (SEQ ID NO: 54)

>Exemplary HA tag
YDVPDYASL (SEQ ID NO: 55)

>Exemplary Myc tag
EQKLISEEDL (SEQ ID NO: 56)

>Exemplary Strep tag
WRHPQFGG (SEQ ID NO: 57)

>STREP® tag II
WSHPQFEK (SEQ ID NO: 58)

>Exemplary Softag 1
SLAELLNAGLGGS (SEQ ID NO: 59)

>Exemplary Softag 3
TQDPSRVG (SEQ ID NO: 60)

>Exemplary V5 tag
GKPIPNPLLGLDST (SEQ ID NO: 61)

FIG. 14 cont'd.

>Anti-WASp 289 variable heavy domain coding sequence (EB0610A-9G7-H1) without leader sequence.
CAGTCAGTGGAGGAGTCCGGGGGTCGCCTGGTCACGCCTGGGACACCCCTGACACTCAC
CTGCACCGTCTCTGGATTCTCCCTCAGCAGCTCCGACATGACCTGGGTCCGCCAGGCTCC
AGGGAAGGGGCTGGAATACATCGGATACATGAGTAGTAATGATAGGCCATACTACGCGAG
CTGGGCAAATGGTCGATTCACCATCTCCAAAACCTCGACCACGGTGACTCTGAAAATCACC
AGTCCGACAACCGAGGACACGGCCACCTATTTCTGTTGTAGAGGTGTTCTTGGTACTAGGT
CGATTCACATCTGGGGCCCAGGCACCCTGGTCACCGTCTCCTTA (SEQ ID NO: 62)

>Anti-WASp 289 variable light domain coding sequence (EB0610A-9G7-K1) without leader sequence.
ATCGTGATGACCCAGACTCCATCCCCCGTGTCTGCAGCTGTGGGAGGCACAGTCACCATC
AATTGCCAGGCCAGTGAGAGTGTCTATAGTGACAACCGCTTATCCTGGTATCAGCAGAAAC
CAGGGCAGCCTCCCAAGCAACTGATCTATGGTGCATCCACTCTGGCATCTGAGGTCTCAT
CGCGATTCAAAGGCAGTGGATCTGGGACACAGTTCACTCTCACCATCAACGATGTGGTGT
GTGACGATGCTGCCACTTACTACTGTCAGGATATAAAAGTAGTAATCAAGATGGTATTGG
TTTCGGCGGAGGGACCGAGGTGGTCGTCAAA (SEQ ID NO: 63)

>Anti-WASp 289 heavy chain coding sequence (EB0610A-9G7-H1) without leader sequence.
CAGTCAGTGGAGGAGTCCGGGGGTCGCCTGGTCACGCCTGGGACACCCCTGACACTCAC
CTGCACCGTCTCTGGATTCTCCCTCAGCAGCTCCGACATGACCTGGGTCCGCCAGGCTCC
AGGGAAGGGGCTGGAATACATCGGATACATGAGTAGTAATGATAGGCCATACTACGCGAG
CTGGGCAAATGGTCGATTCACCATCTCCAAAACCTCGACCACGGTGACTCTGAAAATCACC
AGTCCGACAACCGAGGACACGGCCACCTATTTCTGTTGTAGAGGTGTTCTTGGTACTAGGT
CGATTCACATCTGGGGCCCAGGCACCCTGGTCACCGTCTCCTTAGGGCAACCTAAGGCTC
CATCAGTCTTCCCACTGGCCCCCTGCTGCGGGGACACACCCAGCTCCACGGTGACCCTG
GGCTGCCTGGTCAAAGGCTACCTCCCGGAGCCAGTGACCGTGACCTGGAACTCGGGCAC
CCTCACCAATGGGGTACGCACCTTCCCGTCCGTCCGGCAGTCCTCAGGCCTCTACTCGCT
GAGCAGCGTGGTGAGCGTGACCTCAAGCAGCCAGCCCGTCACCTGCAACGTGGCCCACC
CAGCCACCAACACCAAAGTGGACAAGACCGTTGCGCCCTCGACATGCAGCAAGCCCATGT
GCCCACCCCCTGAACTCCTGGGGGGACCGTCTGTCTTCATCTTCCCCCCAAAACCCAAGG
ACACCCTCATGATCTCACGCACCCCCGAGGTCACATGCGTGGTGGTGGACGTGAGCCAG
GATGACCCCGAGGTGCAGTTCACATGGTACATAAACAACGAGCAGGTGCGCACCGCCCG
GCCGCCGCTACGGGAGCAGCAGTTCAACAGCACGATCCGCGTGGTCAGCACCCTCCCCA
TCGCGCACCAGGACTGGCTGAGGGGCAAGGAGTTCAAGTGCAAAGTCCACAACAAGGCA
CTCCCGGCCCCCATCGAGAAAACCATCTCCAAAGCCAGAGGGCAGCCCCTGGAGCCGAA
GGTCTACACCATGGGCCCTCCCCGGGAGGAGCTGAGCAGCAGGTCGGTCAGCCTGACCT
GCATGATCAACGGCTTCTACCCTTCCGACATCTCGGTGGAGTGGGAGAAGAACGGGAAGG
CAGAGGACAACTACAAGACCACGCCGGCCGTGCTGGACAGCGACGGCTCCTACTTCCTCT
ACAGCAAGCTCTCAGTGCCCACGAGTGAGTGGCAGCGGGGCGACGTCTTCACCTGCTCC
GTGATGCACGAGGCCTTGCACAACCACTACACGCAGAAGTCCATCTCCCGCTCTCCGGGT
AAATGA (SEQ ID NO: 64)

FIG. 14 cont'd.

>Anti-WASp 289 light chain coding sequence (EB0610A-9G7-K1) without leader sequence.
ATCGTGATGACCCAGACTCCATCCCCCGTGTCTGCAGCTGTGGGAGGCACAGTCACCATC
AATTGCCAGGCCAGTGAGAGTGTCTATAGTGACAACCGCTTATCCTGGTATCAGCAGAAAC
CAGGGCAGCCTCCCAAGCAACTGATCTATGGTGCATCCACTCTGGCATCTGAGGTCTCAT
CGCGATTCAAAGGCAGTGGATCTGGGACACAGTTCACTCTCACCATCAACGATGTGGTGT
GTGACGATGCTGCCACTTACTACTGTGCAGGATATAAAAGTAGTAATCAAGATGGTATTGG
TTTCGGCGGAGGGACCGAGGTGGTCGTCAAAGGTGATCCAGTTGCACCTACTGTCCTCAT
CTTCCCACCATCTGCTGATCTTGTGGCAACTGGAACAGTCACCATCGTGTGTGTGGCGAAT
AAATACTTTCCCGATGTCACCGTCACCTGGGAGGTGGATGGCACCACCCAAACAACTGGC
ATCGAGAACAGTAAAACACCGCAGAATTCTGCAGATTGTACCTACAACCTCAGCAGCACTC
TGACACTGACCAGCACACAGTACAACAGCCACAAAGAGTACACCTGCAAGGTGACCCAGG
GCACGACCTCAGTCGTCCANAGCTTCAATAGGGGTGACTGTTAG (SEQ ID NO: 65)

>Anti-BTK 545 variable heavy domain coding sequence (EB0611A-3F7-H2) without leader sequence.
CAGTCGCTGCAGGGGTCCGGGGGAGGCCTGTTCCAGCCTGGGGGATTCCTGGCACTCAC
CTGCAAAGCCTCTGGATTCTCCTTCAGTAGCACGTTCGTGGTGTCCTTGATCCGCCAGGCT
CCAGGGAAGGGGCTGGAGTGGATCGCGTCCATTGATGTTGGTAGTAGTGGTATCACTTAC
TACGCGAGCTGGGCGAAAGGCCGCTTCACCATCTCCAAAACCTCGTCGACCACGGTGACT
CTGCAAATGACCAGTCTGACAGCCGCGGACACGGCCACCTATTTCTGTGCGAGAGGGACC
AACTTTGGCTTCTGGGGCCCAGGCACCCTGGTCACCGTCTCCTCA (SEQ ID NO: 66)

>Anti-BTK 545 variable light domain coding sequence (EB0611A-3F7-K2) without leader sequence.
ATCGTGATGACCCAGACTCCATCTTCCAAGTCTGTCCCTGTGGGAGACACAGTCACCATCA
ATTGCCAGGCCAGTGAGAGTGTTTATAGTGACAACCGCTTATCCTGGTTTCAGCAGAAACA
AGGGCAGCCTCCCAAGCTCCTGATCTACCAGGCATCCAAATTGGAAACTGGGGTCCCATC
GCGGTTCAGCGGCAGTGGATCTGGGACACAGTTCACTCTCACCATCAGCGATGTGGTGTG
TGACGATGCTGCCACTTACTACTGTGCAGGATATAAAGGTAGTAGTAGTGATGGCCATGGT
TTCGGCGGAGGGACCGAGGTGGTGGTCAAA (SEQ ID NO: 67)

FIG. 14 cont'd.

>Anti-BTK 545 heavy chain coding sequence (EB0611A-3F7-H2) without leader sequence.
CAGTCGCTGCAGGGGTCCGGGGGAGGCCTGTTCCAGCCTGGGGGATTCCTGGCACTCAC
CTGCAAAGCCTCTGGATTCTCCTTCAGTAGCACGTTCGTGGTGTCCTTGATCCGCCAGGCT
CCAGGGAAGGGGCTGGAGTGGATCGCGTCCATTGATGTTGGTAGTAGTGGTATCACTTAC
TACGCGAGCTGGGCGAAAGGCCGCTTCACCATCTCCAAAACCTCGTCGACCACGGTGACT
CTGCAAATGACCAGTCTGACAGCCGCGGACACGGCCACCTATTTCTGTGCGAGAGGGACC
AACTTTGGCTTCTGGGGCCCAGGCACCCTGGTCACCGTCTCCTCAGGGCAACCTAAGGCT
CCATCAGTCTTCCCACTGGCCCCCTGCTGCGGGGACACACCCAGCTCCACGGTGACCCTG
GGCTGCCTGGTCAAAGGCTACCTCCCGGAGCCAGTGACCGTGACCTGGAACTCGGGCAC
CCTCACCAATGGGGTACGCACCTTCCCGTCCGTCCGGCAGTCCTCAGGCCTCTACTCGCT
GAGCAGCGTGGTGAGCGTGACCTCAAGCAGCCAGCCCGTCACCTGCAACGTGGCCCACC
CAGCCACCAACACCAAAGTGGACAAGACCGTTGCGCCCTCGACATGCAGCAAGCCCATGT
GCCCACCCCCTGAACTCCTGGGGGGACCGTCTGTCTTCATCTTCCCCCCAAAACCCAAGG
ACACCCTCATGATCTCACGCACCCCCGAGGTCACATGCGTGGTGGTGGACGTGAGCCAG
GATGACCCCGAGGTGCAGTTCACATGGTACATAAACAACGAGCAGGTGCGCACCGCCCG
GCCGCCGCTACGGGAGCAGCAGTTCAACAGCACGATCCGCGTGGTCAGCACCCTCCCCA
TCGCGCACCAGGACTGGCTGAGGGGCAAGGAGTTCAAGTGCAAAGTCCACAACAAGGCA
CTCCCGGCCCCCATCGAGAAAACCATCTCCAAAGCCAGAGGGCAGCCCCTGGAGCCGAA
GGTCTACACCATGGGCCCTCCCCGGGAGGAGCTGAGCAGCAGGTCGGTCAGCCTGACCT
GCATGATCAACGGCTTCTACCCTTCCGACATCTCGGTGGAGTGGGAGAAGAACGGGAAGG
CAGAGGACAACTACAAGACCACGCCGGCCGTGCTGGACAGCGACGGCTCCTACTTCCTCT
ACAGCAAGCTCTCAGTGCCCACGAGTGAGTGGCAGCGGGGCGACGTCTTCACCTGCTCC
GTGATGCACGAGGCCTTGCACAACCACTACACGCAGAAGTCCATCTCCCGCTCTCCGGGT
AAATGA (SEQ ID NO: 68)

>Anti-BTK 545 light chain coding sequence (EB0611A-3F7-K2) without leader sequence.
ATCGTGATGACCCAGACTCCATCTTCCAAGTCTGTCCCTGTGGGAGACACAGTCACCATCA
ATTGCCAGGCCAGTGAGAGTGTTTATAGTGACAACCGCTTATCCTGGTTTCAGCAGAAACA
AGGGCAGCCTCCCAAGCTCCTGATCTACCAGGCATCCAAATTGGAAACTGGGGTCCCATC
GCGGTTCAGCGGCAGTGGATCTGGGACACAGTTCACTCTCACCATCAGCGATGTGGTGTG
TGACGATGCTGCCACTTACTACTGTCAGGATATAAAGGTAGTAGTAGTGATGGCCATGGT
TTCGGCGGAGGGACCGAGGTGGTGGTCAAAGGTGATCCAGTTGCACCTACTGTCCTCATC
TTCCCACCAGCTGCTGATCAGGTGGCAACTGGAACAGTCACCATCGTGTGTGTGGCGAAT
AAATACTTTCCCGATGTCACCGTCACCTGGGAGGTGGATGGCACCACCCAAACAACTGGC
ATCGAGAACAGTAAAACACCGCAGAATTCTGCAGATTGTACCTACAACCTCAGCAGCACTC
TGACACTGACCAGCACACAGTACAACAGCCACAAAGAGTACACCTGCAAGGTGACCCAGG
GCACGACCTCAGTCGTCCAGAGCTTCAATAGGGGTGACTGTTAG (SEQ ID NO: 69)

```
                         SEQUENCE LISTING

<160> NUMBER OF SEQ ID NOS: 69

<210> SEQ ID NO 1
<211> LENGTH: 16
<212> TYPE: PRT
<213> ORGANISM: Homo sapiens

<400> SEQUENCE: 1

Leu Ile Tyr Asp Phe Ile Glu Asp Gln Gly Gly Leu Glu Ala Val Arg
1               5                   10                  15

<210> SEQ ID NO 2
<211> LENGTH: 14
<212> TYPE: PRT
<213> ORGANISM: Homo sapiens

<400> SEQUENCE: 2

Tyr Val Leu Asp Asp Glu Tyr Thr Ser Ser Val Gly Ser Lys
1               5                   10

<210> SEQ ID NO 3
<211> LENGTH: 5
<212> TYPE: PRT
<213> ORGANISM: Artificial Sequence
<220> FEATURE:
<223> OTHER INFORMATION: CDRH1 of anti-WASp 289 antibody variable heavy
      (VH) domain

<400> SEQUENCE: 3

Ser Ser Asp Met Thr
1               5

<210> SEQ ID NO 4
<211> LENGTH: 16
<212> TYPE: PRT
<213> ORGANISM: Artificial Sequence
<220> FEATURE:
<223> OTHER INFORMATION: CDRH2 of anti-WASp 289 antibody VH domain

<400> SEQUENCE: 4

Tyr Met Ser Ser Asn Asp Arg Pro Tyr Tyr Ala Ser Trp Ala Asn Gly
1               5                   10                  15

<210> SEQ ID NO 5
<211> LENGTH: 10
<212> TYPE: PRT
<213> ORGANISM: Artificial Sequence
<220> FEATURE:
<223> OTHER INFORMATION: CDRH3 of anti-WASp 289 antibody VH domain

<400> SEQUENCE: 5

Gly Val Leu Gly Thr Arg Ser Ile His Ile
1               5                   10
```

```
<210> SEQ ID NO 6
<211> LENGTH: 13
<212> TYPE: PRT
<213> ORGANISM: Artificial Sequence
<220> FEATURE:
<223> OTHER INFORMATION: CDRL1 of anti-WASp 289 antibody variable light
      (VL) domain

<400> SEQUENCE: 6

Gln Ala Ser Glu Ser Val Tyr Ser Asp Asn Arg Leu Ser
1               5                   10

<210> SEQ ID NO 7
<211> LENGTH: 7
<212> TYPE: PRT
<213> ORGANISM: Artificial Sequence
<220> FEATURE:
<223> OTHER INFORMATION: CDRL2 of anti-WASp 289 antibody VL domain

<400> SEQUENCE: 7

Gly Ala Ser Thr Leu Ala Ser
1               5

<210> SEQ ID NO 8
<211> LENGTH: 12
<212> TYPE: PRT
<213> ORGANISM: Artificial Sequence
<220> FEATURE:
<223> OTHER INFORMATION: CDRL3 of anti-WASp 289 antibody VL domain

<400> SEQUENCE: 8

Ala Gly Tyr Lys Ser Ser Asn Gln Asp Gly Ile Gly
1               5                   10

<210> SEQ ID NO 9
<211> LENGTH: 6
<212> TYPE: PRT
<213> ORGANISM: Artificial Sequence
<220> FEATURE:
<223> OTHER INFORMATION: CDRH1 of anti-BTK 545 antibody VH domain

<400> SEQUENCE: 9

Ser Thr Phe Val Val Ser
1               5

<210> SEQ ID NO 10
<211> LENGTH: 18
<212> TYPE: PRT
<213> ORGANISM: Artificial Sequence
<220> FEATURE:
<223> OTHER INFORMATION: CDRH2 of anti-BTK 545 antibody VH domain

<400> SEQUENCE: 10

Ser Ile Asp Val Gly Ser Ser Gly Ile Thr Tyr Tyr Ala Ser Trp Ala
1               5                   10                  15

Lys Gly

<210> SEQ ID NO 11
<211> LENGTH: 6
<212> TYPE: PRT
<213> ORGANISM: Artificial Sequence
<220> FEATURE:
<223> OTHER INFORMATION: CDRH3 of anti-BTK 545 antibody VH domain

<400> SEQUENCE: 11

Gly Thr Asn Phe Gly Phe
```

<210> SEQ ID NO 12
<211> LENGTH: 13
<212> TYPE: PRT
<213> ORGANISM: Artificial Sequence
<220> FEATURE:
<223> OTHER INFORMATION: CDRL1 of anti-BTK 545 antibody VL domain

<400> SEQUENCE: 12

Gln Ala Ser Glu Ser Val Tyr Ser Asp Asn Arg Leu Ser
1               5                   10

<210> SEQ ID NO 13
<211> LENGTH: 7
<212> TYPE: PRT
<213> ORGANISM: Artificial Sequence
<220> FEATURE:
<223> OTHER INFORMATION: CDRL2 of anti-BTK 545 antibody VL domain

<400> SEQUENCE: 13

Gln Ala Ser Lys Leu Glu Thr
1               5

<210> SEQ ID NO 14
<211> LENGTH: 12
<212> TYPE: PRT
<213> ORGANISM: Artificial Sequence
<220> FEATURE:
<223> OTHER INFORMATION: CDRL3 of anti-BTK 545 antibody VL domain

<400> SEQUENCE: 14

Ala Gly Tyr Lys Gly Ser Ser Ser Asp Gly His Gly
1               5                   10

<210> SEQ ID NO 15
<211> LENGTH: 115
<212> TYPE: PRT
<213> ORGANISM: Artificial Sequence
<220> FEATURE:
<223> OTHER INFORMATION: Anti-WASp 289 VH domain (without leader
      peptide)

<400> SEQUENCE: 15

Gln Ser Val Glu Glu Ser Gly Gly Arg Leu Val Thr Pro Gly Thr Pro
1               5                   10                  15

Leu Thr Leu Thr Cys Thr Val Ser Gly Phe Ser Leu Ser Ser Ser Asp
                20                  25                  30

Met Thr Trp Val Arg Gln Ala Pro Gly Lys Gly Leu Glu Tyr Ile Gly
            35                  40                  45

Tyr Met Ser Ser Asn Asp Arg Pro Tyr Tyr Ala Ser Trp Ala Asn Gly
    50                  55                  60

Arg Phe Thr Ile Ser Lys Thr Ser Thr Thr Val Thr Leu Lys Ile Thr
65                  70                  75                  80

Ser Pro Thr Thr Glu Asp Thr Ala Thr Tyr Phe Cys Cys Arg Gly Val
                85                  90                  95

Leu Gly Thr Arg Ser Ile His Ile Trp Gly Pro Gly Thr Leu Val Thr
            100                 105                 110

Val Ser Leu
        115

<210> SEQ ID NO 16
<211> LENGTH: 111

```
<212> TYPE: PRT
<213> ORGANISM: Artificial Sequence
<220> FEATURE:
<223> OTHER INFORMATION: Anti-WASp 289 VL domain (without leader
      peptide)

<400> SEQUENCE: 16

Ile Val Met Thr Gln Thr Pro Ser Pro Val Ser Ala Ala Val Gly Gly
1               5                   10                  15

Thr Val Thr Ile Asn Cys Gln Ala Ser Glu Ser Val Tyr Ser Asp Asn
            20                  25                  30

Arg Leu Ser Trp Tyr Gln Gln Lys Pro Gly Gln Pro Pro Lys Gln Leu
        35                  40                  45

Ile Tyr Gly Ala Ser Thr Leu Ala Ser Glu Val Ser Ser Arg Phe Lys
50                  55                  60

Gly Ser Gly Ser Gly Thr Gln Phe Thr Leu Thr Ile Asn Asp Val Val
65                  70                  75                  80

Cys Asp Asp Ala Ala Thr Tyr Tyr Cys Ala Gly Tyr Lys Ser Ser Asn
                85                  90                  95

Gln Asp Gly Ile Gly Phe Gly Gly Thr Glu Val Val Val Lys
            100                 105                 110

<210> SEQ ID NO 17
<211> LENGTH: 438
<212> TYPE: PRT
<213> ORGANISM: Artificial Sequence
<220> FEATURE:
<223> OTHER INFORMATION: Anti-WASp 289 antibody heavy chain (without
      leader peptide)

<400> SEQUENCE: 17

Gln Ser Val Glu Glu Ser Gly Gly Arg Leu Val Thr Pro Gly Thr Pro
1               5                   10                  15

Leu Thr Leu Thr Cys Thr Val Ser Gly Phe Ser Leu Ser Ser Ser Asp
            20                  25                  30

Met Thr Trp Val Arg Gln Ala Pro Gly Lys Gly Leu Glu Tyr Ile Gly
        35                  40                  45

Tyr Met Ser Ser Asn Asp Arg Pro Tyr Tyr Ala Ser Trp Ala Asn Gly
50                  55                  60

Arg Phe Thr Ile Ser Lys Thr Ser Thr Thr Val Thr Leu Lys Ile Thr
65                  70                  75                  80

Ser Pro Thr Thr Glu Asp Thr Ala Thr Tyr Phe Cys Cys Arg Gly Val
                85                  90                  95

Leu Gly Thr Arg Ser Ile His Ile Trp Gly Pro Gly Thr Leu Val Thr
            100                 105                 110

Val Ser Leu Gly Gln Pro Lys Ala Pro Ser Val Phe Pro Leu Ala Pro
        115                 120                 125

Cys Cys Gly Asp Thr Pro Ser Ser Thr Val Thr Leu Gly Cys Leu Val
130                 135                 140

Lys Gly Tyr Leu Pro Glu Pro Val Thr Val Thr Trp Asn Ser Gly Thr
145                 150                 155                 160

Leu Thr Asn Gly Val Arg Thr Phe Pro Ser Val Arg Gln Ser Ser Gly
                165                 170                 175

Leu Tyr Ser Leu Ser Ser Val Val Ser Val Thr Ser Ser Ser Gln Pro
            180                 185                 190

Val Thr Cys Asn Val Ala His Pro Ala Thr Asn Thr Lys Val Asp Lys
        195                 200                 205
```

```
Thr Val Ala Pro Ser Thr Cys Ser Lys Pro Met Cys Pro Pro Glu
        210                 215                 220

Leu Leu Gly Gly Pro Ser Val Phe Ile Phe Pro Pro Lys Pro Lys Asp
225                 230                 235                 240

Thr Leu Met Ile Ser Arg Thr Pro Glu Val Thr Cys Val Val Asp
                245                 250                 255

Val Ser Gln Asp Asp Pro Glu Val Gln Phe Thr Trp Tyr Ile Asn Asn
            260                 265                 270

Glu Gln Val Arg Thr Ala Arg Pro Pro Leu Arg Glu Gln Gln Phe Asn
        275                 280                 285

Ser Thr Ile Arg Val Val Ser Thr Leu Pro Ile Ala His Gln Asp Trp
    290                 295                 300

Leu Arg Gly Lys Glu Phe Lys Cys Lys Val His Asn Lys Ala Leu Pro
305                 310                 315                 320

Ala Pro Ile Glu Lys Thr Ile Ser Lys Ala Arg Gly Gln Pro Leu Glu
                325                 330                 335

Pro Lys Val Tyr Thr Met Gly Pro Pro Arg Glu Glu Leu Ser Ser Arg
            340                 345                 350

Ser Val Ser Leu Thr Cys Met Ile Asn Gly Phe Tyr Pro Ser Asp Ile
        355                 360                 365

Ser Val Glu Trp Glu Lys Asn Gly Lys Ala Glu Asp Asn Tyr Lys Thr
370                 375                 380

Thr Pro Ala Val Leu Asp Ser Asp Gly Ser Tyr Phe Leu Tyr Ser Lys
385                 390                 395                 400

Leu Ser Val Pro Thr Ser Glu Trp Gln Arg Gly Asp Val Phe Thr Cys
                405                 410                 415

Ser Val Met His Glu Ala Leu His Asn His Tyr Thr Gln Lys Ser Ile
            420                 425                 430

Ser Arg Ser Pro Gly Lys
            435

<210> SEQ ID NO 18
<211> LENGTH: 215
<212> TYPE: PRT
<213> ORGANISM: Artificial Sequence
<220> FEATURE:
<223> OTHER INFORMATION: Anti-WASp 289 antibody light chain (without
      leader peptide)
<220> FEATURE:
<221> NAME/KEY: misc_feature
<222> LOCATION: (208)..(208)
<223> OTHER INFORMATION: Xaa can be any naturally occurring amino acid

<400> SEQUENCE: 18

Ile Val Met Thr Gln Thr Pro Ser Pro Val Ser Ala Ala Val Gly Gly
1               5                   10                  15

Thr Val Thr Ile Asn Cys Gln Ala Ser Glu Ser Val Tyr Ser Asp Asn
            20                  25                  30

Arg Leu Ser Trp Tyr Gln Gln Lys Pro Gly Gln Pro Pro Lys Gln Leu
        35                  40                  45

Ile Tyr Gly Ala Ser Thr Leu Ala Ser Glu Val Ser Ser Arg Phe Lys
50                  55                  60

Gly Ser Gly Ser Gly Thr Gln Phe Thr Leu Thr Ile Asn Asp Val Val
65                  70                  75                  80

Cys Asp Asp Ala Ala Thr Tyr Tyr Cys Ala Gly Tyr Lys Ser Ser Asn
                85                  90                  95

Gln Asp Gly Ile Gly Phe Gly Gly Gly Thr Glu Val Val Val Lys Gly
```

```
            100                 105                 110
Asp Pro Val Ala Pro Thr Val Leu Ile Phe Pro Pro Ser Ala Asp Leu
        115                 120                 125

Val Ala Thr Gly Thr Val Thr Ile Val Cys Val Ala Asn Lys Tyr Phe
130                 135                 140

Pro Asp Val Thr Val Thr Trp Glu Val Asp Gly Thr Thr Gln Thr Thr
145                 150                 155                 160

Gly Ile Glu Asn Ser Lys Thr Pro Gln Asn Ser Ala Asp Cys Thr Tyr
            165                 170                 175

Asn Leu Ser Ser Thr Leu Thr Leu Thr Ser Thr Gln Tyr Asn Ser His
            180                 185                 190

Lys Glu Tyr Thr Cys Lys Val Thr Gln Gly Thr Thr Ser Val Val Xaa
            195                 200                 205

Ser Phe Asn Arg Gly Asp Cys
            210                 215

<210> SEQ ID NO 19
<211> LENGTH: 134
<212> TYPE: PRT
<213> ORGANISM: Artificial Sequence
<220> FEATURE:
<223> OTHER INFORMATION: Anti-WASp 289 VH domain (with leader peptide)

<400> SEQUENCE: 19

Met Glu Thr Gly Leu Arg Trp Leu Leu Leu Val Ala Val Leu Lys Gly
1               5                   10                  15

Val Gln Cys Gln Ser Val Glu Glu Ser Gly Gly Arg Leu Val Thr Pro
            20                  25                  30

Gly Thr Pro Leu Thr Leu Thr Cys Thr Val Ser Gly Phe Ser Leu Ser
        35                  40                  45

Ser Ser Asp Met Thr Trp Val Arg Gln Ala Pro Gly Lys Gly Leu Glu
    50                  55                  60

Tyr Ile Gly Tyr Met Ser Ser Asn Asp Arg Pro Tyr Tyr Ala Ser Trp
65                  70                  75                  80

Ala Asn Gly Arg Phe Thr Ile Ser Lys Thr Ser Thr Thr Val Thr Leu
                85                  90                  95

Lys Ile Thr Ser Pro Thr Thr Glu Asp Thr Ala Thr Tyr Phe Cys Cys
            100                 105                 110

Arg Gly Val Leu Gly Thr Arg Ser Ile His Ile Trp Gly Pro Gly Thr
        115                 120                 125

Leu Val Thr Val Ser Leu
    130

<210> SEQ ID NO 20
<211> LENGTH: 134
<212> TYPE: PRT
<213> ORGANISM: Artificial Sequence
<220> FEATURE:
<223> OTHER INFORMATION: Anti-WASp 289 VL domain (with leader peptide)

<400> SEQUENCE: 20

Met Asp Thr Arg Ala Pro Thr Gln Leu Leu Gly Leu Leu Leu Leu Trp
1               5                   10                  15

Leu Pro Gly Ala Thr Phe Ala Ile Val Met Thr Gln Thr Pro Ser Pro
            20                  25                  30

Val Ser Ala Ala Val Gly Gly Thr Val Thr Ile Asn Cys Gln Ala Ser
        35                  40                  45
```

Glu Ser Val Tyr Ser Asp Asn Arg Leu Ser Trp Tyr Gln Gln Lys Pro
 50                  55                  60

Gly Gln Pro Pro Lys Gln Leu Ile Tyr Gly Ala Ser Thr Leu Ala Ser
 65                  70                  75                  80

Glu Val Ser Ser Arg Phe Lys Gly Ser Gly Ser Gly Thr Gln Phe Thr
                 85                  90                  95

Leu Thr Ile Asn Asp Val Val Cys Asp Asp Ala Ala Thr Tyr Tyr Cys
                100                 105                 110

Ala Gly Tyr Lys Ser Ser Asn Gln Asp Gly Ile Gly Phe Gly Gly Gly
            115                 120                 125

Thr Glu Val Val Val Lys
    130

<210> SEQ ID NO 21
<211> LENGTH: 457
<212> TYPE: PRT
<213> ORGANISM: Artificial Sequence
<220> FEATURE:
<223> OTHER INFORMATION: Anti-WASp 289 antibody heavy chain (with leader
      peptide)

<400> SEQUENCE: 21

Met Glu Thr Gly Leu Arg Trp Leu Leu Leu Val Ala Val Leu Lys Gly
 1               5                  10                  15

Val Gln Cys Gln Ser Val Glu Leu Ser Gly Gly Arg Leu Val Thr Pro
                 20                  25                  30

Gly Thr Pro Leu Thr Leu Thr Cys Thr Val Ser Gly Phe Ser Leu Ser
             35                  40                  45

Ser Ser Asp Met Thr Trp Val Arg Gln Ala Pro Gly Lys Gly Leu Glu
 50                  55                  60

Tyr Ile Gly Tyr Met Ser Ser Asn Asp Arg Pro Tyr Tyr Ala Ser Trp
 65                  70                  75                  80

Ala Asn Gly Arg Phe Thr Ile Ser Lys Thr Ser Thr Thr Val Thr Leu
                 85                  90                  95

Lys Ile Thr Ser Pro Thr Thr Glu Asp Thr Ala Thr Tyr Phe Cys Cys
                100                 105                 110

Arg Gly Val Leu Gly Thr Arg Ser Ile His Ile Trp Gly Pro Gly Thr
            115                 120                 125

Leu Val Thr Val Ser Leu Gly Gln Pro Lys Ala Pro Ser Val Phe Pro
130                 135                 140

Leu Ala Pro Cys Cys Gly Asp Thr Pro Ser Ser Thr Val Thr Leu Gly
145                 150                 155                 160

Cys Leu Val Lys Gly Tyr Leu Pro Glu Pro Val Thr Val Thr Trp Asn
                165                 170                 175

Ser Gly Thr Leu Thr Asn Gly Val Arg Thr Phe Pro Ser Val Arg Gln
            180                 185                 190

Ser Ser Gly Leu Tyr Ser Leu Ser Ser Val Val Ser Val Thr Ser Ser
        195                 200                 205

Ser Gln Pro Val Thr Cys Asn Val Ala His Pro Ala Thr Asn Thr Lys
    210                 215                 220

Val Asp Lys Thr Val Ala Pro Ser Thr Cys Ser Lys Pro Met Cys Pro
225                 230                 235                 240

Pro Pro Glu Leu Leu Gly Gly Pro Ser Val Phe Ile Phe Pro Pro Lys
                245                 250                 255

Pro Lys Asp Thr Leu Met Ile Ser Arg Thr Pro Glu Val Thr Cys Val
            260                 265                 270

```
Val Val Asp Val Ser Gln Asp Pro Glu Val Gln Phe Thr Trp Tyr
            275                 280                 285

Ile Asn Asn Glu Gln Val Arg Thr Ala Arg Pro Pro Leu Arg Glu Gln
            290                 295                 300

Gln Phe Asn Ser Thr Ile Arg Val Val Ser Thr Leu Pro Ile Ala His
305                 310                 315                 320

Gln Asp Trp Leu Arg Gly Lys Glu Phe Lys Cys Lys Val His Asn Lys
                325                 330                 335

Ala Leu Pro Ala Pro Ile Glu Lys Thr Ile Ser Lys Ala Arg Gly Gln
                340                 345                 350

Pro Leu Glu Pro Lys Val Tyr Thr Met Gly Pro Pro Arg Glu Glu Leu
                355                 360                 365

Ser Ser Arg Ser Val Ser Leu Thr Cys Met Ile Asn Gly Phe Tyr Pro
            370                 375                 380

Ser Asp Ile Ser Val Glu Trp Glu Lys Asn Gly Lys Ala Glu Asp Asn
385                 390                 395                 400

Tyr Lys Thr Thr Pro Ala Val Leu Asp Ser Asp Gly Ser Tyr Phe Leu
                405                 410                 415

Tyr Ser Lys Leu Ser Val Pro Thr Ser Glu Trp Gln Arg Gly Asp Val
                420                 425                 430

Phe Thr Cys Ser Val Met His Glu Ala Leu His Asn His Tyr Thr Gln
                435                 440                 445

Lys Ser Ile Ser Arg Ser Pro Gly Lys
                450                 455

<210> SEQ ID NO 22
<211> LENGTH: 238
<212> TYPE: PRT
<213> ORGANISM: Artificial Sequence
<220> FEATURE:
<223> OTHER INFORMATION: Anti-WASp 289 antibody light chain (with leader
      peptide)
<220> FEATURE:
<221> NAME/KEY: misc_feature
<222> LOCATION: (231)..(231)
<223> OTHER INFORMATION: Xaa can be any naturally occurring amino acid

<400> SEQUENCE: 22

Met Asp Thr Arg Ala Pro Thr Gln Leu Leu Gly Leu Leu Leu Leu Trp
1               5                   10                  15

Leu Pro Gly Ala Thr Phe Ala Ile Val Met Thr Gln Thr Pro Ser Pro
                20                  25                  30

Val Ser Ala Ala Val Gly Gly Thr Val Thr Ile Asn Cys Gln Ala Ser
            35                  40                  45

Glu Ser Val Tyr Ser Asp Asn Arg Leu Ser Trp Tyr Gln Gln Lys Pro
50                  55                  60

Gly Gln Pro Pro Lys Gln Leu Ile Tyr Gly Ala Ser Thr Leu Ala Ser
65                  70                  75                  80

Glu Val Ser Ser Arg Phe Lys Gly Ser Gly Ser Gly Thr Gln Phe Thr
                85                  90                  95

Leu Thr Ile Asn Asp Val Val Cys Asp Asp Ala Ala Thr Tyr Tyr Cys
                100                 105                 110

Ala Gly Tyr Lys Ser Ser Asn Gln Asp Gly Ile Gly Phe Gly Gly Gly
            115                 120                 125

Thr Glu Val Val Val Lys Gly Asp Pro Val Ala Pro Thr Val Leu Ile
            130                 135                 140
```

```
Phe Pro Pro Ser Ala Asp Leu Val Ala Thr Gly Thr Val Thr Ile Val
145                 150                 155                 160

Cys Val Ala Asn Lys Tyr Phe Pro Asp Val Thr Val Thr Trp Glu Val
                165                 170                 175

Asp Gly Thr Thr Gln Thr Thr Gly Ile Glu Asn Ser Lys Thr Pro Gln
            180                 185                 190

Asn Ser Ala Asp Cys Thr Tyr Asn Leu Ser Ser Thr Leu Thr Leu Thr
        195                 200                 205

Ser Thr Gln Tyr Asn Ser His Lys Glu Tyr Thr Cys Lys Val Thr Gln
    210                 215                 220

Gly Thr Thr Ser Val Val Xaa Ser Phe Asn Arg Gly Asp Cys
225                 230                 235
```

<210> SEQ ID NO 23
<211> LENGTH: 115
<212> TYPE: PRT
<213> ORGANISM: Artificial Sequence
<220> FEATURE:
<223> OTHER INFORMATION: Anti-BTK 545 VH domain (without leader peptide)

<400> SEQUENCE: 23

```
Gln Ser Leu Gln Gly Ser Gly Gly Gly Leu Phe Gln Pro Gly Gly Phe
1               5                   10                  15

Leu Ala Leu Thr Cys Lys Ala Ser Gly Phe Ser Phe Ser Ser Thr Phe
            20                  25                  30

Val Val Ser Leu Ile Arg Gln Ala Pro Gly Lys Gly Leu Glu Trp Ile
        35                  40                  45

Ala Ser Ile Asp Val Gly Ser Ser Gly Ile Thr Tyr Tyr Ala Ser Trp
50                  55                  60

Ala Lys Gly Arg Phe Thr Ile Ser Lys Thr Ser Ser Thr Thr Val Thr
65                  70                  75                  80

Leu Gln Met Thr Ser Leu Thr Ala Ala Asp Thr Ala Thr Tyr Phe Cys
                85                  90                  95

Ala Arg Gly Thr Asn Phe Gly Phe Trp Gly Pro Gly Thr Leu Val Thr
            100                 105                 110

Val Ser Ser
        115
```

<210> SEQ ID NO 24
<211> LENGTH: 111
<212> TYPE: PRT
<213> ORGANISM: Artificial Sequence
<220> FEATURE:
<223> OTHER INFORMATION: Anti-BTK 545 VL domain (without leader peptide)

<400> SEQUENCE: 24

```
Ile Val Met Thr Gln Thr Pro Ser Ser Lys Ser Val Pro Val Gly Asp
1               5                   10                  15

Thr Val Thr Ile Asn Cys Gln Ala Ser Glu Ser Val Tyr Ser Asp Asn
            20                  25                  30

Arg Leu Ser Trp Phe Gln Gln Lys Gln Gly Gln Pro Pro Lys Leu Leu
        35                  40                  45

Ile Tyr Gln Ala Ser Lys Leu Glu Thr Gly Val Pro Ser Arg Phe Ser
50                  55                  60

Gly Ser Gly Ser Gly Thr Gln Phe Thr Leu Thr Ile Ser Asp Val Val
65                  70                  75                  80

Cys Asp Asp Ala Ala Thr Tyr Tyr Cys Ala Gly Tyr Lys Gly Ser Ser
                85                  90                  95
```

Ser Asp Gly His Gly Phe Gly Gly Thr Glu Val Val Lys
            100                 105                 110

<210> SEQ ID NO 25
<211> LENGTH: 438
<212> TYPE: PRT
<213> ORGANISM: Artificial Sequence
<220> FEATURE:
<223> OTHER INFORMATION: Anti-BTK 545 antibody heavy chain (without
      leader peptide)

<400> SEQUENCE: 25

Gln Ser Leu Gln Gly Ser Gly Gly Leu Phe Gln Pro Gly Gly Phe
1               5                   10                  15

Leu Ala Leu Thr Cys Lys Ala Ser Gly Phe Ser Phe Ser Thr Phe
                20                  25                  30

Val Val Ser Leu Ile Arg Gln Ala Pro Gly Lys Gly Leu Glu Trp Ile
            35                  40                  45

Ala Ser Ile Asp Val Gly Ser Ser Gly Ile Thr Tyr Tyr Ala Ser Trp
50                  55                  60

Ala Lys Gly Arg Phe Thr Ile Ser Lys Thr Ser Ser Thr Thr Val Thr
65                  70                  75                  80

Leu Gln Met Thr Ser Leu Thr Ala Ala Asp Thr Ala Thr Tyr Phe Cys
                85                  90                  95

Ala Arg Gly Thr Asn Phe Gly Phe Trp Gly Pro Gly Thr Leu Val Thr
                100                 105                 110

Val Ser Ser Gly Gln Pro Lys Ala Pro Ser Val Phe Pro Leu Ala Pro
            115                 120                 125

Cys Cys Gly Asp Thr Pro Ser Ser Thr Val Thr Leu Gly Cys Leu Val
130                 135                 140

Lys Gly Tyr Leu Pro Glu Pro Val Thr Val Thr Trp Asn Ser Gly Thr
145                 150                 155                 160

Leu Thr Asn Gly Val Arg Thr Phe Pro Ser Val Arg Gln Ser Ser Gly
                165                 170                 175

Leu Tyr Ser Leu Ser Ser Val Val Ser Val Thr Ser Ser Ser Gln Pro
                180                 185                 190

Val Thr Cys Asn Val Ala His Pro Ala Thr Asn Thr Lys Val Asp Lys
            195                 200                 205

Thr Val Ala Pro Ser Thr Cys Ser Lys Pro Met Cys Pro Pro Pro Glu
210                 215                 220

Leu Leu Gly Gly Pro Ser Val Phe Ile Phe Pro Pro Lys Pro Lys Asp
225                 230                 235                 240

Thr Leu Met Ile Ser Arg Thr Pro Glu Val Thr Cys Val Val Val Asp
                245                 250                 255

Val Ser Gln Asp Asp Pro Glu Val Gln Phe Thr Trp Tyr Ile Asn Asn
            260                 265                 270

Glu Gln Val Arg Thr Ala Arg Pro Pro Leu Arg Glu Gln Gln Phe Asn
                275                 280                 285

Ser Thr Ile Arg Val Val Ser Thr Leu Pro Ile Ala His Gln Asp Trp
            290                 295                 300

Leu Arg Gly Lys Glu Phe Lys Cys Lys Val His Asn Lys Ala Leu Pro
305                 310                 315                 320

Ala Pro Ile Glu Lys Thr Ile Ser Lys Ala Arg Gly Gln Pro Leu Glu
                325                 330                 335

Pro Lys Val Tyr Thr Met Gly Pro Pro Arg Glu Glu Leu Ser Ser Arg

```
                340             345             350
Ser Val Ser Leu Thr Cys Met Ile Asn Gly Phe Tyr Pro Ser Asp Ile
            355                 360                 365

Ser Val Glu Trp Glu Lys Asn Gly Lys Ala Glu Asp Asn Tyr Lys Thr
            370                 375                 380

Thr Pro Ala Val Leu Asp Ser Asp Gly Ser Tyr Phe Leu Tyr Ser Lys
385                 390                 395                 400

Leu Ser Val Pro Thr Ser Glu Trp Gln Arg Gly Asp Val Phe Thr Cys
                405                 410                 415

Ser Val Met His Glu Ala Leu His Asn His Tyr Thr Gln Lys Ser Ile
            420                 425                 430

Ser Arg Ser Pro Gly Lys
            435

<210> SEQ ID NO 26
<211> LENGTH: 215
<212> TYPE: PRT
<213> ORGANISM: Artificial Sequence
<220> FEATURE:
<223> OTHER INFORMATION: Anti-BTK 545 antibody light chain (without
      leader peptide)

<400> SEQUENCE: 26

Ile Val Met Thr Gln Thr Pro Ser Ser Lys Ser Val Pro Val Gly Asp
1               5                   10                  15

Thr Val Thr Ile Asn Cys Gln Ala Ser Glu Ser Val Tyr Ser Asp Asn
            20                  25                  30

Arg Leu Ser Trp Phe Gln Gln Lys Gln Gly Gln Pro Pro Lys Leu Leu
        35                  40                  45

Ile Tyr Gln Ala Ser Lys Leu Glu Thr Gly Val Pro Ser Arg Phe Ser
    50                  55                  60

Gly Ser Gly Ser Gly Thr Gln Phe Thr Leu Thr Ile Ser Asp Val Val
65                  70                  75                  80

Cys Asp Asp Ala Ala Thr Tyr Tyr Cys Ala Gly Tyr Lys Gly Ser Ser
                85                  90                  95

Ser Asp Gly His Gly Phe Gly Gly Thr Glu Val Val Val Lys Gly
            100                 105                 110

Asp Pro Val Ala Pro Thr Val Leu Ile Phe Pro Pro Ala Ala Asp Gln
        115                 120                 125

Val Ala Thr Gly Thr Val Thr Ile Val Cys Val Ala Asn Lys Tyr Phe
130                 135                 140

Pro Asp Val Thr Val Thr Trp Glu Val Asp Gly Thr Thr Gln Thr Thr
145                 150                 155                 160

Gly Ile Glu Asn Ser Lys Thr Pro Gln Asn Ser Ala Asp Cys Thr Tyr
                165                 170                 175

Asn Leu Ser Ser Thr Leu Thr Leu Thr Ser Thr Gln Tyr Asn Ser His
            180                 185                 190

Lys Glu Tyr Thr Cys Lys Val Thr Gln Gly Thr Thr Ser Val Val Gln
        195                 200                 205

Ser Phe Asn Arg Gly Asp Cys
    210                 215

<210> SEQ ID NO 27
<211> LENGTH: 134
<212> TYPE: PRT
<213> ORGANISM: Artificial Sequence
<220> FEATURE:
```

<223> OTHER INFORMATION: Anti-BTK 545 VH domain (with leader peptide)

<400> SEQUENCE: 27

Met Glu Thr Gly Leu Arg Trp Leu Leu Leu Val Ala Val Leu Lys Gly
1               5                   10                  15

Val Arg Cys Gln Ser Leu Gln Gly Ser Gly Gly Leu Phe Gln Pro
            20                  25                  30

Gly Gly Phe Leu Ala Leu Thr Cys Lys Ala Ser Gly Phe Ser Phe Ser
        35                  40                  45

Ser Thr Phe Val Val Ser Leu Ile Arg Gln Ala Pro Gly Lys Gly Leu
    50                  55                  60

Glu Trp Ile Ala Ser Ile Asp Val Gly Ser Ser Gly Ile Thr Tyr Tyr
65                  70                  75                  80

Ala Ser Trp Ala Lys Gly Arg Phe Thr Ile Ser Lys Thr Ser Ser Thr
                85                  90                  95

Thr Val Thr Leu Gln Met Thr Ser Leu Thr Ala Ala Asp Thr Ala Thr
            100                 105                 110

Tyr Phe Cys Ala Arg Gly Thr Asn Phe Gly Phe Trp Gly Pro Gly Thr
        115                 120                 125

Leu Val Thr Val Ser Ser
    130

<210> SEQ ID NO 28
<211> LENGTH: 134
<212> TYPE: PRT
<213> ORGANISM: Artificial Sequence
<220> FEATURE:
<223> OTHER INFORMATION: Anti-BTK 545 VL domain (with leader peptide)

<400> SEQUENCE: 28

Met Asp Thr Arg Ala Pro Thr Gln Leu Leu Gly Leu Leu Leu Leu Trp
1               5                   10                  15

Leu Pro Gly Ala Thr Phe Ala Ile Val Met Thr Gln Thr Pro Ser Ser
            20                  25                  30

Lys Ser Val Pro Val Gly Asp Thr Val Thr Ile Asn Cys Gln Ala Ser
        35                  40                  45

Glu Ser Val Tyr Ser Asp Asn Arg Leu Ser Trp Phe Gln Gln Lys Gln
    50                  55                  60

Gly Gln Pro Pro Lys Leu Leu Ile Tyr Gln Ala Ser Lys Leu Glu Thr
65                  70                  75                  80

Gly Val Pro Ser Arg Phe Ser Gly Ser Gly Ser Gly Thr Gln Phe Thr
                85                  90                  95

Leu Thr Ile Ser Asp Val Val Cys Asp Asp Ala Ala Thr Tyr Tyr Cys
            100                 105                 110

Ala Gly Tyr Lys Gly Ser Ser Ser Asp Gly His Gly Phe Gly Gly Gly
        115                 120                 125

Thr Glu Val Val Val Lys
    130

<210> SEQ ID NO 29
<211> LENGTH: 457
<212> TYPE: PRT
<213> ORGANISM: Artificial Sequence
<220> FEATURE:
<223> OTHER INFORMATION: Anti-BTK 545 antibody heavy chain (with leader
      peptide)

<400> SEQUENCE: 29

```
Met Glu Thr Gly Leu Arg Trp Leu Leu Leu Val Ala Val Leu Lys Gly
1               5                   10                  15

Val Arg Cys Gln Ser Leu Gln Gly Ser Gly Gly Leu Phe Gln Pro
            20                  25                  30

Gly Gly Phe Leu Ala Leu Thr Cys Lys Ala Ser Gly Phe Ser Phe Ser
                35                  40                  45

Ser Thr Phe Val Val Ser Leu Ile Arg Gln Ala Pro Gly Lys Gly Leu
    50                  55                  60

Glu Trp Ile Ala Ser Ile Asp Val Gly Ser Ser Gly Ile Thr Tyr Tyr
65                  70                  75                  80

Ala Ser Trp Ala Lys Gly Arg Phe Thr Ile Ser Lys Thr Ser Ser Thr
                85                  90                  95

Thr Val Thr Leu Gln Met Thr Ser Leu Thr Ala Ala Asp Thr Ala Thr
                100                 105                 110

Tyr Phe Cys Ala Arg Gly Thr Asn Phe Gly Phe Trp Gly Pro Gly Thr
            115                 120                 125

Leu Val Thr Val Ser Ser Gly Gln Pro Lys Ala Pro Ser Val Phe Pro
    130                 135                 140

Leu Ala Pro Cys Cys Gly Asp Thr Pro Ser Ser Thr Val Thr Leu Gly
145                 150                 155                 160

Cys Leu Val Lys Gly Tyr Leu Pro Glu Pro Val Thr Val Thr Trp Asn
                165                 170                 175

Ser Gly Thr Leu Thr Asn Gly Val Arg Thr Phe Pro Ser Val Arg Gln
            180                 185                 190

Ser Ser Gly Leu Tyr Ser Leu Ser Ser Val Val Ser Val Thr Ser Ser
            195                 200                 205

Ser Gln Pro Val Thr Cys Asn Val Ala His Pro Ala Thr Asn Thr Lys
    210                 215                 220

Val Asp Lys Thr Val Ala Pro Ser Thr Cys Ser Lys Pro Met Cys Pro
225                 230                 235                 240

Pro Pro Glu Leu Leu Gly Gly Pro Ser Val Phe Ile Phe Pro Pro Lys
                245                 250                 255

Pro Lys Asp Thr Leu Met Ile Ser Arg Thr Pro Glu Val Thr Cys Val
            260                 265                 270

Val Val Asp Val Ser Gln Asp Asp Pro Glu Val Gln Phe Thr Trp Tyr
    275                 280                 285

Ile Asn Asn Glu Gln Val Arg Thr Ala Arg Pro Pro Leu Arg Glu Gln
290                 295                 300

Gln Phe Asn Ser Thr Ile Arg Val Val Ser Thr Leu Pro Ile Ala His
305                 310                 315                 320

Gln Asp Trp Leu Arg Gly Lys Glu Phe Lys Cys Lys Val His Asn Lys
                325                 330                 335

Ala Leu Pro Ala Pro Ile Glu Lys Thr Ile Ser Lys Ala Arg Gly Gln
            340                 345                 350

Pro Leu Glu Pro Lys Val Tyr Thr Met Gly Pro Arg Glu Glu Leu
    355                 360                 365

Ser Ser Arg Ser Val Ser Leu Thr Cys Met Ile Asn Gly Phe Tyr Pro
    370                 375                 380

Ser Asp Ile Ser Val Glu Trp Glu Lys Asn Gly Lys Ala Glu Asp Asn
385                 390                 395                 400

Tyr Lys Thr Thr Pro Ala Val Leu Asp Ser Asp Gly Ser Tyr Phe Leu
                405                 410                 415

Tyr Ser Lys Leu Ser Val Pro Thr Ser Glu Trp Gln Arg Gly Asp Val
```

```
                     420             425             430
Phe Thr Cys Ser Val Met His Glu Ala Leu His Asn His Tyr Thr Gln
            435                 440                 445
Lys Ser Ile Ser Arg Ser Pro Gly Lys
        450                 455

<210> SEQ ID NO 30
<211> LENGTH: 238
<212> TYPE: PRT
<213> ORGANISM: Artificial Sequence
<220> FEATURE:
<223> OTHER INFORMATION: Anti-BTK 545 antibody light chain (with leader
      peptide)

<400> SEQUENCE: 30

Met Asp Thr Arg Ala Pro Thr Gln Leu Leu Gly Leu Leu Leu Leu Trp
1               5                   10                  15
Leu Pro Gly Ala Thr Phe Ala Ile Val Met Thr Gln Thr Pro Ser Ser
                20                  25                  30
Lys Ser Val Pro Val Gly Asp Thr Val Thr Ile Asn Cys Gln Ala Ser
            35                  40                  45
Glu Ser Val Tyr Ser Asp Asn Arg Leu Ser Trp Phe Gln Gln Lys Gln
        50                  55                  60
Gly Gln Pro Pro Lys Leu Leu Ile Tyr Gln Ala Ser Lys Leu Glu Thr
65                  70                  75                  80
Gly Val Pro Ser Arg Phe Ser Gly Ser Gly Ser Gly Thr Gln Phe Thr
                85                  90                  95
Leu Thr Ile Ser Asp Val Val Cys Asp Asp Ala Ala Thr Tyr Tyr Cys
            100                 105                 110
Ala Gly Tyr Lys Gly Ser Ser Asp Gly His Gly Phe Gly Gly Gly
        115                 120                 125
Thr Glu Val Val Val Lys Gly Asp Pro Val Ala Pro Thr Val Leu Ile
130                 135                 140
Phe Pro Pro Ala Ala Asp Gln Val Ala Thr Gly Thr Val Thr Ile Val
145                 150                 155                 160
Cys Val Ala Asn Lys Tyr Phe Pro Asp Val Thr Val Thr Trp Glu Val
                165                 170                 175
Asp Gly Thr Thr Gln Thr Thr Gly Ile Glu Asn Ser Lys Thr Pro Gln
            180                 185                 190
Asn Ser Ala Asp Cys Thr Tyr Asn Leu Ser Ser Thr Leu Thr Leu Thr
        195                 200                 205
Ser Thr Gln Tyr Asn Ser His Lys Glu Tyr Thr Cys Lys Val Thr Gln
    210                 215                 220
Gly Thr Thr Ser Val Val Gln Ser Phe Asn Arg Gly Asp Cys
225                 230                 235

<210> SEQ ID NO 31
<211> LENGTH: 402
<212> TYPE: DNA
<213> ORGANISM: Artificial Sequence
<220> FEATURE:
<223> OTHER INFORMATION: Anti-WASp 289 variable heavy domain coding
      sequence (EB0610A-9G7-H1) with leader sequence

<400> SEQUENCE: 31
atggagactg ggctgcgctg gcttctcctg gtcgctgtgc tcaaaggtgt ccagtgtcag      60
tcagtggagg agtccggggg tcgcctggtc acgcctggga caccctgac actcacctgc      120
```

```
accgtctctg gattctccct cagcagctcc gacatgacct gggtccgcca ggctccaggg      180
aaggggctgg aatacatcgg atacatgagt agtaatgata ggccatacta cgcgagctgg      240
gcaaatggtc gattcaccat ctccaaaacc tcgaccacgg tgactctgaa atcaccagt       300 ccgacaaccg aggacacggc cacctatttc tgttgtagag gtgttcttgg tactaggtcg      360
attcacatct ggggcccagg caccctggtc accgtctcct ta                         402
```

<210> SEQ ID NO 32
<211> LENGTH: 402
<212> TYPE: DNA
<213> ORGANISM: Artificial Sequence
<220> FEATURE:
<223> OTHER INFORMATION: Anti-WASp 289 variable light domain coding
      sequence (EB0610A-9G7-K1) with leader sequence

<400> SEQUENCE: 32

```
atggacacga gggcccccac tcagctgctg ggctcctgc tgctctggct cccaggtgcc       60
acatttgcca tcgtgatgac ccagactcca tcccccgtgt ctgcagctgt gggaggcaca     120
gtcaccatca attgccaggc cagtgagagt gtctatagtg acaaccgctt atcctggtat     180
cagcagaaac cagggcagcc tcccaagcaa ctgatctatg gtgcatccac tctggcatct     240
gaggtctcat cgcgattcaa aggcagtgga tctgggacac agttcactct caccatcaac     300
gatgtggtgt gtgacgatgc tgccacttac tactgtgcag gatataaaag tagtaatcaa     360
gatggtattg gtttcggcgg agggaccgag gtggtcgtca aa                        402
```

<210> SEQ ID NO 33
<211> LENGTH: 1374
<212> TYPE: DNA
<213> ORGANISM: Artificial Sequence
<220> FEATURE:
<223> OTHER INFORMATION: Anti-WASp 289 heavy chain coding sequence
      (EB0610A-9G7-H1) with leader sequence

<400> SEQUENCE: 33

```
atggagactg gctgcgctg cttctcctg gtcgctgtgc tcaaaggtgt ccagtgtcag        60
tcagtggagg agtccggggg tcgcctggtc acgcctggga caccctgac actcacctgc      120 accgtctctg gattctccct cagcagctcc gacatgacct gggtccgcca ggctccaggg     180
aaggggctgg aatacatcgg atacatgagt agtaatgata ggccatacta cgcgagctgg     240
gcaaatggtc gattcaccat ctccaaaacc tcgaccacgg tgactctgaa atcaccagt      300 ccgacaaccg aggacacggc cacctatttc tgttgtagag gtgttcttgg tactaggtcg     360
attcacatct ggggcccagg caccctggtc accgtctcct tagggcaacc taaggctcca     420
tcagtcttcc cactggcccc ctgctgcggg gacacaccca gctccacggt gaccctgggc     480
tgcctggtca aaggctacct cccggagcca gtgaccgtga cctggaactc gggcaccctc     540
accaatgggg tacgcacctt cccgtccgtc cggcagtcct caggcctcta ctcgctgagc     600
agcgtggtga gcgtgacctc aagcagccag cccgtcacct gcaacgtggc cacccagcc     660 accaacacca agtggacaa gaccgttgcg ccctcgacat gcagcaagcc catgtgccca     720 cccctgaac tctgggggg accgtctgtc ttcatcttcc cccaaaaacc caaggacacc      780
ctcatgatct cacgcacccc cgaggtcaca tgcgtggtgg tggacgtgag ccaggatgac     840
cccgaggtgc agttcacatg gtacataaac aacgagcagg tgcgcaccgc ccggccgccg     900
ctacgggagc agcagttcaa cagcacgatc cgcgtggtca gcaccctccc catcgcgcac     960
caggactggc tgaggggcaa ggagttcaag tgcaaagtcc acaacaaggc actcccggcc    1020
```

```
cccatcgaga aaaccatctc caaagccaga gggcagcccc tggagccgaa ggtctacacc    1080
atgggccctc cccggagga gctgagcagc aggtcggtca gcctgacctg catgatcaac    1140
ggcttctacc cttccgacat ctcggtggag tgggagaaga cgggaaggc agaggacaac     1200 tacaagacca cgccgccgt gctggacagc gacggctcct acttcctcta cagcaagctc    1260
tcagtgccca cgagtgagtg gcagcggggc gacgtcttca cctgctccgt gatgcacgag    1320
gccttgcaca accactacac gcagaagtcc atctcccgct ctccgggtaa atga          1374
```

<210> SEQ ID NO 34
<211> LENGTH: 717
<212> TYPE: DNA
<213> ORGANISM: Artificial Sequence
<220> FEATURE:
<223> OTHER INFORMATION: Anti-WASp 289 light chain coding sequence
      (EB0610A-9G7-K1) with leader sequence
<220> FEATURE:
<221> NAME/KEY: misc_feature
<222> LOCATION: (693)..(693)
<223> OTHER INFORMATION: n is a, c, g, or t

<400> SEQUENCE: 34

```
atggacacga gggcccccac tcagctgctg gggctcctgc tgctctggct cccaggtgcc      60
acatttgcca tcgtgatgac ccagactcca tcccccgtgt ctgcagctgt gggaggcaca    120
gtcaccatca attgccaggc cagtgagagt gtctatagtg acaaccgctt atcctggtat    180
cagcagaaac cagggcagcc tcccaagcaa ctgatctatg gtgcatccac tctggcatct    240
gaggtctcat cgcgattcaa aggcagtgga tctgggacac agttcactct caccatcaac    300
gatgtggtgt gtgacgatgc tgccacttac tactgtgcag gatataaaag tagtaatcaa    360
gatggtattg gtttcggcgg agggaccgag gtggtcgtca aggtgatcc agttgcacct    420 actgtcctca tcttcccacc atctgctgat cttgtggcaa ctggaacagt caccatcgtg    480
tgtgtggcga ataaatactt tcccgatgtc accgtcacct gggaggtgga tggcaccacc    540
caaacaactg gcatcgagaa cagtaaaaca ccgcagaatt ctgcagattg tacctacaac    600
ctcagcagca ctctgacact gaccagcaca cagtacaaca gccacaaaga gtacacctgc    660
aaggtgaccc agggcacgac ctcagtcgtc canagcttca ataggggtga ctgttag        717
```

<210> SEQ ID NO 35
<211> LENGTH: 402
<212> TYPE: DNA
<213> ORGANISM: Artificial Sequence
<220> FEATURE:
<223> OTHER INFORMATION: Anti-BTK 545 variable heavy domain coding
      sequence (EB0611A-3F7-H2) with leader sequence

<400> SEQUENCE: 35

```
atggagactg gctgcgctg gcttctcctg gtcgctgtgc tcaaaggtgt ccggtgtcag        60
tcgctgcagg gtccggggg aggcctgttc cagcctgggg gattcctggc actcacctgc     120
aaagcctctg gattctcctt cagtagcacg ttcgtggtgt ccttgatccg ccaggctcca    180
gggaaggggc tggagtggat cgcgtccatt gatgttggta gtagtggtat cacttactac    240
gcgagctggg cgaaaggccg cttcaccatc tccaaaacct cgtcgaccac ggtgactctg    300
caaatgacca gtctgacagc cgcggacacg gccacctatt tctgtgcgag agggaccaac    360
tttggcttct ggggcccagg caccctggtc accgtctcct ca                        402
```

<210> SEQ ID NO 36

<211> LENGTH: 402
<212> TYPE: DNA
<213> ORGANISM: Artificial Sequence
<220> FEATURE:
<223> OTHER INFORMATION: Anti-BTK 545 variable light domain coding sequence (EB0611A-3F7-K2) with leader sequence

<400> SEQUENCE: 36

```
atggacacga gggcccccac tcagctgctg gggctcctgc tgctctggct cccaggtgcc    60
acatttgcca tcgtgatgac ccagactcca tcttccaagt ctgtccctgt gggagacaca   120
gtcaccatca attgccaggc cagtgagagt gtttatagtg acaaccgctt atcctggttt   180
cagcagaaac aagggcagcc tcccaagctc ctgatctacc aggcatccaa attggaaact   240
ggggtcccat cgcggttcag cggcagtgga tctgggacac agttcactct caccatcagc   300
gatgtggtgt gtgacgatgc tgccacttac tactgtgcag atataaagg tagtagtagt   360
gatggccatg gtttcggcgg agggaccgag gtggtggtca aa                      402
```

<210> SEQ ID NO 37
<211> LENGTH: 1374
<212> TYPE: DNA
<213> ORGANISM: Artificial Sequence
<220> FEATURE:
<223> OTHER INFORMATION: Anti-BTK 545 heavy chain coding sequence (EB0611A-3F7-H2) with leader sequence

<400> SEQUENCE: 37

```
atggagactg ggctgcgctg gcttctcctg gtcgctgtgc tcaaaggtgt ccggtgtcag    60
tcgctgcagg gtccggggg aggcctgttc agcctgggg gattcctggc actcacctgc   120
aaagcctctg gattctcctt cagtagcacg ttcgtggtgt ccttgatccg ccaggctcca   180
gggaagggc tggagtggat cgcgtccatt gatgttggta gtagtggtat cacttactac   240
gcgagctggg cgaaaggccg cttcaccatc tccaaaacct cgtcgaccac ggtgactctg   300
caaatgacca gtctgacagc cgcggacacg gccacctatt tctgtgcgag agggaccaac   360
tttggcttct ggggcccagg caccctggtc accgtctcct cagggcaacc taaggctcca   420
tcagtcttcc cactggcccc ctgctgcggg gacacaccca gctccacggt gaccctgggc   480
tgcctggtca aggctacct cccggagcca gtgaccgtga cctggaactc gggcaccctc   540
accaatgggg tacgcacctt cccgtccgtc ggcagtcct caggcctcta ctcgctgagc   600
agcgtggtga gcgtgacctc aagcagccag cccgtcacct gcaacgtggc ccacccagcc   660
accaacacca agtggacaa gaccgttgcg ccctcgacat gcagcaagcc catgtgccca   720
cccctgaac tcctgggggg accgtctgtc ttcatcttcc ccccaaaacc caaggacacc   780
ctcatgatct cacgcacccc cgaggtcaca tgcgtggtgg tggacgtgag ccaggatgac   840
cccgaggtgc agttcacatg gtacataaac aacgagcagg tgcgcaccgc ccggccgccg   900
ctacgggagc agcagttcaa cagcacgatc cgcgtggtca gcaccctccc catcgcgcac   960
caggactggc tgagggcaa ggagttcaag tgcaaagtcc acaacaaggc actcccggcc  1020
cccatcgaga aaaccatctc caaagccaga gggcagcccc tggagccgaa ggtctacacc  1080
atgggccctc cccggaga gctgagcagc aggtcggtca gcctgaccg catgatcaac  1140
ggcttctacc cttccgacat ctcggtggag tgggagaaga cgggaaggc agaggacaac  1200
tacaagacca cgccggccgt gctggacagc gacggctcct acttcctcta gcagcaagctc  1260
tcagtgccca cgagtgagtg gcagcggggc gacgtcttca cctgctccgt gatgcacgag  1320
gccttgcaca accactacac gcagaagtcc atctcccgct ctccgggtaa atga         1374
```

<210> SEQ ID NO 38
<211> LENGTH: 717
<212> TYPE: DNA
<213> ORGANISM: Artificial Sequence
<220> FEATURE:
<223> OTHER INFORMATION: Anti-BTK 545 light chain coding sequence
    (EB0611A-3F7-K2) with leader sequence

<400> SEQUENCE: 38

```
atggacacga gggcccccac tcagctgctg gggctcctgc tgctctggct cccaggtgcc    60
acatttgcca tcgtgatgac ccagactcca tcttccaagt ctgtccctgt gggagacaca   120
gtcaccatca attgccaggc cagtgagagt gtttatagtg caaccgctt atcctggttt   180
cagcagaaac aagggcagcc tcccaagctc ctgatctacc aggcatccaa attgaaact   240
ggggtcccat cgcggttcag cggcagtgga tctgggacac agttcactct caccatcagc   300
gatgtggtgt gtgacgatgc tgccacttac tactgtgcag gatataaagg tagtagtagt   360
gatggccatg gtttcggcgg agggaccgag gtggtggtca aggtgatcc agttgcacct   420
actgtcctca tcttcccacc agctgctgat caggtggcaa ctggaacagt caccatcgtg   480
tgtgtggcga ataaatactt tcccgatgtc accgtcacct gggaggtgga tggcaccacc   540
caaacaactg gcatcgagaa cagtaaaaca ccgcagaatt ctgcagattg tacctacaac   600
ctcagcagca ctctgacact gaccagcaca cagtacaaca gccacaaaga gtacacctgc   660
aaggtgaccc agggcacgac ctcagtcgtc cagagcttca tagggtgta ctgttag      717
```

<210> SEQ ID NO 39
<211> LENGTH: 11
<212> TYPE: PRT
<213> ORGANISM: Artificial Sequence
<220> FEATURE:
<223> OTHER INFORMATION: synthetic Gly-Ser linker

<400> SEQUENCE: 39

Gly Gly Ser Gly Gly Gly Ser Gly Gly Ser Gly
1               5                   10

<210> SEQ ID NO 40
<211> LENGTH: 10
<212> TYPE: PRT
<213> ORGANISM: Artificial Sequence
<220> FEATURE:
<223> OTHER INFORMATION: synthetic Gly-Ser linker

<400> SEQUENCE: 40

Gly Gly Ser Gly Gly Gly Ser Gly Ser Gly
1               5                   10

<210> SEQ ID NO 41
<211> LENGTH: 8
<212> TYPE: PRT
<213> ORGANISM: Artificial Sequence
<220> FEATURE:
<223> OTHER INFORMATION: synthetic Gly-Ser linker

<400> SEQUENCE: 41

Gly Gly Ser Gly Gly Gly Ser Gly
1               5

<210> SEQ ID NO 42
<211> LENGTH: 10
<212> TYPE: PRT

```
<213> ORGANISM: Artificial Sequence
<220> FEATURE:
<223> OTHER INFORMATION: synthetic Gly-Ser linker

<400> SEQUENCE: 42

Gly Gly Gly Gly Ser Gly Gly Gly Gly Ser
1               5                   10

<210> SEQ ID NO 43
<211> LENGTH: 8
<212> TYPE: PRT
<213> ORGANISM: Artificial Sequence
<220> FEATURE:
<223> OTHER INFORMATION: synthetic Gly-Ser linker

<400> SEQUENCE: 43

Gly Gly Gly Ser Gly Gly Gly Ser
1               5

<210> SEQ ID NO 44
<211> LENGTH: 6
<212> TYPE: PRT
<213> ORGANISM: Artificial Sequence
<220> FEATURE:
<223> OTHER INFORMATION: synthetic Gly-Ser linker

<400> SEQUENCE: 44

Gly Gly Ser Gly Gly Ser
1               5

<210> SEQ ID NO 45
<211> LENGTH: 6
<212> TYPE: PRT
<213> ORGANISM: Artificial Sequence
<220> FEATURE:
<223> OTHER INFORMATION: Exemplary His tag

<400> SEQUENCE: 45

His His His His His His
1               5

<210> SEQ ID NO 46
<211> LENGTH: 7
<212> TYPE: PRT
<213> ORGANISM: Artificial Sequence
<220> FEATURE:
<223> OTHER INFORMATION: Exemplary Flag tag

<400> SEQUENCE: 46

Asp Tyr Lys Asp Asp Asp Asp
1               5

<210> SEQ ID NO 47
<211> LENGTH: 8
<212> TYPE: PRT
<213> ORGANISM: Artificial Sequence
<220> FEATURE:
<223> OTHER INFORMATION: Exemplary Flag tag

<400> SEQUENCE: 47

Asp Tyr Lys Asp Asp Asp Asp Lys
1               5

<210> SEQ ID NO 48
<211> LENGTH: 7
<212> TYPE: PRT
<213> ORGANISM: Artificial Sequence
```

```
<220> FEATURE:
<223> OTHER INFORMATION: Exemplary Flag tag

<400> SEQUENCE: 48

Asp Tyr Lys Asp Asp Asp Lys
1               5

<210> SEQ ID NO 49
<211> LENGTH: 8
<212> TYPE: PRT
<213> ORGANISM: Artificial Sequence
<220> FEATURE:
<223> OTHER INFORMATION: Exemplary Xpress tag

<400> SEQUENCE: 49

Asp Leu Tyr Asp Asp Asp Asp Lys
1               5

<210> SEQ ID NO 50
<211> LENGTH: 15
<212> TYPE: PRT
<213> ORGANISM: Artificial Sequence
<220> FEATURE:
<223> OTHER INFORMATION: Exemplary Avi tag

<400> SEQUENCE: 50

Gly Leu Asn Asp Ile Phe Glu Ala Gln Lys Ile Glu Trp His Glu
1               5                   10                  15

<210> SEQ ID NO 51
<211> LENGTH: 26
<212> TYPE: PRT
<213> ORGANISM: Artificial Sequence
<220> FEATURE:
<223> OTHER INFORMATION: Exemplary calmodulin binding peptide (CBP) tag

<400> SEQUENCE: 51

Lys Arg Arg Trp Lys Lys Asn Phe Ile Ala Val Ser Ala Ala Asn Arg
1               5                   10                  15

Phe Lys Lys Ile Ser Ser Ser Gly Ala Leu
            20                  25

<210> SEQ ID NO 52
<211> LENGTH: 6
<212> TYPE: PRT
<213> ORGANISM: Artificial Sequence
<220> FEATURE:
<223> OTHER INFORMATION: Exemplary Polyglutamate tag

<400> SEQUENCE: 52

Glu Glu Glu Glu Glu Glu
1               5

<210> SEQ ID NO 53
<211> LENGTH: 9
<212> TYPE: PRT
<213> ORGANISM: Artificial Sequence
<220> FEATURE:
<223> OTHER INFORMATION: Exemplary HA tag

<400> SEQUENCE: 53

Tyr Pro Tyr Asp Val Pro Asp Tyr Ala
1               5

<210> SEQ ID NO 54
<211> LENGTH: 9
```

```
<212> TYPE: PRT
<213> ORGANISM: Artificial Sequence
<220> FEATURE:
<223> OTHER INFORMATION: Exemplary HA tag

<400> SEQUENCE: 54

Tyr Ala Tyr Asp Val Pro Asp Tyr Ala
1               5

<210> SEQ ID NO 55
<211> LENGTH: 9
<212> TYPE: PRT
<213> ORGANISM: Artificial Sequence
<220> FEATURE:
<223> OTHER INFORMATION: Exemplary HA tag

<400> SEQUENCE: 55

Tyr Asp Val Pro Asp Tyr Ala Ser Leu
1               5

<210> SEQ ID NO 56
<211> LENGTH: 10
<212> TYPE: PRT
<213> ORGANISM: Artificial Sequence
<220> FEATURE:
<223> OTHER INFORMATION: Exemplary Myc tag

<400> SEQUENCE: 56

Glu Gln Lys Leu Ile Ser Glu Glu Asp Leu
1               5                   10

<210> SEQ ID NO 57
<211> LENGTH: 8
<212> TYPE: PRT
<213> ORGANISM: Artificial Sequence
<220> FEATURE:
<223> OTHER INFORMATION: Exemplary Strep tag

<400> SEQUENCE: 57

Trp Arg His Pro Gln Phe Gly Gly
1               5

<210> SEQ ID NO 58
<211> LENGTH: 8
<212> TYPE: PRT
<213> ORGANISM: Artificial Sequence
<220> FEATURE:
<223> OTHER INFORMATION: STREP tag II

<400> SEQUENCE: 58

Trp Ser His Pro Gln Phe Glu Lys
1               5

<210> SEQ ID NO 59
<211> LENGTH: 13
<212> TYPE: PRT
<213> ORGANISM: Artificial Sequence
<220> FEATURE:
<223> OTHER INFORMATION: Exemplary Softag 1

<400> SEQUENCE: 59

Ser Leu Ala Glu Leu Leu Asn Ala Gly Leu Gly Gly Ser
1               5                   10

<210> SEQ ID NO 60
<211> LENGTH: 8
<212> TYPE: PRT
```

<213> ORGANISM: Artificial Sequence
<220> FEATURE:
<223> OTHER INFORMATION: Exemplary Softag 3

<400> SEQUENCE: 60

Thr Gln Asp Pro Ser Arg Val Gly
1               5

<210> SEQ ID NO 61
<211> LENGTH: 14
<212> TYPE: PRT
<213> ORGANISM: Artificial Sequence
<220> FEATURE:
<223> OTHER INFORMATION: Exemplary V5 tag

<400> SEQUENCE: 61

Gly Lys Pro Ile Pro Asn Pro Leu Leu Gly Leu Asp Ser Thr
1               5                   10

<210> SEQ ID NO 62
<211> LENGTH: 345
<212> TYPE: DNA
<213> ORGANISM: Artificial Sequence
<220> FEATURE:
<223> OTHER INFORMATION: Anti-WASp 289 variable heavy domain coding
      sequence (EB0610A-9G7-H1) without leader sequence

<400> SEQUENCE: 62

```
cagtcagtgg aggagtccgg gggtcgcctg gtcacgcctg ggacacccct gacactcacc      60
tgcaccgtct ctggattctc cctcagcagc tccgacatga cctgggtccg ccaggctcca     120 gggaagggc tggaatacat cggatacatg agtagtaatg ataggccata ctacgcgagc     180
tgggcaaatg gtcgattcac catctccaaa acctcgacca cggtgactct gaaaatcacc     240
agtccgacaa ccgaggacac ggccacctat ttctgttgta gaggtgttct ggtactagg     300 tcgattcaca tctggggccc aggcaccctg gtcaccgtct cctta                     345
```

<210> SEQ ID NO 63
<211> LENGTH: 333
<212> TYPE: DNA
<213> ORGANISM: Artificial Sequence
<220> FEATURE:
<223> OTHER INFORMATION: Anti-WASp 289 variable light domain coding
      sequence (EB0610A-9G7-K1) without leader sequence

<400> SEQUENCE: 63

```
atcgtgatga cccagactcc atccccgtg tctgcagctg tgggaggcac agtcaccatc      60
aattgccagg ccagtgagag tgtctatagt gacaaccgct atcctggta tcagcagaaa     120 ccagggcagc ctcccaagca actgatctat ggtgcatcca ctctggcatc tgaggtctca     180
tcgcgattca aaggcagtgg atctgggaca cagttcactc tcaccatcaa cgatgtggtg     240
tgtgacgatg ctgccactta ctactgtgca ggatataaaa gtagtaatca agatggtatt     300
ggtttcggcg gagggaccga ggtggtcgtc aaa                                  333
```

<210> SEQ ID NO 64
<211> LENGTH: 1317
<212> TYPE: DNA
<213> ORGANISM: Artificial Sequence
<220> FEATURE:
<223> OTHER INFORMATION: Anti-WASp 289 heavy chain coding sequence
      (EB0610A-9G7-H1) without leader sequence

<400> SEQUENCE: 64

```
cagtcagtgg aggagtccgg gggtcgcctg gtcacgcctg ggacacccct gacactcacc    60
tgcaccgtct ctggattctc cctcagcagc tccgacatga cctgggtccg ccaggctcca   120 gggaagggc tggaatacat cggatacatg agtagtaatg ataggccata ctacgcgagc   180
tgggcaaatg gtcgattcac catctccaaa acctcgacca cggtgactct gaaaatcacc   240
agtccgacaa ccgaggacac ggccacctat ttctgttgta gaggtgttct tggtactagg   300
tcgattcaca tctggggccc aggcaccctg gtcaccgtct ccttagggca acctaaggct   360
ccatcagtct tcccactggc ccctgctgc ggggacacac ccagctccac ggtgaccctg   420
ggctgcctgg tcaaaggcta cctcccggag ccagtgaccg tgacctggaa ctcgggcacc   480
ctcaccaatg gggtacgcac cttcccgtcc gtccggcagt cctcaggcct ctactcgctg   540
agcagcgtgg tgagcgtgac ctcaagcagc cagcccgtca cctgcaacgt ggcccaccca   600
gccaccaaca ccaaagtgga caagaccgtt gcgcctcga catgcagcaa gcccatgtgc   660 ccacccctg aactcctggg gggaccgtct gtcttcatct tccccccaaa acccaaggac   720
accctcatga tctcacgcac ccccgaggtc acatgcgtgg tggtgacgt gagccaggat   780 gaccccgagg tgcagttcac atggtacata aacaacgagc aggtgcgcac cgcccggccg   840
ccgctacggg agcagcagtt caacagcacg atccgcgtgg tcagcaccct ccccatcgcg   900
caccaggact ggctgagggg caaggagttc aagtgcaaag tccacaacaa ggcactcccg   960
gcccccatcg agaaaaccat ctccaaagcc agagggcagc cctggagcc gaaggtctac  1020 accatgggcc ctccccggga ggagctgagc agcaggtcgg tcagcctgac ctgcatgatc  1080
aacggcttct acccttccga catctccgtg gagtgggaga gaacgggaa ggcagaggac  1140 aactacaaga ccacgccggc cgtgctggac agcgacggct cctacttcct ctacagcaag  1200
ctctcagtgc ccacgagtga gtggcagcgg ggcgacgtct tcacctgctc cgtgatgcac  1260
gaggccttgc acaaccacta cacgcagaag tccatctccc gctctccggg taaatga    1317
```

<210> SEQ ID NO 65
<211> LENGTH: 648
<212> TYPE: DNA
<213> ORGANISM: Artificial Sequence
<220> FEATURE:
<223> OTHER INFORMATION: Anti-WASp 289 light chain coding sequence
      (EB0610A-9G7-K1) without leader sequence
<220> FEATURE:
<221> NAME/KEY: misc_feature
<222> LOCATION: (624)..(624)
<223> OTHER INFORMATION: n is a, c, g, or t

<400> SEQUENCE: 65

```
atcgtgatga cccagactcc atccccgtg tctgcagctg tgggaggcac agtcaccatc    60
aattgccagg ccagtgagag tgtctatagt gacaaccgct atcctggta tcagcagaaa   120 ccagggcagc ctcccaagca actgatctat ggtgcatcca ctctggcatc tgaggtctca   180
tcgcgattca aggcagtgg atctgggaca cagttcactc tcaccatcaa cgatgtggtg   240
tgtgacgatg ctgccactta ctactgtgca ggatataaa gtagtaatca agatggtatt   300
ggtttcggcg gagggaccga ggtggtcgtc aaaggtgatc cagttgcacc tactgtcctc   360
atcttcccac catctgctga tcttgtggca actggaacag tcaccatcgt gtgtgtggcg   420
aataaatact ttcccgatgt caccgtcacc tgggaggtgg atggcaccac ccaaacaact   480
ggcatcgaga acagtaaaac accgcagaat tctgcagatt gtacctacaa cctcagcagc   540
actctgacac tgaccagcac acagtacaac agccacaaag agtacacctg caaggtgacc   600
```
cagggcacga cctcagtcgt ccanagcttc aataggggtg actgttag           648

<210> SEQ ID NO 66
<211> LENGTH: 345
<212> TYPE: DNA
<213> ORGANISM: Artificial Sequence
<220> FEATURE:
<223> OTHER INFORMATION: Anti-BTK 545 variable heavy domain coding
      sequence (EB0611A-3F7-H2) without leader sequence

<400> SEQUENCE: 66
cagtcgctgc aggggtccgg gggaggcctg ttccagcctg ggggattcct ggcactcacc    60
tgcaaagcct ctggattctc cttcagtagc acgttcgtgg tgtccttgat ccgccaggct   120
ccagggaagg ggctggagtg gatcgcgtcc attgatgttg gtagtagtgg tatcacttac   180
tacgcgagct gggcgaaagg ccgcttcacc atctccaaaa cctcgtcgac cacggtgact   240
ctgcaaatga ccagtctgac agccgcggac acggccacct atttctgtgc gagagggacc   300
aactttggct ctggggccc aggcaccctg gtcaccgtct cctca                    345

<210> SEQ ID NO 67
<211> LENGTH: 333
<212> TYPE: DNA
<213> ORGANISM: Artificial Sequence
<220> FEATURE:
<223> OTHER INFORMATION: Anti-BTK 545 variable light domain coding
      sequence (EB0611A-3F7-K2) without leader sequence

<400> SEQUENCE: 67
atcgtgatga cccagactcc atcttccaag tctgtccctg tgggagacac agtcaccatc    60
aattgccagg ccagtgagag tgtttatagt gacaaccgct atcctggttt cagcagaaa   120 caagggcagc tcccaagct cctgatctac caggcatcca aattggaaac tggggtccca   180
tcgcggttca gcggcagtgg atctgggaca cagttcactc tcaccatcag cgatgtggtg   240
tgtgacgatg ctgccactta ctactgtgca ggatataaag gtagtagtag tgatggccat   300
ggtttcggcg gagggaccga ggtggtggtc aaa                               333

<210> SEQ ID NO 68
<211> LENGTH: 1317
<212> TYPE: DNA
<213> ORGANISM: Artificial Sequence
<220> FEATURE:
<223> OTHER INFORMATION: Anti-BTK 545 heavy chain coding sequence
      (EB0611A-3F7-H2) without leader sequence

<400> SEQUENCE: 68
cagtcgctgc aggggtccgg gggaggcctg ttccagcctg ggggattcct ggcactcacc    60
tgcaaagcct ctggattctc cttcagtagc acgttcgtgg tgtccttgat ccgccaggct   120
ccagggaagg ggctggagtg gatcgcgtcc attgatgttg gtagtagtgg tatcacttac   180
tacgcgagct gggcgaaagg ccgcttcacc atctccaaaa cctcgtcgac cacggtgact   240
ctgcaaatga ccagtctgac agccgcggac acggccacct atttctgtgc gagagggacc   300
aactttggct ctggggccc aggcaccctg gtcaccgtct cctcagggca acctaaggct   360
ccatcagtct tcccactggc ccctgctgc ggggacacac ccagctccac ggtgaccctg   420
ggctgcctgg tcaaaggcta ctccccggag ccagtgaccg tgacctggaa ctcgggcacc   480
ctcaccaatg gggtacgcac cttccctgtcc gtccggcagt cctcaggcct ctactcgctg   540
agcagcgtgg tgagcgtgac ctcaagcagc cagcccgtca cctgcaacgt ggcccaccca   600

-continued

```
gccaccaaca ccaaagtgga caagaccgtt gcgccctcga catgcagcaa gcccatgtgc      660
ccaccccctg aactcctggg gggaccgtct gtcttcatct tccccccaaa acccaaggac      720
accctcatga tctcacgcac ccccgaggtc acatgcgtgg tggtggacgt gagccaggat      780
gaccccgagg tgcagttcac atggtacata aacaacgagc aggtgcgcac cgcccggccg      840
ccgctacggg agcagcagtt caacagcacg atccgcgtgg tcagcaccct ccccatcgcg      900
caccaggact ggctgagggg caaggagttc aagtgcaaag tccacaacaa ggcactcccg      960
gcccccatcg agaaaaccat ctccaaagcc agagggcagc cctggagcc gaaggtctac      1020 accatgggcc ctccccggga ggagctgagc agcaggtcgg tcagcctgac ctgcatgatc     1080
aacggcttct acccttccga catctcggtg gagtgggaga agaacgggaa ggcagaggac     1140
aactacaaga ccacgccggc cgtgctggac agcgacggct cctacttcct ctacagcaag     1200
ctctcagtgc ccacgagtga gtggcagcgg ggcgacgtct tcacctgctc cgtgatgcac     1260
gaggccttgc acaaccacta cacgcagaag tccatctccc gctctccggg taaatga       1317
```

<210> SEQ ID NO 69
<211> LENGTH: 648
<212> TYPE: DNA
<213> ORGANISM: Artificial Sequence
<220> FEATURE:
<223> OTHER INFORMATION: Anti-BTK 545 light chain coding sequence (EB0611A-3F7-K2) without leader sequence

<400> SEQUENCE: 69

```
atcgtgatga cccagactcc atcttccaag tctgtccctg tgggagacac agtcaccatc       60
aattgccagg ccagtgagag tgtttatagt gacaaccgct tatcctggtt tcagcagaaa      120
caagggcagc ctcccaagct cctgatctac caggcatcca aattggaaac tggggtccca      180
tcgcggttca gcggcagtgg atctgggaca cagttcactc tcaccatcag cgatgtggtg      240
tgtgacgatg ctgccactta ctactgtca ggatataaag gtagtagtag tgatggccat      300
ggtttcggcg gagggaccga ggtggtggtc aaaggtgatc cagttgcacc tactgtcctc      360
atcttcccac cagctgctga tcaggtggca actggaacag tcaccatcgt gtgtgtggcg      420
aataaatact ttcccgatgt caccgtcacc tgggaggtgg atggcaccac ccaaacaact      480
ggcatcgaga acagtaaaac accgcagaat tctgcagatt gtacctacaa cctcagcagc      540
actctgacac tgaccagcac acagtacaac agccacaaag agtacacctg caaggtgacc      600
cagggcacga cctcagtcgt ccagagcttc aatagggtg actgttag                    648
```

ANTIBODIES THAT SPECIFICALLY BIND PEPTIDES ASSOCIATED WITH THE PRIMARY IMMUNODEFICIENCIES: WISKOTT-ALDRICH SYNDROME AND X-LINKED AGAMMAGLOBULINEMIA

CROSS-REFERENCE TO RELATED APPLICATIONS

This application is a U.S. National Phase Patent Application based on International Patent Application No. PCT/US2021/025627, filed on Apr. 2, 2021, which claims priority to U.S. Provisional Patent Application No. 63/004,415 filed on Apr. 2, 2020, each of which is incorporated herein by reference in its entirety as if fully set forth herein.

STATEMENT REGARDING FEDERALLY SPONSORED RESEARCH OR DEVELOPMENT

This invention was made with government support under AI123135 awarded by the National Institutes of Health. The government has certain rights in the invention.

STATEMENT REGARDING SEQUENCE LISTING

The Sequence Listing associated with this application is provided in text format in lieu of a paper copy and is hereby incorporated by reference into the specification. The name of the text file containing the Sequence Listing is 2RU8889_ST25.txt. The text file is 58.6 KB, was created on Sep. 29, 2022, and is being submitted electronically via Patent Center.

FIELD OF THE DISCLOSURE

The current disclosure provides antibodies that bind to peptides associated with primary immunodeficiency disorders (PIDD) including Wiskott-Aldrich Syndrome (WAS) and X-linked agammaglobulinemia (XLA). The antibodies can be used for clinical diagnosis and newborn screening for WAS and XLA, among other uses.

BACKGROUND OF THE DISCLOSURE

There are a number of diseases with effective treatments available. However, for a number of these diseases, once symptoms emerge, the disease is already fatal or has led to irreversible damage. Examples of such diseases include primary immunodeficiency disorders (PIDD).

Primary Immunodeficiency Disorders (PIDD), also referred to as inborn errors of immunity (IEI), are a group of more than 416 rare genetic disorders in which components of the immune system are missing or improperly functioning. Examples of PIDD include Wiskott-Aldrich Syndrome (WAS) and X-linked agammaglobulinemia (XLA). Early detection of PIDD is extremely important in controlling and preventing potentially life-threatening infections and chronic sequelae.

The treatment of PIDD would be significantly enhanced if diagnosis could be made before clinical symptoms emerge. Newborn screening (NBS) is a standard public preventive mandatory screening test for the 4 million babies born every year in the U.S. NBS usually involves a blood test performed 24 to 48 hours after birth. The screening uses a few drops of blood from a newborn's heel deposited on filter paper. The paper containing dried blood spots (DBS) can be stored until the tests are conducted.

To conduct NBS assessments, punches of dried blood are taken from the DBS and laboratory tests are performed to detect the presence or absence of specific substances within the blood (called markers or biomarkers) that are indicative of disorders not apparent at birth but that cause serious health problems later in life. Though the disorders screened vary from state to state, most states screen for phenylketonuria, primary congenital hypothyroidism, cystic fibrosis, and sickle cell disease. NBS has proven to be highly effective at improving patient outcomes and avoiding long-term disability in affected individuals, while at the same time reducing healthcare costs.

International Application No. PCT/US2019/054856 describes development of multiplexed assays that can be used to screen newborns for severe combined immunodeficiency (SCID), Wiskott-Aldrich Syndrome (WAS), X-linked agammaglobulinemia (XLA), cystinosis, and Wilson Disease (WD). The assays can significantly improve the outcome for affected individuals by reliably diagnosing these disorders before devastating and often fatal clinical symptoms emerge. The assays can detect the presence or absence of markers associated with these disorders using dried blood spots (DBS) already routinely collected as part of existing newborn screening (NBS) procedures. The multiplexed assays described in PCT/US2019/054856 utilize peptide immunoaffinity enrichment coupled to selected reaction monitoring mass spectrometry (immuno-SRM).

SUMMARY OF THE DISCLOSURE

The current disclosure provides antibodies that specifically bind signature peptides associated with the primary immunodeficiency disorders (PIDD): Wiskott-Aldrich Syndrome (WAS) and X-linked agammaglobulinemia (XLA).

Particular embodiments include an antibody or antigen binding fragment thereof that binds to the WASp 289 signature peptide of WAS (SEQ ID NO: 1) and include: a heavy chain variable (VH) domain including a CDRH1 of SEQ ID NO: 3, a CDRH2 of SEQ ID NO: 4, and a CDRH3 of SEQ ID NO: 5, and a light chain variable (VL) domain including: a CDRL1 of SEQ ID NO: 6, a CDRL2 of SEQ ID NO: 7, and a CDRL3 of SEQ ID NO: 8. In particular embodiments, the antibody or antigen binding fragment thereof that binds to a WASp 289 signature peptide includes: a VH domain including SEQ ID NO: 15. In particular embodiments, the antibody or antigen binding fragment thereof that binds to a WASp 289 signature peptide includes: a VL domain including SEQ ID NO: 16. In particular embodiments, the antibody or antigen binding fragment thereof that binds to a WASp 289 signature peptide includes: a heavy chain including SEQ ID NO: 17. In particular embodiments, the antibody or antigen binding fragment thereof that binds to a WASp 289 signature peptide includes: a light chain including SEQ ID NO: 18. In particular embodiments, an antibody or antigen binding fragment thereof includes a recombinant antibody or antigen binding fragment thereof.

Particular embodiments include an antibody or antigen binding fragment thereof that binds to the BTK 545 signature peptide of XLA (SEQ ID NO: 2) and includes: a heavy chain variable (VH) domain including a CDRH1 of SEQ ID NO: 9, a CDRH2 of SEQ ID NO: 10, and a CDRH3 of SEQ ID NO: 11, and a light chain variable (VL) domain including: a CDRL1 of SEQ ID NO: 12, a CDRL2 of SEQ ID NO:

13, and a CDRL3 of SEQ ID NO: 14. In particular embodiments, the antibody or antigen binding fragment thereof that binds to a BTK 545 signature peptide includes: a VH domain including SEQ ID NO: 23. In particular embodiments, the antibody or antigen binding fragment thereof that binds to a BTK 545 signature peptide includes: a VL domain including SEQ ID NO: 24. In particular embodiments, the antibody or antigen binding fragment thereof that binds to a BTK 545 signature peptide includes: a heavy chain including SEQ ID NO: 25. In particular embodiments, the antibody or antigen binding fragment thereof that binds to a BTK 545 signature peptide includes: a light chain including SEQ ID NO: 26. In particular embodiments, an antibody or antigen binding fragment thereof includes a recombinant antibody or antigen binding fragment thereof.

In particular embodiments, the antibodies of the disclosure can be used in assays to clinically diagnose WAS and XLA. Particular embodiments provide for screening of newborns for WAS and XLA using the antibodies of the disclosure in assays that utilize dried blood spots (DBS) as samples. In particular embodiments, the antibodies of the disclosure can be used in peptide immunoaffinity enrichment coupled to selected reaction monitoring mass spectrometry (immuno-SRM) assays. In particular embodiments, the assays can utilize buccal swabs, peripheral blood mononuclear cells (PBMCs), and white blood cells (WBCs) as samples. The assays including the antibodies can significantly improve the outcome for affected individuals by reliably diagnosing these disorders before devastating and often fatal clinical symptoms emerge. The antibodies can also be used in multiplex immuno-SRM assays as part of a screening panel for other diseases.

In particular embodiments, the antibodies of the disclosure can be used in other methods including immunoassays.

BRIEF DESCRIPTION OF THE SEVERAL VIEWS OF THE DRAWINGS

FIG. 1. Protein targets and peptide sequences used for peptide immunoaffinity enrichment coupled to selected reaction monitoring mass spectrometry (immuno-SRM-MS) to diagnose Wiskott-Aldrich Syndrome (WAS) and X-linked agammaglobulinemia (XLA). Total mass, parent ion mass, and daughter ion masses are also shown. ++ indicates doubly charged parent ions. The ion type for daughter ions are in parenthesis.

(FIG. 2A) WASp 289; (FIG. 2B) BTK 545.

(FIG. 3A) WASp 289; (FIG. 3B) BTK 545. Polyclonal antibodies that bind WASp 289 and BTK 545 were used.

(FIG. 4A) WASp 289; (FIG. 4B) BTK 545 (WAS: n=11, BTK: n=26). **** $p<0.0001$, *$p<0.05$. Polyclonal antibodies that bind WASp 289 and BTK 545 were used.

FIG. 5. ATP7B 1056 signature peptide concentrations in normal controls and patients from a blinded cohort study with clinical diagnosis and genotypes.

FIG. 6. Quantification of signature peptides in normal controls from a blinded cohort study. Polyclonal antibodies that bind WASp 289 and BTK 545 were used.

FIG. 7. Concentrations of signature peptides in patients from a blinded cohort study with clinical diagnosis and genotypes. Polyclonal antibodies that bind WASp 289 and BTK 545 were used.

(FIG. 8A) ROC plots for WASp 289 and BTK 545. True positive and false positive rates are plotted for increasingly stringent cutoff values. Line of identity indicates a test that cannot distinguish patients from controls. (FIG. 8B) Area under the curve (AUC) values and p-values for peptides shown in FIG. 8A. Polyclonal antibodies that bind WASp 289 and BTK 545 were used.

FIG. 9. Signature peptide levels in newborn DBS obtained from Washington State Newborn Screening Laboratory. Polyclonal antibodies that bind WASp 289 and BTK 545 were used.

FIG. 10. Ratios of signature peptides against ATP7B peptide and patient diagnosis in a blinded cohort study. Polyclonal antibodies that bind WASp 289 and BTK 545 were used.

FIG. 14. Exemplary sequences of the disclosure.

DETAILED DESCRIPTION

Figure 2A:
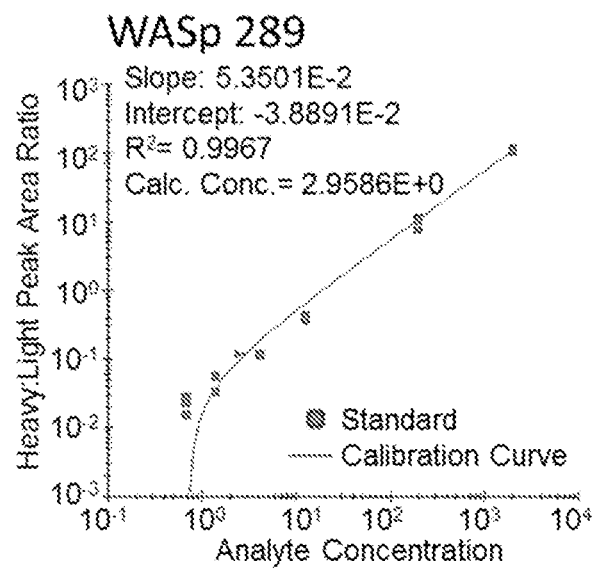
FIGS. 2A, 2B. Response curves for peptides measured by the multiplexed immuno-multiple reaction monitoring (MRM) assay using polyclonal antibodies for WASp 289 and BTK 545. When multiple parent ions are monitored in a single mass spectrometry (MS) run, this type of analysis is known as multiple reaction monitoring (MRM). Using MRM analysis, multiple proteins and multiple regions (signature peptides) of a protein can be monitored in a single mass spectrometry run. Response curves plot the heavy:light peak area ratio as a function of heavy peptide concentration, measured in a background matrix of digested protein extracted from dried blood spots (DBS). The curves allow determination of the linear range and sensitivity of the assay. Each datapoint is plotted as a gray box and linear regression is plotted as a line. Regression fit parameters are reported in the corner of each plot. Weighting for each plot is 1/x.

There are a number of diseases with effective treatments available. However, for a number of these diseases, once symptoms emerge, the disease is already fatal or has led to irreversible damage. Primary immunodeficiency disorders (PIDD) is a good example of this.

Primary Immunodeficiency Disorders (PIDD), also referred to as inborn errors of immunity (IEI), are a group of more than 416 rare genetic disorders in which components of the immune system are missing or improperly functioning. Although individually rare, the combined incidence of PIDD is estimated to be about 1 in 1200 (Tangye et al. Journal of Clinical Immunology, 2020. In Press; McCusker, C., J. Upton, and R. Warrington, *Primary immunodeficiency.* Allergy, asthma, and clinical immunology: official journal of the Canadian Society of Allergy and Clinical Immunology, 2018. 14(Suppl 2): p. 61-61; Kobrynski et al. J Clin Immunol, 2014. 34(8): p. 954-61). Once diagnosed and treated appropriately, patients can often lead relatively normal lives (Kaveri et al. Clin Exp Immunol, 2011. 164 Suppl 2: p. 2-5; Raje, N. and C. Dinakar, Immunology and allergy clinics of North America, 2015. 35(4): p. 599-623). Curative therapies are also possible, depending on the disorder, with hematopoietic stem cell transplantation (HSCT), enzyme replacement therapy (ERT), or gene therapy (Raje, N. and C. Dinakar, Immunology and allergy clinics of North America, 2015. 35(4): p. 599-623; Aydin et al. J Clin Immunol, 2015. 35(2): p. 189-98; Gaspar et al. Blood, 2009. 114(17): p. 3524-32; Moratto et al., Blood, 2011. 118(6): p. 1675-84; Parta et al., Journal of Clinical Immunology, 2017. 37(6): p. 548-558; Staal et al. Frontiers in Pediatrics, 2019. 7(443); Ferrua et al., Lancet Haematol, 2019. 6(5): p. e239-e253). Almost ubiquitously, early detection of PIDD is extremely important in controlling and preventing potentially life-threatening infections and chronic sequelae (Grunebaum et al., JAMA, 2006. 295(5): p. 508-18; Kanariou et al. Curr Opin Hematol, 2018. 25(1): p. 7-12).

Early intervention is limited by the difficulty in diagnosing PIDD clinically and the lack of straightforward population screening tools. Laboratory evaluations are typically elicited by evidence of recurrent and/or chronic infections. After clinical evaluation, laboratory tests that are required for a diagnostic confirmation often involve technically demanding analyses, including immune cell subset analysis, protein expression, and/or enzymatic activity in patient's white blood cells (Bonilla et al., Journal of Allergy and Clinical Immunology, 2015. 136(5): p. 1186-1205.e78).

WAS is an immune deficiency that is characterized by a decrease in the number and size of platelets. WAS is caused by mutations in the WAS gene which produces the WAS protein (WASp) and is often considered to be part of a disease spectrum with two other disorders: X-linked thrombocytopenia and severe congenital neutropenia. These conditions have overlapping signs and symptoms and the same genetic cause.

The decrease in the number and size of platelets associated with WAS results in a reduced ability to form blood clots. This leads to easy bruising and episodes of prolonged bleeding following minor trauma, which in some cases, is life threatening. Individuals with WAS also have an increased susceptibility to infection, autoimmune disorders (e.g., eczema) and certain cancers (e.g., lymphoma). Once diagnosed, treatments for WAS are available. Exemplary treatments include immunoglobulin infusions, antibiotics, and stem cell transplants. Gene therapy is also being explored as a treatment option for WAS.

XLA is an inherited immunodeficiency which prevents B cells from developing normally. XLA is caused by mutations in a gene called Bruton's Tyrosine Kinase (BTK). XLA results in an inability to produce antibodies needed to defend against bacteria, viruses, and other foreign substances. Children with XLA are usually healthy for the first 1 or 2 months of life because they are protected by maternal antibodies acquired before birth. After this time, however, the maternal antibodies are cleared from the body, and the affected child develops recurrent infections. Recurrent infections can lead to organ damage. Once diagnosed, treatments in the form of antibody infusions and antibiotics are available to treat XLA.

As the majority of congenital PIDD result in the reduction or absence of specific proteins, direct quantification of these target proteins represents an attractive potential screening tool, particularly in newborns, so that the PIDD can be diagnosed early and treated appropriately.

To conduct newborn screening (NBS) assessments, laboratory tests are performed on punches of dried blood spots (DBS) to detect the presence or absence of specific substances within the blood (called markers or biomarkers). Though the disorders screened vary from state to state, most states screen for phenylketonuria, primary congenital hypothyroidism, cystic fibrosis, and sickle cell disease. NBS has proven to be highly effective at improving patient outcomes and avoiding long-term disability in affected individuals, while at the same time reducing healthcare costs. Unfortunately, detection is often limited by the extremely low protein concentrations in blood cells and limited blood volume present in DBS.

International Application No. PCT/US2019/054856 describes robust assays and methods that allow identification of patients affected by WAS and XLA from a complex biologic sample such as DBS. The assays use anti-peptide antibodies to purify and enrich peptides of interest from DBS, followed by quantification of the peptides in a mass spectrometer. The peptides of interest, known as signature peptides, are stoichiometric surrogates for proteins that are deficient or lacking in individuals affected by WAS or XLA. The assay, peptide immunoaffinity enrichment coupled to selected reaction monitoring mass spectrometry (immuno-SRM), allows for quantification of proteins present at low picomolar concentrations in blood with high reproducibility (Collins et al., Frontiers in Immunology, 2018. 9(2756)).

Signature peptide markers and antibodies that bind to them have also been developed to diagnose other PIDD such as X-linked chronic granulomatous disease (X-CGD), X-linked lymphoproliferative syndrome (XLP1; SH2D1A deficiency), familial hemophagocytic lymphohistiocytosis 2 (FHL2), ataxia telangiectasia (AT), common variable immunodeficiency (CVID; B-cell dysfunctions), adenosine deaminase (ADA) deficiency, and dedicator of cytokinesis 8 (DOCK8) deficiency, and to detect cell specific markers for platelets (CD42) and natural killer cells (CD56), using immuno-SRM (PCT/US2021/020679; Collins et al., Frontiers in Immunology, 2020. 11(464)).

The present disclosure provides antibodies and antigen binding fragments thereof that can be used in an immuno-SRM method to reliably diagnose WAS and XLA, for example in newborns. The anti-peptide antibodies and antigen binding fragments thereof can be further used in multiplex immuno-SRM assays as part of a screening panel for other diseases.

The following aspects of the disclosure are now described in more detail: (i) Collection and Processing of Biological Samples; (ii) Peptide Markers for WAS and XLA; (iii) Antibodies Binding Peptide Markers for WAS and XLA; (iv) Variants; (v) Immunoconjugates of Anti-Peptide Antibodies; (vi) Production of Recombinant Proteins of the Disclosure; (vii) Methods of Use; (viii) Kits; (ix) Exemplary Embodiments; (x) Experimental Examples; and (xi) Closing Paragraphs.

(i) Collection and Processing of Biological Samples. In particular embodiments, biological samples that can be used in an immuno-SRM assay of the present disclosure include samples derived from blood or cells. In particular embodiments, samples used in the assays are DBS. In particular embodiments, whole blood from a subject can be prepared by placing blood onto a filter paper card and allowing the blood to dry.

In particular embodiments, whole blood from a subject can be collected in any anticoagulant. In particular embodiments, whole blood from a subject can be collected in heparin. DBS can be prepared by pipetting 50-100 µL (e.g., 70 µL) blood/spot onto filter paper card (e.g., Protein Saver™ 903@Card, Whatman Inc, Piscataway, NJ), and allowed to dry at room temperature. In particular embodiments, blood is allowed to dry on filter paper card overnight. DBS can be stored, for example, in sealed plastic bags at −80° C. until use. In particular embodiments, the whole DBS can be used in the immuno-SRM assays of the disclosure. In particular embodiments, one or more 3-mm punches from the DBS can be used in the immuno-SRM assays of the disclosure. In particular embodiments, DBS can be solubilized with 0.1% Triton X-100 in 50 mM ammonium bicarbonate.

In particular embodiments, samples used in an immuno-SRM assay of the present disclosure include cells obtained from buccal swabs or mucosal samples. In particular embodiments, mucosal samples include oral, nasal, genital, and rectal samples (Espinosa-de Aquino et al. (2017) Methods in Ecology and Evolution 8:370-378). In particular embodiments, buccal swab samples include cells from the cheek or mouth. In particular embodiments, buccal swab samples can be obtained from a subject following a protocol described in the following: CHLA. (2016, April 4). Buccal Swab Collection Procedure. CHLA-Clinical Pathology; (2016, July 27). Buccal DNA Collection Instructions. Pathway Genomics; (2017, December 14). Instruction for Buccal Swab Sample Collection. Otogenetics; PDXL PDXL. (2017, Nov. 28). *Buccal Swab collection procedure—PersonalizedDx* Labs [Video]. YouTube. On World Wide Web at youtu.be/3ftvHkfM71o?t=146; and Centers of Disease Control and Prevention (CDC). (2020, July 8). Interim Guidelines for collecting, handling, and testing clinical specimens for Covid-19. On World Wide Web at cdc.gov/coronavirus/2019-ncov/lab/guidelines-clinical-specimens.html.

In particular embodiments, buccal swab samples can be obtained from a subject with the following protocol. Prior to sample collection, the patient does not smoke, eat, drink, chew gum or brush their teeth for at least 30 minutes. A swab is carefully removed from the package, making sure the tip does not touch any objects or surfaces. The swab is inserted into the buccal cavity, which is located to one side of the mouth between the cheek, teeth and upper gum. The tip of the swab is pressed inside of one cheek and rubbed back and forth, up and down, in a circular motion. The handle is rotated during the rub to cover the entire tip with cells from the cheek. The tip is not allowed to touch the teeth, gums and lips during the collection process. The swab is not allowed to be over saturated with saliva. After collection, the swab is removed from the mouth without touching the teeth, gums or lips. The swab is allowed to air dry at room temperature for at least 30 minutes. The swab, with the handle removed, may be stored in a cryogenic vial. The steps may be repeated with a second swab on the opposite cheek. Buccal swab samples may be stored at 2-8° C. for up to 72 hours after collection or in the freezer at −80° C. or below if longer than 72 hours. In particular embodiments, the collection of cells with the buccal swab may be for at least 30 seconds. In particular embodiments, the collection of cells with the buccal swab may be collected from maximum mucosal surfaces. In particular embodiments, one to five buccal swab samples may be collected per subject. In particular embodiments, the buccal swab sample may be air dried on a sterile surface for at least five min, at least 10 min, at least 15 min, at least 20 min, at least 25 min, at least 30 min, or longer. In particular embodiments, the subject may rinse their mouth with clean water prior to sample collection. In particular embodiments, the area of sample collection may be moistened with saline using a separate swab. In particular embodiments, buccal swab samples may be stored at 25° C., 20° C., 15° C., 10° C., 5° C., 0° C., −5° C., −10° C., −15° C., −20° C., or below. In particular embodiments, buccal swab samples may be stored at −20° C. for one to two weeks. In particular embodiments, buccal samples may be collected from a water and/or mouthwash rinse instead of a swab (Michalczyk et al. (2004) BioTechniques 37(2):262-269).

In particular embodiments, cells from a buccal swab sample can be solubilized with 0.1% Triton X-100 in 50 mM ammonium bicarbonate. In particular embodiments, proteins may be isolated from buccal swab samples following the protocol described in Espinosa-de Aquino et al. (2017). In particular embodiments, cells from buccal swab samples may be extracted with an appropriate buffer such as TRIzol (Thermo Fisher Scientific, Waltham, MA) and the supernatant after nucleic acid precipitation may be used for protein extraction. In particular embodiments, proteins may be precipitated with acetone, the protein pellet may be resuspended in an appropriate buffer (e.g., guanidine hydrochloride in 95% ethanol supplemented with 2.5% glycerol), the pellet may be dispersed by sonication, the pellet may be centrifuged and washed, the pellet may be dried, and the pellet may be solubilized in an appropriate buffer (e.g., PBS and sodium dodecyl sulfate). In particular embodiments, the solubilized pellet may be heated at 100° C. and then centrifuged to obtain a supernatant for use.

In particular embodiments, samples used in the methods of the present disclosure include peripheral blood mononuclear cells (PBMCs). PBMCs come from peripheral blood and originate from hematopoietic stem cells (HSCs) that reside in the bone marrow. A PBMC is a blood cell with a round nucleus and can include many types of cells including monocytes, lymphocytes (including T cells, B cells, and NK cells), dendritic cells, and stem cells. PBMC can be isolated by any technique known in the art, including density centrifugation (e.g., with Ficoll-Paque). Density gradient centrifugation separates cells by cell density. In particular embodiments, whole blood or buffy coat layer may be layered over or under a density medium without mixing of the two layers followed by centrifugation. In particular embodiments, the PBMC appears as a thin white layer at the interface between the plasma and the density gradient medium. In particular embodiments, Vacutainer® blood draw tubes containing Ficoll-Hypaque and a gel plug that separates the Ficoll solution from the blood to be drawn can be used (cell preparation tubes CPT™, BD Biosciences, San Jose, CA; Puleo et al. (2017) Bio-protocol 7(2): e2103). In particular embodiments, SepMate™ tubes (STEMCELL™ Technologies, Vancouver, CA) designed with an insert to keep the density gradient medium and the sample from mixing prior to centrifugation can be used. (Kerfoot et al., Proteomics Clin Appl, 2012. 6(7-8):394-402; Grievink et al., Biopreserv Biobank. 2016 October; 14(5):410-415; Corkum et al. (2015) BMC Immunol. 16:48; Jia et al. (2018) Biopreserv Biobank 16(2):82-91). In particular embodiments, PBMC can be isolated by leukapheresis. A leukapheresis machine is an automated device that takes whole blood from a donor and separates out the target PBMC fraction using high-speed centrifugation while returning the remaining portion of the blood, including plasma, red blood cells, and granulocytes, back to the donor. In particular embodiments, isolated PBMCs can be solubilized with 0.1% Triton X-100 in 50 mM ammonium bicarbonate.

In particular embodiments, samples used in an immuno-SRM assay of the present disclosure include white blood cells (WBC; leukocytes). WBCs are part of the immune system and protect the body from infections and foreign invaders. In particular embodiments, WBCs include granulocytes (polymorphonuclear cells), lymphocytes (mononuclear cells), and monocytes (mononuclear cells). In particular embodiments, WBCs include lymphocytes and monocytes but not granulocytes. WBC can be isolated and optionally enriched by any technique known in the art, including: density gradient centrifugation (Boyum (1968) Isolation of mononuclear cells and granulocytes from human blood. Isolation of mononuclear cells by one centrifugation and of granulocytes by combining centrifugation and sedimentation at 1 g. Scand. J. Clin. Lab Invest. Suppl. 97:77; Boyum (1977) Lymphology, 10(2): 71-76); erythrocyte lysis by osmotic shock (Morgensen and Cantrell (1977) Pharm Therap. 1: 369-383); RosetteSep™ (STEMCELL™ Technologies, Vancouver, CA) including antibody mediated binding of unwanted cells to red blood cells and removal by density gradient separation (Beeton and Chandy (2007) J Vis Exp. (8): 326); magnetic bead for cell enrichment or depletion (Brocks et al (2006) In vivo 20(2): 239); complement-mediated lysis to enrich for B and/or NK cells (Faguet and Agee (1993) J Imm Meth 165(2): 217); and panning to remove unwanted cells including cell enrichment or depletion by adherence to an antibody coated plate (Brousso et al (1997) Immunol Let 59(2):85). See Dagur and McCoy (2015) Curr Protoc Cytom. 73:5.1.1-5.1.16 for a review on isolation and enrichment protocols for WBC.

with moderate hydrophobicity can be selected. Very hydrophilic and very hydrophobic peptides can be less stable due to retention time variation in HPLC and loss to surfaces. In particular embodiments, methionine residues (oxidation), N-terminal glutamine (cyclization), asparagine followed by glycine or proline (prone to deamidation), and dibasic termini (e.g. neighboring lysine or arginine residues such as KK, KR, RR, RK have the potential for variable digestion efficiency) can be undesirable (Whiteaker and Paulovich Clin Lab Med. 2011; 31(3): 385-396). Shorter peptides and those containing proline residues can be better targets for SRM (Lange et al. Molecular Systems Biology 2008; 4: 222).

In particular embodiments, the peptides are signature peptides that can serve as biomarkers to diagnose whether an individual has WAS and/or XLA. A deficiency or lack of the signature peptide biomarkers indicate that an individual has WAS and/or XLA. In particular embodiments, the peptides include portions of WASp and/or BTK. In particular embodiments, the peptides include SEQ ID NOs: 1 and 2 in Table 1.

TABLE 1

Protein targets and corresponding peptide sequences bound by anti-peptide antibodies of the disclosure

| PIDD | Protein Target | Peptide | Sequence | SEQ ID NO: |
|---|---|---|---|---|
| Wiskott-Aldrich Syndrome (WAS) | WASp | WASp 289-304 ("WASp 289") | LIYDFIEDQGGLEAVR | 1 |
| X-linked Agammaglobulinemia (XLA) | BTK | BTK 545-558 ("BTK 545") | YVLDDEYTSSVGSK | 2 |

(ii) Peptide Markers for WAS and XLA. There are many theoretical proteolytic peptides from target proteins that can be potential candidates for monoclonal antibody production. In particular embodiments, the best potential candidate peptides are selected after screening their characteristics by MS/MS. Those signature peptides with the highest sensitivity and specificity are selected to develop corresponding monoclonal antibodies and validated using clinical samples.

Typically, one or two signature proteotypic peptides which are unique to the protein of interest and that are consistently observed in MS experiments are selected to stoichiometrically represent the protein of interest (Mallick et al. Nat Biotechnol 2007; 25: 125-131). Signature peptides can be selected by detection in previous MS experiments, use of computational tools to predict the peptides most likely observable by MS, or a combination of both. In particular embodiments, tryptic peptides 5-22 amino acids in length (iii) Antibodies Binding Peptide Markers for WAS and XLA. Antibodies and antigen binding fragments thereof are provided that bind to signature peptide biomarkers of the present disclosure. In particular embodiments, the anti-peptide antibodies and antigen binding fragments thereof generated against peptides of proteins reduced or absent in WAS and XLA can be used in an immuno-SRM method to reliably diagnose WAS and XLA. In particular embodiments, antibodies and antigen binding fragments thereof of the disclosure include recombinant antibodies and antigen binding fragments thereof.

In particular embodiments, antibodies and antigen binding fragments thereof of the disclosure include complementarity determining regions (CDRs), variable heavy domains (VH), variable light domains (VL), heavy chains, and light chains shown in Tables 2 and 3.

TABLE 2

Exemplary sequences of CDRs of antibodies that bind WASp 289 and BTK 545

| Antibody | CDRH1 SEQ ID NO: | Sequence | CDRH2 SEQ ID NO: | Sequence | CDRH3 SEQ ID NO: | Sequence |
| --- | --- | --- | --- | --- | --- | --- |
| Anti-WASp 289 | 3 | SSDMT | 4 | YMSSNDRPYYAS WANG | 5 | GVLGTRSIHI |
| Anti-BTK 545 | 9 | STFVVS | 10 | SIDVGSSGITYYAS WAKG | 11 | GTNFGF |

| Antibody | CDRL1 SEQ ID NO: | Sequence | CDRL2 SEQ ID NO: | Sequence | CDRL3 SEQ ID NO: | Sequence |
| --- | --- | --- | --- | --- | --- | --- |
| Anti-WASp 289 | 6 | QASESVYS DNRLS | 7 | GASTLAS | 8 | AGYKSSNQDGIG |
| Anti-BTK 545 | 12 | QASESVYS DNRLS | 13 | QASKLET | 14 | AGYKGSSSDGHG |

TABLE 3

Exemplary amino acid sequences of VH, VL, heavy chain, and light chain of antibodies that bind WASp 289 and BTK 545

| Antibody region | SEQ ID NO: | Amino acid sequence |
| --- | --- | --- |
| Anti-WASp 289 VH (without leader peptide) | 15 | QSVEESGGRLVTPGTPLTLTCTVSGFSLSSSDMTWVRQAPGKGLEYIGY MSSNDRPYYASWANGRFTISKTSTTVTLKITSPTTEDTATYFCCRGVLGT RSIHIWGPGTLVTVSL |
| Anti-WASp 289 VL (without leader peptide) | 16 | IVMTQTPSPVSAAVGGTVTINCQASESVYSDNRLSWYQQKPGQPPKQLI YGASTLASEVSSRFKGSGSGTQFTLTINDVVCDDAATYYCAGYKSSNQD GIGFGGGTEVVVK |
| Anti-WASp 289 heavy chain (without leader peptide) | 17 | QSVEESGGRLVTPGTPLTLTCTVSGFSLSSSDMTWVRQAPGKGLEYIGY MSSNDRPYYASWANGRFTISKTSTTVTLKITSPTTEDTATYFCCRGVLGT RSIHIWGPGTLVTVSLGQPKAPSVFPLAPCCGDTPSSTVTLGCLVKGYLP EPVTVTWNSGTLTNGVRTFPSVRQSSGLYSLSSVVSVTSSSQPVTCNVA HPATNTKVDKTVAPSTCSKPMCPPPELLGGPSVFIFPPKPKDTLMISRTP EVTCVVVDVSQDDPEVQFTWYINNEQVRTARPPLREQQFNSTIRVVSTL PIAHQDWLRGKEFKCKVHNKALPAPIEKTISKARGQPLEPKVYTMGPPR EELSSRSVSLTCMINGFYPSDISVEWEKNGKAEDNYKTTPAVLDSDGSY FLYSKLSVPTSEWQRGDVFTCSVMHEALHNHYTQKSISRSPGK |
| Anti-WASp 289 light chain (without leader peptide) | 18 | IVMTQTPSPVSAAVGGTVTINCQASESVYSDNRLSWYQQKPGQPPKQLI YGASTLASEVSSRFKGSGSGTQFTLTINDVVCDDAATYYCAGYKSSNQD GIGFGGGTEVVVKGDPVAPTVLIFPPSADLVATGTVTIVCVANKYFPDVT VTWEVDGTTQTTGIENSKTPQNSADCTYNLSSTLTLTSTQYNSHKEYTC KVTQGTTSVVXSFNRGDC |
| Anti-WASp 289 VH (with leader peptide) | 19 | METGLRWLLLVAVLKGVQCQSVEESGGRLVTPGTPLTLTCTVSGFSLSS SDMTWVRQAPGKGLEYIGYMSSNDRPYYASWANGRFTISKTSTTVTLKI TSPTTEDTATYFCCRGVLGTRSIHIWGPGTLVTVSL |
| Anti-WASp 289 VL (with leader peptide) | 20 | MDTRAPTQLLGLLLLWLPGATFAIVMTQTPSPVSAAVGGTVTINCQASES VYSDNRLSWYQQKPGQPPKQLIYGASTLASEVSSRFKGSGSGTQFTLTI NDVVCDDAATYYCAGYKSSNQDGIGFGGGTEVVVK |
| Anti-WASp 289 heavy chain (with leader peptide) | 21 | METGLRWLLLVAVLKGVQCQSVEESGGRLVTPGTPLTLTCTVSGFSLSS SDMTWVRQAPGKGLEYIGYMSSNDRPYYASWANGRFTISKTSTTVTLKI TSPTTEDTATYFCCRGVLGTRSIHIWGPGTLVTVSLGQPKAPSVFPLAPC CGDTPSSTVTLGCLVKGYLPEPVTVTWNSGTLTNGVRTFPSVRQSSGLY SLSSVVSVTSSSQPVTCNVAHPATNTKVDKTVAPSTCSKPMCPPPELLG GPSVFIFPPKPKDTLMISRTPEVTCVVVDVSQDDPEVQFTWYINNEQVRT ARPPLREQQFNSTIRVVSTLPIAHQDWLRGKEFKCKVHNKALPAPIEKTIS KARGQPLEPKVYTMGPPREELSSRSVSLTCMINGFYPSDISVEWEKNGK AEDNYKTTPAVLDSDGSYFLYSKLSVPTSEWQRGDVFTCSVMHEALHN HYTQKSISRSPGK |

TABLE 3-continued

Exemplary amino acid sequences of VH, VL, heavy chain, and
light chain of antibodies that bind WASp 289 and BTK 545

| Antibody region | SEQ ID NO: | Amino acid sequence |
|---|---|---|
| Anti-WASp 289 light chain (with leader peptide) | 22 | MDTRAPTQLLGLLLLWLPGATFAIVMTQTPSPVSAAVGGTVTINCQASES VYSDNRLSWYQQKPGQPPKQLIYGASTLASEVSSRFKGSGSGTQFTLTI NDVVCDDAATYYCAGYKSSNQDGIGFGGGTEVVVKGDPVAPTVLIFPPS ADLVATGTVTIVCVANKYFPDVTVTWEVDGTTQTTGIENSKTPQNSADC TYNLSSTLTLTSTQYNSHKEYTCKVTQGTTSVVXSFNRGDC |
| Anti-BTK 545 VH (without leader peptide) | 23 | QSLQGSGGGLFQPGGFLALTCKASGFSFSSTFVVSLIRQAPGKGLEWIA SIDVGSSGITYYASWAKGRFTISKTSSTTVTLQMTSLTAADTATYFCARG TNFGFWGPGTLVTVSS |
| Anti-BTK 545 VL (without leader peptide) | 24 | IVMTQTPSSKSVPVGDTVTINCQASESVYSDNRLSWFQQKQGQPPKLLI YQASKLETGVPSRFSGSGSGTQFTLTISDVVCDDAATYYCAGYKGSSSD GHGFGGGTEVVVK |
| Anti-BTK 545 heavy chain (without leader peptide) | 25 | QSLQGSGGGLFQPGGFLALTCKASGFSFSSTFVVSLIRQAPGKGLEWIA SIDVGSSGITYYASWAKGRFTISKTSSTTVTLQMTSLTAADTATYFCARG TNFGFWGPGTLVTVSSGQPKAPSVFPLAPCCGDTPSSTVTLGCLVKGYL PEPVTVTWNSGTLTNGVRTFPSVRQSSGLYSLSSVVSVTSSSQPVTCNV AHPATNTKVDKTVAPSTCSKPMCPPPELLGGPSVFIFPPKPKDTLMISRT PEVTCVVVDVSQDDPEVQFTWYINNEQVRTARPPLREQQFNSTIRVVST LPIAHQDWLRGKEFKCKVHNKALPAPIEKTISKARGQPLEPKVYTMGPPR EELSSRSVSLTCMINGFYPSDISVEWEKNGKAEDNYKTTPAVLDSDGSY FLYSKLSVPTSEWQRGDVFTCSVMHEALHNHYTQKSISRSPGK |
| Anti-BTK 545 light chain (without leader peptide) | 26 | IVMTQTPSSKSVPVGDTVTINCQASESVYSDNRLSWFQQKQGQPPKLLI YQASKLETGVPSRFSGSGSGTQFTLTISDVVCDDAATYYCAGYKGSSSD GHGFGGGTEVVVKGDPVAPTVLIFPPAADQVATGTVTIVCVANKYFPDV TVTWEVDGTTQTTGIENSKTPQNSADCTYNLSSTLTLTSTQYNSHKEYT CKVTQGTTSVVQSFNRGDC |
| Anti-BTK 545 VH (with leader peptide) | 27 | METGLRWLLLVAVLKGVRCQSLQGSGGGLFQPGGFLALTCKASGFSFS STFVVSLIRQAPGKGLEWIASIDVGSSGITYYASWAKGRFTISKTSSTTVT LQMTSLTAADTATYFCARGTNFGFWGPGTLVTVSS |
| Anti-BTK 545 VL (with leader peptide) | 28 | MDTRAPTQLLGLLLLWLPGATFAIVMTQTPSSKSVPVGDTVTINCQASES VYSDNRLSWFQQKQGQPPKLLIYQASKLETGVPSRFSGSGSGTQFTLTI SDVVCDDAATYYCAGYKGSSSDGHGFGGGTEVVVK |
| Anti-BTK 545 heavy chain (with leader peptide) | 29 | METGLRWLLLVAVLKGVRCQSLQGSGGGLFQPGGFLALTCKASGFSFS STFVVSLIRQAPGKGLEWIASIDVGSSGITYYASWAKGRFTISKTSSTTVT LQMTSLTAADTATYFCARGTNFGFWGPGTLVTVSSGQPKAPSVFPLAP CCGDTPSSTVTLGCLVKGYLPEPVTVTWNSGTLTNGVRTFPSVRQSSG LYSLSSVVSVTSSSQPVTCNVAHPATNTKVDKTVAPSTCSKPMCPPPEL LGGPSVFIFPPKPKDTLMISRTPEVTCVVVDVSQDDPEVQFTWYINNEQV RTARPPLREQQFNSTIRVVSTLPIAHQDWLRGKEFKCKVHNKALPAPIEK TISKARGQPLEPKVYTMGPPREELSSRSVSLTCMINGFYPSDISVEWEKN GKAEDNYKTTPAVLDSDGSYFLYSKLSVPTSEWQRGDVFTCSVMHEAL HNHYTQKSISRSPGK |
| Anti-BTK 545 light chain (with leader peptide) | 30 | MDTRAPTQLLGLLLLWLPGATFAIVMTQTPSSKSVPVGDTVTINCQASES VYSDNRLSWFQQKQGQPPKLLIYQASKLETGVPSRFSGSGSGTQFTLTI SDVVCDDAATYYCAGYKGSSSDGHGFGGGTEVVVKGDPVAPTVLIFPP AADQVATGTVTIVCVANKYFPDVTVTWEVDGTTQTTGIENSKTPQNSAD CTYNLSSTLTLTSTQYNSHKEYTCKVTQGTTSVVQSFNRGDC |

In particular embodiments, an exemplary antibody or antigen binding fragment thereof includes an anti-WASp 289 VH domain with a leader sequence encoded by SEQ ID NO: 31. In particular embodiments, an exemplary antibody or antigen binding fragment thereof includes an anti-WASp 289 VL domain with a leader sequence encoded by SEQ ID NO: 32. In particular embodiments, an exemplary antibody or antigen binding fragment thereof includes an anti-WASp 289 heavy chain with a leader sequence encoded by SEQ ID NO: 33. In particular embodiments, an exemplary antibody or antigen binding fragment thereof includes an anti-WASp 289 light chain with a leader sequence encoded by SEQ ID NO: 34. In particular embodiments, an exemplary antibody or antigen binding fragment thereof includes an anti-BTK 545 VH domain with a leader sequence encoded by SEQ ID NO: 35. In particular embodiments, an exemplary antibody or antigen binding fragment thereof includes an anti-BTK 545 VL domain with a leader sequence encoded by SEQ ID NO: 36. In particular embodiments, an exemplary antibody or antigen binding fragment thereof includes an anti-BTK 545 heavy chain with a leader sequence encoded by SEQ ID NO: 37. In particular embodiments, an exemplary antibody or antigen binding fragment thereof includes an anti-BTK 545 light chain with a leader sequence encoded by SEQ ID NO: 38.

In particular embodiments, an exemplary antibody or antigen binding fragment thereof includes an anti-WASp 289 VH domain without a leader sequence encoded by SEQ ID NO: 62. In particular embodiments, an exemplary antibody or antigen binding fragment thereof includes an anti-WASp 289 VL domain without a leader sequence encoded by SEQ ID NO: 63. In particular embodiments, an exemplary antibody or antigen binding fragment thereof includes an anti-WASp 289 heavy chain without a leader sequence encoded by SEQ ID NO: 64. In particular embodiments, an exemplary antibody or antigen binding fragment thereof includes an anti-WASp 289 light chain without a leader sequence encoded by SEQ ID NO: 65. In particular embodiments, an exemplary antibody or antigen binding fragment thereof includes an anti-BTK 545 VH domain without a leader sequence encoded by SEQ ID NO: 66. In particular embodiments, an exemplary antibody or antigen binding fragment thereof includes an anti-BTK 545 VL domain without a leader sequence encoded by SEQ ID NO: 67. In particular embodiments, an exemplary antibody or antigen binding fragment thereof includes an anti-BTK 545 heavy chain without a leader sequence encoded by SEQ ID NO: 68. In particular embodiments, an exemplary antibody or antigen binding fragment thereof includes an anti-BTK 545 light chain without a leader sequence encoded by SEQ ID NO: 69.

An antibody includes a polypeptide ligand substantially encoded by an immunoglobulin gene or immunoglobulin genes, or fragments thereof, whether natural, or partially or wholly synthetically produced. An antibody specifically (or selectively) binds and recognizes an epitope (e.g., an antigen). An antibody can include any protein having a binding domain that is homologous or largely homologous to an immunoglobulin binding domain. An antibody may be monoclonal or polyclonal. The antibody may be a member of any immunoglobulin class, including any of the human classes: IgG, IgM, IgA, IgD, and IgE, etc. The recognized immunoglobulin genes include the kappa and lambda light chain constant region genes, the alpha, gamma, delta, epsilon and mu heavy chain constant region genes, and the myriad immunoglobulin variable region genes. "Fc" portion of an antibody refers to that portion of an immunoglobulin heavy chain that includes one or more heavy chain constant region domains, CH1, CH2 and CH3, but does not include the heavy chain variable region.

An intact antibody includes at least two heavy (H) chains and two light (L) chains inter-connected by disulfide bonds. Each heavy chain is composed of a heavy chain variable region (abbreviated herein as VH or $V_H$) and a heavy chain constant region. The heavy chain constant region includes three domains, CH1, CH2 and CH3. Each light chain is composed of a light chain variable region (abbreviated herein as VL or $V_L$) and a light chain constant region. The light chain constant region includes one domain, CL. The VH and VL regions can be further subdivided into regions of hypervariability, termed complementarity determining regions (CDR), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, FR4. The variable regions of the heavy and light chains contain a binding domain that interacts with an antigen. The constant regions of the antibodies can mediate the binding of the immunoglobulin to host tissues or factors, including various cells of the immune system (e.g., effector cells) and the first component (C1q) of the classical complement system.

An antibody fragment includes any derivative or portion of an antibody that is less than full-length. In particular embodiments, the antibody fragment retains at least a significant portion of the full-length antibody's specific binding ability as a binding partner. Examples of antibody fragments include Fab, Fab', Fab'-SH, F(ab')$_2$, single chain variable fragment (scFv), Fv, dsFv diabody, and Fd fragments, and/or any biologically effective fragments of an immunoglobulin that bind specifically to an epitope described herein. Antibodies or antibody fragments include all or a portion of polyclonal antibodies, monoclonal antibodies, human antibodies, humanized antibodies, synthetic antibodies, chimeric antibodies, bispecific antibodies, mini bodies, and linear antibodies.

A single chain variable fragment (scFv) is a fusion protein of the variable regions of the heavy and light chains of immunoglobulins connected with a short linker peptide. Fv fragments include the VL and VH domains of a single arm of an antibody. Although the two domains of the Fv fragment, VL and VH, are coded by separate genes, they can be joined, using, for example, recombinant methods, by a synthetic linker that enables them to be made as a single protein chain in which the VL and VH regions pair to form monovalent molecules (single chain Fv (scFv)). For additional information regarding Fv and scFv, see e.g., Bird, et al., Science 242 (1988) 423-426; Huston, et al., Proc. Natl. Acad. Sci. USA 85 (1988) 5879-5883; Plueckthun, in The Pharmacology of Monoclonal Antibodies, vol. 113, Rosenburg and Moore (eds.), Springer-Verlag, New York), (1994) 269-315; WO1993/16185; U.S. Pat. Nos. 5,571,894; and 5,587,458.

A Fab fragment is a monovalent antibody fragment including VL, VH, CL and CH1 domains. A F(ab')$_2$ fragment is a bivalent fragment including two Fab fragments linked by a disulfide bridge at the hinge region. For discussion of Fab and F(ab')$_2$ fragments having increased in vivo half-life, see U.S. Pat. No. 5,869,046. Diabodies include two epitope-binding sites that may be bivalent. See, for example, EP 0404097; WO1993/01161; and Holliger, et al., Proc. Natl. Acad. Sci. USA 90 (1993) 6444-6448. Dual affinity retargeting antibodies (DART™; based on the diabody format but featuring a C-terminal disulfide bridge for additional stabilization (Moore et al., Blood 117, 4542-51 (2011)) can also be used. Antibody fragments can also include isolated CDRs. For a review of antibody fragments, see Hudson, et al., Nat. Med. 9 (2003) 129-134.

The antibody fragment may be produced by any means. For example, the antibody fragment may be enzymatically or chemically produced by fragmentation of an intact antibody or it may be recombinantly produced from a gene encoding the partial antibody sequence. Alternatively, the antibody fragment may be wholly or partially synthetically produced. The antibody fragment may include a single chain antibody fragment. In another embodiment, the fragment may include multiple chains that are linked together, for example, by disulfide linkages. The fragment may also include a multimolecular complex. A functional antibody fragment may typically include at least 50 amino acids and more typically will include at least 200 amino acids.

In particular embodiments, recombinant immunoglobulins can be produced. See, Cabilly, U.S. Pat. No. 4,816,567, and Queen et al., Proc Natl Acad Sci USA, 86:10029-10033 (1989).

An "isolated" antibody is one which has been separated from a component of its natural environment. In particular embodiments, an antibody is purified to greater than 95% or 99% purity as determined by, for example, electrophoretic (e.g., SDS-PAGE, isoelectric focusing (IEF), capillary electrophoresis) or chromatographic (e.g., ion exchange or reverse phase high performance liquid chromatography (HPLC)). For review of methods for assessment of antibody purity, see, e.g., Flatman et al. (2007) Chromatogr. B 848: 79-87.

As indicated, in particular embodiments, binding domains of an engineered antibody or antigen binding fragment may be joined through a linker. A linker is an amino acid sequence which can provide flexibility and room for conformational movement between the binding domains of an engineered antibody or antigen binding fragment. Any appropriate linker may be used. Examples of linkers can be found in Chen et al., Adv Drug Deliv Rev. 2013 Oct. 15; 65(10): 1357-1369. Linkers can be flexible, rigid, or semi-rigid, depending on the desired functional domain presentation to a target. Commonly used flexible linkers include Gly-Ser linkers such as GGSGGGSGGSG (SEQ ID NO: 39), GGSGGGSGSG (SEQ ID NO: 40) and GGSGGGSG (SEQ ID NO: 41). Additional examples include: GGGGSGGGGS (SEQ ID NO: 42); GGGSGGGS (SEQ ID NO: 43); and GGSGGS (SEQ ID NO: 44). Linkers that include one or more antibody hinge regions and/or immunoglobulin heavy chain constant regions, such as CH3 alone or a CH2CH3 sequence can also be used.

It will also be understood by one of ordinary skill in the art that antibodies may undergo a variety of posttranslational modifications. The type and extent of these modifications often depends on the host cell line used to express the antibody as well as the culture conditions. Such modifications may include variations in glycosylation, methionine oxidation, diketopiperazine formation, aspartate isomerization and asparagine deamidation.

A monoclonal antibody includes an antibody obtained from a population of substantially homogeneous antibodies, i.e., the individual antibodies including the population are identical and/or bind the same epitope, except for possible variants that may arise during production of the monoclonal antibody, such variants generally being present in minor amounts. In contrast to polyclonal antibody preparations that typically include different antibodies directed against different determinants (epitopes), each monoclonal antibody is directed against a single determinant on the antigen. This type of antibody is produced by the daughter cells of a single antibody-producing hybridoma. A monoclonal antibody typically displays a single binding affinity for any epitope with which it binds.

The modifier "monoclonal" indicates the character of the antibody as being obtained from a homogeneous population of antibodies and is not to be construed as requiring production of the antibody by any particular method. Monoclonal antibodies recognize only one type of antigen. The monoclonal antibodies herein include "chimeric" antibodies (immunoglobulins) in which a portion of the heavy and/or light chain is identical with or homologous to corresponding sequences in antibodies derived from a particular species or belonging to a particular antibody class or subclass, while the remainder of the chain(s) is identical with or homologous to corresponding sequences in antibodies derived from another species or belonging to another antibody class or subclass, as well as fragments of such antibodies. Techniques for the production of antibodies are well known in the art and described in, e.g., Harlow and Lane "Antibodies, A Laboratory Manual", Cold Spring Harbor Laboratory Press, 1988; Harlow and Lane "Using Antibodies: A Laboratory Manual" Cold Spring Harbor Laboratory Press, 1999; Tickle et al. JALA: Journal of the Association for Laboratory Automation. 2009; 14(5): 303-307; Babcook et al. Proc. Natl. Acad. Sci. U.S.A. 1996; 93: 7843-7848; and U.S. Pat. No. 5,627,052.

A "human antibody" is one which includes an amino acid sequence which corresponds to that of an antibody produced by a human or a human cell or derived from a non-human source that utilizes human antibody repertoires or other human antibody-encoding sequences.

A "human consensus framework" is a framework that represents the most commonly occurring amino acid residues in a selection of human immunoglobulin $V_L$ or $V_H$ framework sequences. Generally, the selection of human immunoglobulin $V_L$ or $V_H$ sequences is from a subgroup of variable domain sequences. The subgroup of sequences can be a subgroup as in Kabat et al., Sequences of Proteins of Immunological Interest, Fifth Edition, NIH Publication 91-3242, Bethesda Md. (1991), vols. 1-3. In particular embodiments, for the $V_L$, the subgroup is subgroup kappa I as in Kabat et al. (supra). In particular embodiments, for the $V_H$, the subgroup is subgroup III as in Kabat et al. (supra).

A "humanized" antibody refers to a chimeric antibody including amino acid residues from non-human CDRs and amino acid residues from human FRs. In particular embodiments, a humanized antibody will include substantially all of at least one, and typically two, variable domains, in which all or substantially all of the CDRs correspond to those of a non-human antibody, and all or substantially all of the FRs correspond to those of a human antibody. A humanized antibody optionally may include at least a portion of an antibody constant region derived from a human antibody. A "humanized form" of an antibody, e.g., a non-human antibody, refers to an antibody that has undergone humanization.

Humanized antibodies and methods of making them are reviewed, e.g., in Almagro and Fransson, Front. Biosci. 13:1619-1633, 2008, and are further described, e.g., in Riechmann et al., Nature 332:323-329, 1988; Queen et al., Proc. Nat'l Acad. Sci. USA 86:10029-10033, 1989; U.S. Pat. Nos. 5,821,337, 7,527,791, 6,982,321, and 7,087,409; Kashmiri et al., Methods 36:25-34, 2005 (describing SDR (a-CDR) grafting); Padlan, Mol. Immunol. 28:489-498, 1991 (describing "resurfacing"); Dall'Acqua et al., Methods 36:43-60, 2005 (describing "FR shuffling"); and Osbourn et al., Methods 36:61-68, 2005 and Klimka et al., Br. J. Cancer, 83:252-260, 2000 (describing the "guided selection" approach to FR shuffling). EP-B-0239400 provides additional description of "CDR-grafting", in which one or more CDR sequences of a first antibody is/are placed within a framework of sequences not of that antibody, for instance of another antibody.

Human framework regions that may be used for humanization include: framework regions selected using the "best-fit" method (see, e.g., Sims et al. J. Immunol. 151:2296, 1993); framework regions derived from the consensus sequence of human antibodies of a particular subgroup of light or heavy chain variable regions (see, e.g., Carter et al., Proc. Nati. Acad. Sci. USA, 89:4285, 1992; and Presta et al., J. Immunol., 151:2623, 1993); human mature (somatically mutated) framework regions or human germline framework regions (see, e.g., Almagro and Fransson, Front. Biosci. 13:1619-1633, 2008); and framework regions derived from screening FR libraries (see, e.g., Baca et al., J. Biol. Chem. 272:10678-10684, 1997; and Rosok et al., J. Biol. Chem. 271:22611-22618, 1996).

In particular embodiments "affinity" refers to the strength of the sum total of noncovalent interactions between a single binding site of a molecule (e.g., an antibody) and its binding partner (e.g., an antigen). Unless indicated otherwise, as used herein, "binding affinity" refers to intrinsic binding affinity which reflects a 1:1 interaction between members of a binding pair (e.g., antibody and peptide). The affinity of a molecule X for its partner Y can generally be represented by the dissociation constant ($K_D$) or the association constant ($K_A$). Affinity can be measured by common methods known in the art. In particular embodiments, $K_D$ can be characterized using radiolabeled antigen binding assays (RIA) or surface plasmon resonance assays.

In particular embodiments, "bind" means that the binding domain of an antibody associates with its target peptide with a dissociation constant ($K_D$) of $10^{-8}$ M or less, in particular embodiments of from $10^{-5}$ M to $10^{-13}$ M, in particular embodiments of from $10^{-5}$ M to $10^{-10}$ M, in particular embodiments of from $10^{-5}$ M to $10^{-7}$ M, in particular embodiments of from $10^{-8}$ M to $10^{-13}$ M, or in particular embodiments of from $10^{-9}$ M to $10^{-13}$ M. The term can be further used to indicate that the binding domain does not bind to other biomolecules present, (e.g., it binds to other biomolecules with a dissociation constant ($K_D$) of $10^{-4}$ M or more, in particular embodiments of from $10^{-4}$ M to 1 M).

In particular embodiments, "bind" means that the binding domain of an antibody associates with its target peptide with an affinity constant (i.e., association constant, $K_A$) of $10^7$ $M^{-1}$ or more, in particular embodiments of from $10^5$ $M^{-1}$ to $10^{13}$ $M^{-1}$, in particular embodiments of from $10^5$ $M^{-1}$ to $10^{10}$ $M^{-1}$, in particular embodiments of from $10^5$ $M^{-1}$ to $10^8$ $M^{-1}$, in particular embodiments of from $10^7$ $M^{-1}$ to $10^{13}$ $M^{-1}$, or in particular embodiments of from $10^7$ $M^{-1}$ to $10^8$ $M^{-1}$. The term can be further used to indicate that the binding domain does not bind to other biomolecules present, (e.g., it binds to other biomolecules with an association constant ($K_A$) of $10^4$ $M^{-1}$ or less, in particular embodiments of from $10^4$ $M^{-1}$ to 1 $M^{-1}$).

An antibody that binds to the same epitope as an antibody disclosed herein refers to an antibody that blocks binding of the antibody disclosed herein to its respective peptide in a competition assay by 50% or more, and conversely, the antibody disclosed herein blocks binding of the antibody to its antigen in a competition assay by 50% or more. In an exemplary competition assay, immobilized WASp 289 or BTK 545 peptide is incubated in a solution including a first labeled antibody that binds to WASp 289 or BTK 545 peptide and a second unlabeled antibody that is being tested for its ability to compete with anti-WASp 289 or anti-BTK 545 for binding to WASp 289 or BTK 545 peptide, respectively. As a control, immobilized WASp 289 or BTK 545 peptide is incubated in a solution including the first labeled antibody that binds to WASp 289 or BTK 545 peptide but not the second unlabeled antibody. After incubation under conditions permissive for binding of anti-WASp 289 or anti-BTK 545 to its respective peptide, excess unbound antibody is removed, and the amount of label associated with immobilized WASp 289 or BTK 545 peptide is measured. If the amount of label associated with immobilized WASp 289 or BTK 545 peptide is substantially reduced in the test sample relative to the control sample, then that indicates that the second antibody is competing with anti-WASp 289 or anti-BTK 545 for binding to WASp 289 or BTK 545 peptide, respectively. See Harlow and Lane (1988) Antibodies: A Laboratory Manual ch.14 (Cold Spring Harbor Laboratory, Cold Spring Harbor, NY).

(iv) Variants. Variants of antibodies described herein are also included. Variants of antibodies can include those having one or more conservative amino acid substitutions or one or more non-conservative substitutions that do not adversely affect the binding of the protein.

In particular embodiments, a conservative amino acid substitution may not substantially change the structural characteristics of the reference sequence (e.g., a replacement amino acid should not disrupt antibody/peptide binding). Examples of art-recognized polypeptide secondary and tertiary structures are described in Proteins, Structures and Molecular Principles (Creighton, Ed., W. H. Freeman and Company, New York (1984)); Introduction to Protein Structure (C. Branden & J. Tooze, eds., Garland Publishing, New York, N.Y. (1991)); and Thornton et al., Nature, 354:105 (1991).

Naturally occurring amino acids are generally divided into conservative substitution families as follows: Group 1: Alanine (Ala), Glycine (Gly), Serine (Ser), and Threonine (Thr); Group 2: (acidic): Aspartic acid (Asp), and Glutamic acid (Glu); Group 3: (acidic; also classified as polar, negatively charged residues and their amides): Asparagine (Asn), Glutamine (Gln), Asp, and Glu; Group 4: Gln and Asn; Group 5: (basic; also classified as polar, positively charged residues): Arginine (Arg), Lysine (Lys), and Histidine (His); Group 6 (large aliphatic, nonpolar residues): Isoleucine (Ile), Leucine (Leu), Methionine (Met), Valine (Val) and Cysteine (Cys); Group 7 (uncharged polar): Tyrosine (Tyr), Gly, Asn, Gln, Cys, Ser, and Thr; Group 8 (large aromatic residues): Phenylalanine (Phe), Tryptophan (Trp), and Tyr; Group 9 (non-polar): Proline (Pro), Ala, Val, Leu, Ile, Phe, Met, and Trp; Group 11 (aliphatic): Gly, Ala, Val, Leu, and Ile; Group 10 (small aliphatic, nonpolar or slightly polar residues): Ala, Ser, Thr, Pro, and Gly; and Group 12 (sulfur-containing): Met and Cys. Additional information can be found in Creighton (1984) Proteins, W.H. Freeman and Company.

In making such changes, the hydropathic index of amino acids may be considered. The importance of the hydropathic amino acid index in conferring interactive biologic function on a protein is generally understood in the art (Kyte and Doolittle, 1982, J. Mol. Biol. 157(1), 105-32). Each amino acid has been assigned a hydropathic index on the basis of its hydrophobicity and charge characteristics (Kyte and Doolittle, 1982). These values are: Ile (+4.5); Val (+4.2); Leu (+3.8); Phe (+2.8); Cys (+2.5); Met (+1.9); Ala (+1.8); Gly (−0.4); Thr (−0.7); Ser (−0.8); Trp (−0.9); Tyr (−1.3); Pro (−1.6); His (−3.2); Glutamate (−3.5); Gln (−3.5); aspartate (−3.5); Asn (−3.5); Lys (−3.9); and Arg (−4.5).

It is known in the art that certain amino acids may be substituted by other amino acids having a similar hydropathic index or score and still result in a protein with similar biological activity, i.e., still obtain a biological functionally equivalent protein. In making such changes, the substitution of amino acids whose hydropathic indices are within ±2 is preferred, those within ±1 are particularly preferred, and those within ±0.5 are even more particularly preferred. It is also understood in the art that the substitution of like amino acids can be made effectively on the basis of hydrophilicity.

As detailed in U.S. Pat. No. 4,554,101, the following hydrophilicity values have been assigned to amino acid residues: Arg (+3.0); Lys (+3.0); aspartate (+3.0±1); glutamate (+3.0±1); Ser (+0.3); Asn (+0.2); Gln (+0.2); Gly (0); Thr (−0.4); Pro (−0.5±1); Ala (−0.5); His (−0.5); Cys (−1.0); Met (−1.3); Val (−1.5); Leu (−1.8); Ile (−1.8); Tyr (−2.3); Phe (−2.5); Trp (−3.4). It is understood that an amino acid can be substituted for another having a similar hydrophilicity value and still obtain a biologically equivalent, and in particular, an immunologically equivalent protein. In such changes, the substitution of amino acids whose hydrophilicity values are within ±2 is preferred, those within ±1 are particularly preferred, and those within ±0.5 are even more particularly preferred.

As outlined above, amino acid substitutions may be based on the relative similarity of the amino acid side-chain substituents, for example, their hydrophobicity, hydrophilicity, charge, size, and the like.

In particular embodiments, a $V_L$ region can be derived from or based on a disclosed $V_L$ and can include one or more (e.g., 2, 3, 4, 5, 6, 7, 8, 9, 10) insertions, one or more (e.g., 2, 3, 4, 5, 6, 7, 8, 9, 10) deletions, one or more (e.g., 2, 3, 4, 5, 6, 7, 8, 9, 10) amino acid substitutions (e.g., conservative amino acid substitutions), or a combination of the above-noted changes, when compared with the disclosed $V_L$. An insertion, deletion or substitution may be anywhere in the $V_L$ region, including at the amino- or carboxy-terminus or both ends of this region, provided that each CDR includes zero changes or at most one, two, or three changes and provided an antibody including the modified $V_L$ region can still specifically bind its target epitope with an affinity similar to the wild type binding domain.

In particular embodiments, a $V_H$ region can be derived from or based on a disclosed $V_H$ and can include one or more (e.g., 2, 3, 4, 5, 6, 7, 8, 9, 10) insertions, one or more (e.g., 2, 3, 4, 5, 6, 7, 8, 9, 10) deletions, one or more (e.g., 2, 3, 4, 5, 6, 7, 8, 9, 10) amino acid substitutions (e.g., conservative amino acid substitutions or non-conservative amino acid substitutions), or a combination of the above-noted changes, when compared with the $V_H$ disclosed herein. An insertion, deletion or substitution may be anywhere in the $V_H$ region, including at the amino- or carboxy-terminus or both ends of this region, provided that each CDR includes zero changes or at most one, two, or three changes and provided an antibody including the modified $V_H$ region can still specifically bind its target epitope with an affinity similar to the wild type binding domain.

In particular embodiments, a variant includes or is a sequence that has at least 90%, at least 91%, at least 92%, at least 93%, at least 94%, at least 95%, at least 96%, at least 97%, at least 98%, at least 99%, at least 99.5% sequence identity to an antibody sequence disclosed herein. In particular embodiments, a variant includes or is a sequence that has at least 90%, at least 91%, at least 92%, at least 93%, at least 94%, at least 95%, at least 96%, at least 97%, at least 98%, at least 99%, at least 99.5% sequence identity to a light chain variable region ($V_L$) and/or to a heavy chain variable region ($V_H$), or both, wherein each CDR includes zero changes or at most one, two, or three changes, from an antibody disclosed herein or fragment or derivative thereof that specifically binds to a WASp or BTK signature peptide.

In particular embodiments, one or more amino acid modifications may be introduced into the Fc region of an antibody, thereby generating an Fc region variant. The Fc region variant may include a human Fc region sequence (e.g., a human IgG1, IgG2, IgG3 or IgG4 Fc region) including an amino acid modification (e.g., a substitution) at one or more amino acid positions.

In particular embodiments, it may be desirable to create cysteine engineered antibodies, e.g., "thioMAbs," in which one or more residues of an antibody are substituted with cysteine residues. In particular embodiments, the substituted residues occur at accessible sites of the antibody. By substituting those residues with cysteine, reactive thiol groups are thereby positioned at accessible sites of the antibody and may be used to conjugate the antibody to other moieties, as described further below. Cysteine engineered antibodies may be generated as described, e.g., in U.S. Pat. No. 7,521,541.

In particular embodiments, modified antibodies include those wherein one or more amino acids have been replaced with a non-amino acid component, or where the amino acid has been conjugated to a functional group or a functional group has been otherwise associated with an amino acid. The modified amino acid may be, e.g., a glycosylated amino acid, a PEGylated amino acid, a farnesylated amino acid, an acetylated amino acid, a biotinylated amino acid, an amino acid conjugated to a lipid moiety, or an amino acid conjugated to an organic derivatizing agent. Amino acid(s) can be modified, for example, co-translationally or post-translationally during recombinant production (e.g., N-linked glycosylation at N-X-S/T motifs during expression in mammalian cells) or modified by synthetic means. The modified amino acid can be within the sequence or at the terminal end of a sequence. Modifications also include nitrited constructs.

In particular embodiments, variants include glycosylation variants wherein the number and/or type of glycosylation site has been altered compared to the amino acid sequences of a reference sequence. In particular embodiments, glycosylation variants include a greater or a lesser number of N-linked glycosylation sites than the reference sequence. An N-linked glycosylation site is characterized by the sequence: Asn-X-Ser or Asn-X-Thr, wherein the amino acid residue designated as X can be any amino acid residue except proline. The substitution of amino acid residues to create this sequence provides a potential new site for the addition of an N-linked carbohydrate chain. Alternatively, substitutions which eliminate this sequence will remove an existing N-linked carbohydrate chain. Also provided is a rearrangement of N-linked carbohydrate chains wherein one or more N-linked glycosylation sites (e.g., those that are naturally occurring) are eliminated and one or more new N-linked sites are created. Additional antibody variants include cysteine variants wherein one or more cysteine residues are deleted from or substituted for another amino acid (e.g., serine) as compared to the reference sequence. These cysteine variants can be useful when antibodies must be refolded into a biologically active conformation such as after the isolation of insoluble inclusion bodies. These cysteine variants generally have fewer cysteine residues than the reference sequence, and typically have an even number to minimize interactions resulting from unpaired cysteines.

PEGylation particularly is a process by which polyethylene glycol (PEG) polymer chains are covalently conjugated to other molecules such as proteins. Several methods of PEGylating proteins have been reported in the literature. For example, N-hydroxy succinimide (NHS)-PEG was used to PEGylate the free amine groups of lysine residues and N-terminus of proteins; PEGs bearing aldehyde groups have been used to PEGylate the amino-termini of proteins in the presence of a reducing reagent; PEGs with maleimide functional groups have been used for selectively PEGylating the free thiol groups of cysteine residues in proteins; and site-specific PEGylation of acetyl-phenylalanine residues can be performed.

"% sequence identity" refers to a relationship between two or more sequences, as determined by comparing the sequences. In the art, "identity" also means the degree of sequence relatedness between protein, nucleic acid, or gene sequences as determined by the match between strings of such sequences. "Identity" (often referred to as "similarity") can be readily calculated by known methods, including (but not limited to) those described in: Computational Molecular Biology (Lesk, A. M., ed.) Oxford University Press, NY (1988); Biocomputing: Informatics and Genome Projects (Smith, D. W., ed.) Academic Press, NY (1994); Computer Analysis of Sequence Data, Part I (Griffin, A. M., and Griffin, H. G., eds.) Humana Press, NJ (1994); Sequence Analysis in Molecular Biology (Von Heijne, G., ed.) Academic Press (1987); and Sequence Analysis Primer (Gribskov, M. and Devereux, J., eds.) Oxford University Press, NY (1992). Preferred methods to determine identity are designed to give the best match between the sequences tested. Methods to determine identity and similarity are codified in publicly available computer programs. Sequence alignments and percent identity calculations may be performed using the Megalign program of the LASERGENE bioinformatics computing suite (DNASTAR, Inc., Madison, Wisconsin). Multiple alignment of the sequences can also be performed using the Clustal method of alignment (Higgins and Sharp CABIOS, 5, 151-153 (1989) with default parameters (GAP PENALTY=10, GAP LENGTH PENALTY=10). Relevant programs also include the GCG suite of programs (Wisconsin Package Version 9.0, Genetics Computer Group (GCG), Madison, Wisconsin); BLASTP, BLASTN, BLASTX (Altschul, et al., J. Mol. Biol. 215:403-410 (1990); DNASTAR (DNASTAR, Inc., Madison, Wisconsin); and the FASTA program incorporating the Smith-Waterman algorithm (Pearson, Comput. Methods Genome Res., [Proc. Int. Symp.](1994), Meeting Date 1992, 111-20. Editor(s): Suhai, Sandor. Publisher: Plenum, New York, N.Y. Within the context of this disclosure it will be understood that where sequence analysis software is used for analysis, the results of the analysis are based on the "default values" of the program referenced. As used herein "default values" will mean any set of values or parameters, which originally load with the software when first initialized.

(v) Immunoconjugates of Anti-Peptide Antibodies. The disclosed antibodies and antigen binding fragments thereof can be immunoconjugates. In particular embodiments, an immunoconjugate is an antibody conjugated to one or more heterologous molecule(s), including a label.

A label can include an affinity tag. Affinity tags can include, for example, His tag (SEQ ID NO: 45), Flag tag (SEQ ID NOs: 46-48), Xpress tag (SEQ ID NO: 49), Avi tag (SEQ ID NO: 50), Calmodulin binding peptide (CBP) tag (SEQ ID NO: 51), Polyglutamate tag (SEQ ID NO: 52), HA tag (SEQ ID NOs: 53-55), Myc tag (SEQ ID NO: 56), Strep tag (which refers to the original STREP® tag (SEQ ID NO: 57), STREP® tag II (SEQ ID NO: 58) (IBA Institut fur Bioanalytik, Germany); see, e.g., U.S. Pat. No. 7,981,632), Softag 1 (SEQ ID NO: 59), Softag 3 (SEQ ID NO: 60), and V5 tag (SEQ ID NO: 61).

A label can include a detection moiety. Detection moieties that can be conjugated to an antibody or antigen binding fragment thereof of the disclosure include colored particles; gold nanoparticles; colloids; chemiluminescent tags; radioisotopes; fluorescent tags including fluorescein isothiocyanate (FITC), tetramethylrhodamine isothiocyanate (TRITC), Rhodamine Red™ (e.g., from Thermo Fisher Scientific, Waltham, MA), Cyanine fluorophores, Texas Red® (Molecular Probes, Inc., Eugene, OR), phycoerythrin (PE), R-phycoerythrin, allophycocyanin (APC), phycocyanin, phycoerythrocyanin, DyLight™ (Thermo Fisher Scientific, Waltham, MA), Alexa Fluor® (Molecular Probes, Inc., Eugene, OR), Atto dyes, or fluorescent proteins such as GFP; and enzyme reporters including horseradish peroxidase (HRP), alkaline phosphatase (AP), glucose oxidase, luciferase, and β-galactosidase. In particular embodiments, an enzyme reporter label is used in conjunction with a colorimetric, fluorogenic or chemiluminescent substrate for visualization.

Conjugation or labeling of an antibody or antigen binding fragment thereof of the disclosure to a heterologous molecule can use any method known in the art, including a variety of bifunctional protein coupling agents such as N-succinimidyl-3-(2-pyridyldithio) propionate (SPDP), succinimidyl-4-(N-maleimidomethyl) cyclohexane-1-carboxylate (SMCC), iminothiolane (IT), bifunctional derivatives of imidoesters (such as dimethyl adipimidate HCl), active esters (such as disuccinimidyl suberate), aldehydes (such as glutaraldehyde), bis-azido compounds (such as bis (p-azidobenzoyl) hexanediamine), bis-diazonium derivatives (such as bis-(p-diazoniumbenzoyl)-ethylenediamine), diisocyanates (such as toluene 2,6-diisocyanate), and bis-active fluorine compounds (such as 1,5-difluoro-2,4-dinitrobenzene). Carbon-14-labeled 1-isothiocyanatobenzyl-3-methyldiethylene triaminepentaacetic acid (MX-DTPA) is an exemplary chelating agent for conjugation of radionucleotide to an antibody (WO94/11026).

In particular embodiments, the immunoconjugates can be prepared with cross-linker reagents including N-(β-Maleimidopropyloxy)succinimide ester (BMPS), N-ε-maleimidocaproyl-oxysuccinimide ester (EMCS), N-γ-maleimidobutyryl-oxysuccinimide ester (GMBS), 1,6-Hexane-bis-vinylsulfone (HBVS), m-maleimidobenzoyl-N-hydroxysuccinimide ester (MBS), 4-(4-N-maleimidophenyl)butyric acid hydrazide (MPBH), succinimidyl 3-(bromoacetamido)propionate) (SBAP), succinimidyl iodoacetate (SIA), succinimidyl (4-iodoacetyl) aminobenzoate (SIAB), succinimidyl 4-(p-maleimidophenyl)butyrate (SMPB), succinimidyl 6-((beta-maleimidopropionamido)hexanoate (SMPH), sulfo-EMCS, sulfo-GMBS, N-κ-maleimidoundecanoyl-oxysulfosuccinimide ester (sulfo-KMUS), sulfo-MBS, sulfo-SIAB, sulfo-SMCC, sulfo-SMPB, and succinimidyl-(4-vinylsulfone) benzoate (SVSB), which are commercially available (e.g., from Pierce Biotechnology, Inc., Rockford, IL).

In particular embodiments, a linker may be a "cleavable linker". For example, an acid-labile linker, peptidase-sensitive linker, photolabile linker, dimethyl linker, or disulfide-containing linker (Chari et al., Cancer Res. 52: 127-131 (1992); U.S. Pat. No. 5,208,020) may be used.

(vi) Production of Recombinant Proteins of the Disclosure. A polypeptide (e.g., an antibody or portion of an antibody) according to the present disclosure can be produced by any means known in the art. In particular embodiments, a polypeptide is produced using recombinant DNA techniques. A nucleic acid sequence encoding a polypeptide can be prepared and assembled into a complete coding sequence by standard techniques of molecular cloning (genomic library screening, polymerase chain reaction (PCR), primer-assisted ligation, scFv libraries from yeast and bacteria, site-directed mutagenesis, etc.). The resulting coding region can be inserted into an expression vector and used to transform a suitable expression cell line.

The term "gene" refers to a nucleic acid sequence (used interchangeably with polynucleotide or nucleotide sequence) that encodes a polypeptide. This definition includes various sequence polymorphisms, mutations, and/or sequence variants wherein such alterations do not substantially affect the function of the encoded polypeptide. The term "gene" may include not only coding sequences but also regulatory regions such as promoters, enhancers, and termination regions. The term further can include all introns and other DNA sequences spliced from an mRNA transcript, along with variants resulting from alternative splice sites. Gene sequences encoding a polypeptide can be DNA or RNA that directs the expression of the polypeptide. These nucleic acid sequences may be a DNA strand sequence that is transcribed into RNA or an RNA sequence that is translated into a polypeptide. The nucleic acid sequences include both the full-length nucleic acid sequences as well as non-full-length sequences derived from the full-length polypeptide. The sequences can also include degenerate codons of the native sequence or sequences that may be introduced to provide codon preference in a specific cell type.

"Encoding" refers to the property of specific sequences of nucleotides in a gene, such as a complementary DNA (cDNA), or a messenger RNA (mRNA), to serve as templates for synthesis of other macromolecules such as a defined sequence of amino acids. Thus, a gene codes for a polypeptide if transcription and translation of mRNA corresponding to that gene produces the polypeptide in a cell or other biological system. A "gene sequence encoding a polypeptide" includes all nucleotide sequences that are degenerate versions of each other and that code for the same amino acid sequence or amino acid sequences of substantially similar form and function.

Polynucleotide gene sequences encoding a polypeptide can be operably linked to relevant regulatory sequences. For example, there can be a functional linkage between a regulatory sequence and an exogenous nucleic acid sequence resulting in expression of the latter. For another example, a first nucleic acid sequence can be operably linked with a second nucleic acid sequence when the first nucleic acid sequence is placed in a functional relationship with the second nucleic acid sequence. For instance, a promoter is operably linked to a coding sequence if the promoter affects the transcription or expression of the coding sequence.

In an exemplary nucleic acid construct (polynucleotide) employed in the present disclosure, the promoter is operably linked to a nucleic acid sequence encoding an antibody of the present disclosure or a polypeptide derived from an antibody of the present disclosure, i.e., the promoter and nucleic acid sequence are positioned so as to promote transcription of mRNA from the DNA encoding the polypeptide. The promoter can be of genomic origin or synthetically generated. The promoters may or may not be associated with enhancers, wherein the enhancers may be naturally associated with the particular promoter or associated with a different promoter. A promoter can be used that allows for constitutive or inducible expression, wherein expression can be controlled depending upon the target host, the level of expression desired, the nature of the target host, and the like.

Optionally a signal sequence can be present at the 5' end of a polynucleotide for proper targeting of a polypeptide to a cellular location or secretion from cells.

A termination region can be utilized at the 3' end of a polynucleotide for proper termination of transcription. In particular embodiments, a termination region can include polyadenylation signals. A wide variety of termination regions can be employed without adversely affecting expression.

The present disclosure further provides a vector including a polynucleotide of the present disclosure. The term "vector," as used herein, refers to e.g., any of a number of nucleic acids into which a desired sequence can be inserted, e.g., by restriction and ligation, for transport between different genetic environments or for expression in a host cell. Nucleic acid vectors can be DNA or RNA. Vectors include plasmids, phage, phagemids, bacterial genomes, and virus genomes. A cloning vector is one which can replicate in a host cell, and which is further characterized by one or more endonuclease restriction sites at which the vector can be cut in a determinable fashion and into which a desired DNA sequence can be ligated such that the new recombinant vector retains its ability to replicate in the host cell. Certain vectors are capable of autonomous replication in a host cell into which they are introduced. Other vectors are integrated into the genome of a host cell upon introduction into the host cell, and thereby are replicated along with the host genome. An expression vector is capable of expressing a polypeptide of the present disclosure, i.e., the vector sequence contains the regulatory sequences required for transcription and translation of a polypeptide, including promoters, operators, transcription termination sites, ribosome binding sites, and the like.

Vector-host systems include systems such as bacterial, mammalian, yeast, insect or plant cell systems, either in vivo (e.g., in an animal) or in vitro (e.g., in bacteria or in cell cultures). The selection of an appropriate host is deemed to be within the scope of those skilled in the art from the teachings herein. In certain embodiments, the host cell is a bacterium, e.g., *E. coli*.

Host cells are genetically engineered (infected, transduced, transformed, or transfected) with vectors of the disclosure. In particular embodiments, a host cell includes a vector including a polynucleotide of the present disclosure. The engineered host cell can be cultured in conventional nutrient media modified as appropriate for activating promoters, selecting transformants or amplifying the polynucleotides. The culture conditions, such as temperature, pH and the like, are those previously used with the host cell selected for expression and will be apparent to the ordinarily skilled artisan.

(vii) Methods of Use. Antibodies and antigen binding fragments thereof of the present disclosure can be used for immunoaffinity enrichment of signature peptides described herein. The enriched signature peptides can subsequently be detected in SRM assays for diagnosis of WAS and XLA. Signature peptides include WASp 289 and BTK 545.

In particular embodiments, enriching for signature peptides include contacting mixtures of peptide fragments from a digested biological sample with one or more binding antibodies and antigen binding fragments thereof of the disclosure that recognize the signature peptides. In particular embodiments, a biological sample includes DBS, buccal swabs, PBMC, and WBC.

In particular embodiments, antibodies including SEQ ID NOs: 3-8 and 15-22 are used to enrich for a WASp peptide including SEQ ID NO: 1.

In particular embodiments, antibodies including SEQ ID NOs: 9-14 and 23-30 are used to enrich for a BTK peptide including SEQ ID NO: 2.

Enrichment of a desired peptide target prior to SRM can be accomplished by any means known in the art. A host of enrichment procedures are available, including immuno adsorption-based depletion of abundant protein species from samples, precipitation, chromatography, electrophoresis, solvent partitioning, immunoprecipitation, immunoelectrophoresis, and immunochromatography. In particular embodiments, a SISCAPA method for specific antibody-based capture of individual tryptic peptides from a digest of a sample can be used. Anderson et al., J. Proteome Research 2004; 3: 235-244; U.S. Pat. No. 7,632,686.

In particular embodiments, the antibodies that bind the peptide markers, such as the antibodies disclosed herein, can be attached to a solid support. Particular embodiments use an affinity column, where antibodies are covalently coupled to chromatography media. In particular embodiments, POROS (Applied Biosystems, Foster City, CA) nanocolumns can be used in SISCAPA enrichment and features high binding capacity, a relatively high concentration of antibodies allowing for rapid enrichment of target peptides, and the ability to prepare columns with a variety of functionalized groups. Alternatively, antibodies can be attached to beads, magnetic beads, or other solid particle. One means of attachment is conjugation of the antibody to a protein coated on the beads. For example, Protein G coated particles offer the binding of antibodies in a preferred orientation. Other means of attachment can be used, such as direct coating of a bead with the antibody. Magnetic particles are available in a wide array of chemistries allowing for coupling to antibodies. Enrichment with antibodies attached to particles can allow parallel processing of samples. Magnetic particle processing has been automated in 96 well plates for the SISCAPA enrichment step with elution in the plates for analysis by mass spectrometry. Other particular embodiments use a novel bead trap device developed to perform the bead handling steps in line with a nanoflow chromatography system. Anderson et al. Mol Cell Proteomics 2009; 8(5): 995-1005. This minimizes losses of peptides to containers between elution and analysis steps. Peptide enrichment can also be implemented by immobilizing anti-peptide antibodies in pipet tips. Nelson et al. Anal Chem. 1995; 67(7): 1153-1158. After separation of the antibody bound peptide from free peptides, the bound peptide can be eluted. Any elution means can be used. One elution means which has been found to be efficient is 5% acetic acid/3% acetonitrile. Other elution means, including other acids, and other concentrations of acetic acid can be used, as is efficient for a particular peptide.

In particular embodiments, anti-WASp 289 and/or anti-BTK 545 antibodies disclosed in Tables 2 and 3 that bind their cognate signature peptides can be used to screen for WAS and/or XLA. In particular embodiments, anti-WASp 289 and/or anti-BTK 545 antibodies disclosed in Tables 2 and 3 that bind their cognate signature peptides can be used to screen a population for WAS and/or XLA.

Antibodies and antigen binding fragments thereof of the present disclosure can be used to detect a level of WASp 289 peptide, BTK 545 peptide, and/or their corresponding proteins described herein in a biological sample. In particular embodiments, the method includes contacting the biological sample with an anti-WASp 289 and/or an anti-BTK 545 antibody or antigen binding fragment thereof as described herein under conditions permissive for binding of the anti-WASp 289 and/or the anti-BTK 545 antibody or antigen binding fragment thereof to their respective peptides or proteins, and detecting whether a complex is formed between the anti-WASp 289 antibody or antigen binding fragment thereof and WASp 289 peptide or its corresponding protein, or between the anti-BTK 545 antibody or antigen binding fragment thereof and BTK 545 peptide or its corresponding protein. Such method may be an in vitro or in vivo method. In particular embodiments, a biological sample includes whole blood, DBS, serum, plasma, other blood fractions, cells, tissues, and a test sample derived from a subject.

In particular embodiments, antibodies including SEQ ID NOs: 3-8 and 15-22 are used to detect a WASp peptide including SEQ ID NO: 1.

In particular embodiments, antibodies including SEQ ID NOs: 9-14 and 23-30 are used to detect a BTK peptide including SEQ ID NO: 2.

In particular embodiments, detecting a level of WASp 289 peptide, BTK 545 peptide, and/or their corresponding proteins using an anti-WASp 289 and/or an anti-BTK 545 antibody or antigen binding fragment thereof is performed as part of an assay known to one of skill in the art, including immunoassays, ELISA (enzyme linked immunosorbent assay), western blot, dot blot, radioimmunological assay (RIA); sandwich assay; flow cytometry; fluorescent in situ hybridization (FISH); immunohistological staining; immunoelectrophoresis; immunoprecipitation, and immunofluorescence.

Embodiments disclosed herein can also utilize liquid chromatograph and/or mass spectrometry. In particular embodiments, one or more LC purification steps are performed prior to SRM-MS. A mixture of enriched peptides (the mobile phase) can be passed through a column packed with material (stationary phase) to separate the peptides based on their weight and affinity for the mobile and stationary phases of the column. Traditional LC analysis relies on the chemical interactions between sample components and column packing materials, where laminar flow of the sample through the column is the basis for separation of the analyte of interest from the test sample. The skilled artisan will understand that separation in such columns is a diffusional process. A variety of column packing materials are available for chromatographic separation of samples, and selection of an appropriate separation protocol is an empirical process that depends on the sample characteristics, the analyte of interest, the interfering substances present and their characteristics, etc. Various packing chemistries can be used depending on the needs (e.g., structure, polarity, and solubility of compounds being purified). In particular embodiments the columns are polar, ion exchange (both cation and anion), hydrophobic interaction, phenyl, C-2, C-8, C-18 columns, polar coating on porous polymer, or others that are commercially available. During chromatography, the separation of materials is affected by variables such as choice of eluant (also known as a "mobile phase"), choice of gradient elution and the gradient conditions, temperature, etc. In particular embodiments, an analyte may be purified by applying a sample to a column under conditions where the analyte of interest is reversibly retained by the column packing material, while one or more other materials are not retained. In these embodiments, a first mobile phase condition can be employed where the analyte of interest is retained by the column, and a second mobile phase condition can subsequently be employed to remove retained material from the column, once the non-retained materials are washed through. Alternatively, an analyte may be purified by applying a sample to a column under mobile phase conditions where the analyte of interest elutes at a differential rate in comparison to one or more other materials. As discussed above, such procedures may enrich the amount of one or more analytes of interest relative to one or more other components of the sample. In particular embodiments, the LC is microflow LC (microLC). In microflow LC, chromatographic separations are performed using flow rates in the range of low microliter per minute. In particular embodiments, the LC is nanoflow LC (nanoLC). In nanoflow LC (nanoLC) chromatographic separations are performed using a flow rate of 300 nanoliter per minute. The slowed flow rates result in high analytical sensitivity due to the large concentration efficiency afforded by this type of chromatography (Cutillas, Current Nanoscience, 2005; 1: 65-71).

A mass spectrometer includes a gas phase ion spectrometer that measures a parameter that can be translated into mass-to-charge (m/z) ratios of gas phase ions. Mass spectrometry refers to the use of a mass spectrometer to detect gas phase ions. Mass spectrometers generally include an ion source and a mass analyzer. Examples of mass spectrometers are time-of-flight (TOF), magnetic sector, quadrupole filter, ion trap, ion cyclotron resonance, electrostatic sector analyzer and hybrids of these. A laser desorption mass spectrometer includes a mass spectrometer that uses laser energy as a means to desorb, volatilize, and ionize an analyte. A tandem mass spectrometer includes any mass spectrometer that is capable of performing two successive stages of m/z-based discrimination or measurement of ions, including ions in an ion mixture. The phrase includes mass spectrometers having two mass analyzers that are capable of performing two successive stages of m/z-based discrimination or measurement of ions tandem-in-space. The phrase further includes mass spectrometers having a single mass analyzer that is capable of performing two successive stages of m/z-based discrimination or measurement of ions tandem-in-time. The phrase thus explicitly includes Qq-TOF mass spectrometers, ion trap mass spectrometers, ion trap-TOF mass spectrometers, TOF-TOF mass spectrometers, Fourier transform ion cyclotron resonance mass spectrometers, electrostatic sector-magnetic sector mass spectrometers, triple quadrupole mass spectrometers, and combinations thereof.

Ionization in mass spectrometry includes the process by which analytes in a sample are ionized. Such analytes may become charged molecules used for further analysis. For example, sample ionization may be performed by electrospray ionization (ESI), laserspray ionization (LSI) atmospheric pressure chemical ionization (APCI), photoionization, electron ionization, fast atom bombardment (FAB)/liquid secondary ionization (LSIMS), matrix assisted laser desorption ionization (MALDI), field ionization, field desorption, thermospray/plasmaspray ionization, and particle beam ionization. The skilled artisan will understand that the choice of ionization method can be determined based on the analyte to be measured, type of sample, the type of detector, the choice of positive versus negative mode, etc.

A mass analyzer includes the component of the mass spectrometer that takes ionized masses and separates them based on m/z ratios and outputs them to the detector where they are detected and later converted to a digital output. Suitable mass analyzers for determining m/z ratios include quadrupole mass analyzer, time-of-flight (TOF) mass analyzer, magnetic or electrostatic sector mass analyzer and ion trap (e.g. ion cyclotron resonance) mass analyzer.

A selected reaction monitoring (SRM)-MS assay targets a predetermined set of peptides for a given protein of interest. SRM is a tandem mass spectrometry mode in which an ion of a particular mass, the parent or precursor ion, is selected in the first stage of tandem mass spectrometry, and an ion product of a fragmentation reaction of the precursor ion is selected in the second mass spectrometry stage for detection. The specific pair of m/z values associated with a selected precursor ion and fragment ion is referred to as a transition. For each signature peptide, those fragment ions that provide optimal signal intensity and discriminate the targeted peptide from other species present in the sample are identified. Optimized transitions contribute to an effective SRM assay. Several such transitions (precursor/fragment ion pairs) are monitored over time, yielding a set of chromatographic traces with the retention time and signal intensity for a specific transition as coordinates. SRM-MS analysis of signature peptides is generally performed on a triple quadrupole mass spectrometer (QQQ-MS), an instrument with the capability to selectively isolate precursor ions corresponding to the m/z of the signature peptides and to selectively monitor peptide-specific fragment ions. In SRM analysis, the specificity depends on multiple mass analyzers (mass filters). The first quadrupole is to select the desired parent or precursor ion. The third quadrupole is to monitor the (one or more) fragment ion(s). The fragment ion(s) is generated through collisional induced dissociation in the second quadrupole. The two levels of mass selection allow high selectivity, as co-eluting background ions are filtered out very effectively. Unlike conventional tandem mass spectrometry (MS/MS) experiments that survey all analytes in a sample, SRM analysis selectively targets (filters) particular analytes, which translates into an increased sensitivity by one or two orders of magnitude compared with conventional 'full scan' techniques. In addition, SRM provides a linear response over a wide dynamic range up to five orders of magnitude. This enables the detection of low-abundance proteins in highly complex mixtures. Therefore, SRM is a highly specific detection/monitoring method with low background interference. When multiple parent ions are monitored in a single MS run, this type of analysis is known as multiple reaction monitoring (MRM). Using MRM analysis, multiple proteins and multiple regions (signature peptides) of a protein can be monitored in a single mass spectrometry run. Selected reaction monitoring/multiple reaction monitoring mass spectrometry (SRM/MRM-MS) is described in, e.g., U.S. Pat. No. 8,383,417, WO 2013/106603, and US 2013/105684.

In particular embodiments, the following parameters can be used to specify an LC-SRM-MS assay of a protein under a particular LC-SRM-MS system: (1) an enriched tryptic peptide of a given protein; (2) the retention time (RT) of the peptide on an LC column; (3) the m/z value of the peptide precursor ion; (4) the declustering potential used to ionize the precursor ion; (5) the m/z value of a fragment ion generated from the peptide precursor ion; and (6) the collision energy (CE) used to fragment the peptide precursor ion that is optimized for the particular peptide. RT includes the elapsed time between injection and elution of an analyte. Declustering potential (DP) includes a voltage potential to dissolvate and dissociate ion clusters. It is also known as "fragmentor voltage" or "ion transfer capillary offset voltage" depending on the manufacturer. Collision energy (CE) includes the amount of energy precursor ions receive as they are accelerated into the collision cell.

To facilitate accurate quantification of the peptides by the methods disclosed herein, a set of isotopically-labeled synthetic versions of the peptides of interest may be added in known amounts to the sample for use as internal standards. Since the isotopically-labeled peptides have physical and chemical properties identical to the corresponding surrogate peptide, they co-elute from the chromatographic column and are easily identifiable on the resultant mass spectrum (Gerber et al. Proc. Natl. Asso. Sci. 2003; 100: 6940-6945; Kirkpatrick et al. Methods 2005; 35: 265-273). The isotopes with which amino acids in a given peptide can be labeled include $^{13}C$, $^{2}H$, $^{15}N$, $^{17}O$, $^{18}O$, and $^{34}S$. In particular embodiments, a peptide is labeled with $^{13}C$ and/or $^{15}N$ heavy isotopes. The addition of the labeled standards may occur before or after proteolytic digestion. In particular embodiments, the labeled internal standard peptides are added after proteolytic digestion. Methods of synthesizing isotopically-labeled peptides will be known to those of skill in the art. Thus, in particular embodiments, the experimental samples contain internal standard peptides. In particular embodiments, internal standard peptides include reference signature peptides. In particular embodiments, a signature peptide concentration can be determined by combining: (i) a ratio calculated from comparing the peak area of the signature peptide to the peak area of its corresponding reference signature peptide obtained from an LC-MRM-MS assay, and (ii) the known concentration of the reference signature peptide. Peptides selected as reference standards and suitable for quantification are sometimes referred to as quantotypic peptides (Q-peptides). Q-peptides include all of the characteristics of proteotypic peptides but also place restrictions on the residues that can constitute the reference peptide to eradicate artefactual modification and/or incomplete cleavage (Holman et al. Bioanalysis 2012; 4(14): 1763-1786).

Absolute quantitative levels of a given protein, or proteins, can be determined by the SRM/MRM methodology whereby the SRM/MRM signature peak area of an individual peptide from a given protein in one biological sample is compared to the SRM/MRM signature peak area of a known amount of a "spiked" internal standard. In particular embodiments, the internal standard is a synthetic version of the same exact peptide that contains one or more amino acid residues labeled with one or more heavy isotopes. Such isotope labeled internal standards are synthesized so that mass spectrometry analysis generates a predictable and consistent SRM/MRM signature peak that is different and distinct from the native peptide signature peak, and which can be used as a comparator peak. Thus, when the internal standard is spiked in known amounts into a protein preparation from a biological sample and analyzed by mass spectrometry, the signature peak area of the native peptide is compared to the signature peak area of the internal standard peptide, and this numerical comparison indicates either the absolute molarity and/or absolute weight of the native peptide present in the original protein preparation from the biological sample. Absolute quantitative data for fragment peptides are displayed according to the amount of protein analyzed per sample. Absolute quantitation can be performed across many peptides, and thus proteins, simultaneously in a single sample and/or across many samples to gain insight into absolute protein amounts in individual biological samples and in entire cohorts of individual samples.

Another strategy for absolute quantitation of peptides is equimolarity through equalizer peptide. This methodology involves chemically synthesizing the isotopically labeled Q-peptides of interest as dipeptides. A common amino acid sequence is positioned N-terminal to the Q-peptide and is referred to as the equalizer peptide. After solubilization and proteolytic digestion, the amount of Q-peptide can be accurately determined through reference to a single light-labeled peptide. Appropriate amounts of each standard peptide can then be added to a sample of interest (either predigested or prior to proteolysis) to facilitate absolute quantification (Holzmann et al. Anal. Chem. 2009; 81: 10254-10261). Absolute quantification can also employ quantification concatemer (QconCAT) proteins (Beynon et al. Nat. Methods 2005; 2: 587-589; Johnson et al. J. Am. Soc. Mass Spectrom. 2009; 20: 2211-2220; Ding et al. J. Proteome Res. 2011; 10: 3652-3659; Carroll et al. Molecular & Cellular Proteomics 2011; Sep. 19: mcp-M111). In this strategy, a recombinant artificial protein that is an affinity tagged, concatenation of standard peptides from several proteins of interest is heterologously produced in Escherichia coli grown in stable iso-topically enriched media. The QconCAT protein is then affinity purified and co-digested with the sample, generating a stoichiometric mixture of all the 'heavy' Q-peptides of which it is composed, and the proteolytic peptides from the native proteins and internal standard are subsequently analyzed. A variant of the QconCAT approach, termed peptide-concatenated standards (PCS), uses flanking regions between the Q-peptides in the artificial protein sequence that mirror their endogenous environment (Kito et al. J. Proteome Res. 2007; 6: 792-800). Other particular embodiments use protein standards for absolute quantification (PSAQ) (Brun et al. Mol. Cell. Proteomics 2007; 6: 2139-2149). PSAQ uses recombinant proteins but rather than being a concatenation of peptides from several proteins, the entire protein to be quantified is expressed in stable isotope-labeled form. One or several PSAQs can then be added to the sample pre-digestion to facilitate quantification.

Particular embodiments use label-free strategies for protein quantification such as intensity based measurements (America and Cordewener, Proteomics 2008; 8: 731-749) or spectral counting (Lundgren et al. Expert Rev. Proteomics 2010; 7: 39-53).

To obtain relative quantitative levels of a given peptide, the mass spectrometry-derived signature peak area (or the peak height if the peaks are sufficiently resolved) of an individual peptide, or multiple peptides, from a given protein, in one biological sample can be compared to the signature peak area determined for the same peptide, or peptides, from the same protein, in one or more additional and different biological samples, using the same SRM/MRM methodology. In this way, the amount of a particular peptide, or peptides, from a given protein, is determined relative to the same peptide, or peptides, from the same protein across two or more biological samples under the same experimental conditions. In addition, relative quantitation can be determined for a given peptide, or peptides, from a single protein within a single sample by comparing the signature peak area for that peptide for that given protein by SRM/MRM methodology to the signature peak area for another different peptide, or peptides, from a different protein within the same protein preparation from the biological sample. In this way, the amount of a particular peptide from a given protein, and therefore the amount of the given protein, is determined relative to another protein within the same sample. These approaches generate quantitation of an individual peptide, or peptides, from a given protein to the amount of another peptide, or peptides, from the same protein or from a different protein between samples and within samples wherein the amounts as determined by signature peak area are relative one to another, regardless of the absolute weight to volume or weight to weight amounts of peptides in the protein preparation from the biological sample. Relative quantitative data about individual signature peak areas between different samples can be normalized to the amount of protein analyzed per sample. Relative quantitation can be performed across many peptides simultaneously in a single sample and/or across many samples to gain insight into relative protein amounts.

Signature peptide levels can be expressed in concentration units (e.g., pmol/L). In particular embodiments, the mean concentration of a signature peptide in a test sample derived from a subject being screened for WAS and/or XLA can be compared to the mean concentration of the corresponding peptide in a normal control sample. In particular embodiments, a normal control sample can be derived from one or more normal control subjects or from a population of normal control subjects. In particular embodiments, a normal control subject includes a subject who does not have or is not known to have WAS and/or XLA. In particular embodiments, a normal control subject includes a subject who does not have genetic mutations associated with WAS and/or XLA.

In particular embodiments, the mean concentration of a WASp 289 signature peptide in DBS from a population of normal control subjects includes a concentration in a range of 7000 pmol/L to 30000 pmol/L, in a range of 7500 pmol/L to 28000 pmol/L, and in a range of 8000 pmol/L to 26000 pmol/L. In particular embodiments, the mean concentration of a WASp 289 signature peptide in DBS from a population of normal control subjects includes a concentration of 7000 pmol/L, 7100 pmol/L, 7200 pmol/L, 7300 pmol/L, 7400 pmol/L, 7500 pmol/L, 7600 pmol/L, 7700 pmol/L, 7800 pmol/L, 7900 pmol/L, 8000 pmol/L, 8100 pmol/L, 8200 pmol/L, 8300 pmol/L, 8400 pmol/L, 8500 pmol/L, 8600 pmol/L, 8700 pmol/L, 8800 pmol/L, 8900 pmol/L, 9000 pmol/L, 9100 pmol/L, 9200 pmol/L, 9300 pmol/L, 9400 pmol/L, 9500 pmol/L, 9600 pmol/L, 9700 pmol/L, 9800 pmol/L, 9900 pmol/L, 10000 pmol/L, 11000 pmol/L, 12000 pmol/L, 13000 pmol/L, 14000 pmol/L, 15000 pmol/L, 16000 pmol/L, 17000 pmol/L, 18000 pmol/L, 19000 pmol/L, 20000 pmol/L, 21000 pmol/L, 22000 pmol/L, 23000 pmol/L, 24000 pmol/L, 25000 pmol/L, 26000 pmol/L, 27000 pmol/L, 28000 pmol/L, 29000 pmol/L, 30000 pmol/L, or more.

In particular embodiments, the mean concentration of a BTK 545 signature peptide in DBS from a population of normal control subjects includes a concentration in a range of 400 pmol/L to 2000 pmol/L, in a range of 500 pmol/L to 1800 pmol/L, and in a range of 600 pmol/L to 1500 pmol/L. In particular embodiments, the mean concentration of a BTK 545 signature peptide in DBS from a population of normal control subjects includes a concentration of 400 pmol/L, 450 pmol/L, 500 pmol/L, 550 pmol/L, 600 pmol/L, 650 pmol/L, 700 pmol/L, 750 pmol/L, 800 pmol/L, 850 pmol/L, 900 pmol/L, 950 pmol/L, 1000 pmol/L, 1050 pmol/L, 1100 pmol/L, 1150 pmol/L, 1200 pmol/L, 1250 pmol/L, 1300 pmol/L, 1350 pmol/L, 1400 pmol/L, 1450 pmol/L, 1500 pmol/L, 1550 pmol/L, 1600 pmol/L, 1650 pmol/L, 1700 pmol/L, 1750 pmol/L, 1800 pmol/L, 1850 pmol/L, 1900 pmol/L, 1950 pmol/L, 2000 pmol/L, or more.

In particular embodiments, a predetermined cut-off value is used as a threshold for a given signature peptide. A concentration of a given signature peptide above the threshold indicates that the assayed DBS is from an individual not afflicted by WAS and/or XLA. A concentration of a given signature peptide below the threshold or absent indicates that the assayed DBS is from an individual afflicted by WAS and/or XLA. In particular embodiments, the threshold can be determined by analysis of a population of normal controls and calculation of standard deviation (SD) of a concentration of a given signature peptide in this population. The threshold can be set at a certain SD from the mean concentration of the given signature peptide. In particular embodiments, the threshold is −1 SD, −1.1 SD, −1.2 SD, −1.3 SD, −1.4 SD, −1.5 SD, −1.6 SD, −1.7 SD, −1.8 SD, −1.9 SD, −2.0 SD, −2.1 SD, −2.2 SD, −2.3 SD, −2.4 SD, −2.5 SD, −2.6 SD, −2.7 SD, −2.8 SD, −2.9 SD, −3.0 SD, or more SD from the mean concentration of the given signature peptide.

In particular embodiments, for diagnosis or screening of WAS and/or XLA, the threshold can be determined by analysis of a population of normal controls and calculation of standard deviation (SD) of a ratio of a concentration of a given signature peptide to an endogenous concentration of ATP7B (Jung et al., J. Proteome Res. 2017; 16: 862-871) in this population. Peptide concentration cutoffs for each PIDD can be set at a certain SD derived from mean concentration of each signature peptide or ratio of a concentration of a given signature peptide to an endogenous concentration of ATP7B.

In particular embodiments, the threshold concentration for a signature peptide of the disclosure includes −1.0 SD, −1.25 SD, −1.3 SD, −1.35 SD, −1.4 SD, −1.45 SD, −1.5 SD, −1.55 SD, −1.6 SD, −1.65 SD, −1.7 SD, −1.75 SD, −1.8 SD, −1.85 SD, −1.9 SD, −1.95 SD, −2.0 SD, −2.25 SD, −2.3 SD, −2.35 SD, −2.4 SD, −2.45 SD, −2.5 SD, −2.55 SD, −2.6 SD, −2.65 SD, −2.7 SD, −2.75 SD, −2.8 SD, −2.85 SD, −2.9 SD, −2.95 SD, −3.0 SD, or more from the mean concentration of the corresponding signature peptide in a population of normal controls.

In particular embodiments, the threshold concentration for the WASp 289 peptide includes 3600 pmol/L or less, 3550 pmol/L or less, 3500 pmol/L or less, 3490 pmol/L or less, 3480 pmol/L or less, 3470 pmol/L or less, 3460 pmol/L or less, 3450 pmol/L or less, 3440 pmol/L or less, 3430 pmol/L or less, 3420 pmol/L or less, 3410 pmol/L or less, 3400 pmol/L or less, 3300 pmol/L or less, 3200 pmol/L or less, 3100 pmol/L or less, 3000 pmol/L or less, 2900 pmol/L or less, 2800 pmol/L or less, 2700 pmol/L or less, 2600 pmol/L or less, 2500 pmol/L or less, 2300 pmol/L or less, 2200 pmol/L or less, 2100 pmol/L or less, 2000 pmol/L or less. In particular embodiments, the threshold concentration for the WASp 289 peptide includes 3384.4 pmol/L.

In particular embodiments, the threshold concentration for the BTK 545 peptide includes 350 pmol/L or less, 345 pmol/L or less, 340 pmol/L or less, 335 pmol/L or less, 330 pmol/L or less, 325 pmol/L or less, 320 pmol/L or less, 315 pmol/L or less, 310 pmol/L or less, 300 pmol/L or less, 290 pmol/L or less, 280 pmol/L or less, 270 pmol/L or less, 260 pmol/L or less, 250 pmol/L or less, 240 pmol/L or less, 230 pmol/L or less, 220 pmol/L or less, 210 pmol/L or less, 200 pmol/L or less, 190 pmol/L or less, 180 pmol/L or less, 170 pmol/L or less, 160 pmol/L or less, 150 pmol/L or less, 140 pmol/L or less, 130 pmol/L or less, 120 pmol/L or less, 110 pmol/L or less, 100 pmol/L or less. In particular embodiments, the threshold concentration for the BTK 545 peptide includes 311.4 pmol/L or less.

One or more standard peptides may be synthesized with any method known in the pertinent art. Such synthetic peptides may further include amino acids with one or more natural modifications. Such natural modifications may include deamination of glutamine and asparagine, amination, oxidation, and hydroxylation.

Methods disclosed herein include treating subjects (e.g., humans) based upon the outcome of screening for WAS and/or XLA with compositions and methods disclosed herein. Treating subjects includes delivering therapeutically effective amounts. Therapeutically effective amounts include those that provide effective amounts, prophylactic treatments and/or therapeutic treatments.

An "effective amount" is the amount of a composition necessary to result in a desired physiological change in the subject. For example, an effective amount can provide an alleviation of symptoms, an elimination of symptoms, or a cure for WAS and/or XLA. Effective amounts are often administered for research purposes. Effective amounts disclosed herein can cause a statistically-significant effect in an animal model or in vitro assay relevant to the assessment of a disease's development, progression, and/or resolution.

Particular embodiments may include administering compositions as a "prophylactic treatment." Prophylactic treatments include those administered to a subject who does not display signs or symptoms of WAS and/or XLA or displays only early signs or symptoms of WAS and/or XLA, such that treatment is administered for the purpose of diminishing or decreasing the risk of developing symptoms or negative effects of the disorder. Thus, a prophylactic treatment functions as a preventative treatment against the symptoms or negative effects of WAS and/or XLA.

In particular embodiments, a prophylactic treatment can prevent, delay, or reduce the onset of WAS and/or XLA. In particular embodiments, a prophylactic treatment can be given prior, concurrently, or after other preventative measures, such as the use of antibiotics. In particular embodiments, a prophylactic treatment can prevent or reduce the severity of symptoms or complications associated with WAS and/or XLA.

Symptoms and complications for WAS can include: bleeding; eczema; bloody diarrhea; and recurrent infections. Symptoms and complications for XLA can include: infections; diarrhea; failure to grow; joint disease; kidney inflammation; red blood cell breakdown; and skin and muscle inflammation.

A "therapeutic treatment" includes a treatment administered to a subject who displays symptoms or signs of WAS and/or XLA and is administered to the subject for the purpose of diminishing or eliminating those signs or symptoms of WAS and/or XLA. In particular embodiments, the therapeutic treatment can provide immune function for subjects diagnosed with WAS and/or XLA. In particular embodiments, the therapeutic treatment can reduce, control, or eliminate symptoms and complications of WAS and/or XLA such as those described herein.

Effective amounts, prophylactic treatments and therapeutic treatments need not be mutually exclusive, and in particular embodiments, administered dosages may accomplish more than one treatment type.

In particular embodiments, therapeutically effective amounts provide immune system function for subjects diagnosed with WAS and/or XLA. Thus, in particular embodiments, methods of treatment disclosed herein include stem cell transplants, immunoglobulin infusions, antibiotic infusions, and/or gene therapy, for disorders such as WAS and/or XLA.

The actual dose amount and administration schedule for a particular subject can be determined by a physician, veterinarian or researcher taking into account parameters such as physical and physiological factors including target, body weight, severity of condition, previous or concurrent therapeutic interventions, idiopathy of the subject and route of administration.

(viii) Kits. Kits including antibodies and antigen binding fragments thereof of the present disclosure are also provided. Kits can include lancets to prick for blood, filter cards to collect blood drops, buccal swabs, blood collection tubes, solutions to solubilize DBS, and appropriate buffers and enzymes to digest marker proteins in the DBS. Kits can further include one or more containers including anti-peptide antibodies and antigen binding fragments thereof and/or reagents or supplies to assess absence or reduction in WASp 289 and/or BTK 545 peptides or their corresponding proteins. In particular embodiments, the kits include one or more containers including anti-WASp 289 and/or anti-BTK 545 antibodies. The antibodies may be immobilized on a solid support, such as a column or beads. Kits can further include elution buffers to release peptides from antibodies. In particular embodiments, kits can include one or more labeled reference peptides to perform absolute quantification of the signature peptides. In particular embodiments, kits can also include some or all of the necessary laboratory and/or medical supplies needed to use the kit effectively, such as gauze, sterile adhesive strips, gloves, tubes, and the like. Variations in contents of any of the kits described herein can be made.

Components of the kit can be prepared for storage and later use. Associated with such container(s) can be a notice in the form prescribed by a governmental agency regulating the manufacture, use, or sale of the kit, which notice reflects approval by the agency of manufacture, use, or sale, when required.

Optionally, the kits further include instructions for using the kit in the methods. In various embodiments, the instructions can include appropriate instructions to interpret results associated with using the kit; proper disposal of the related waste; and the like. The instructions can be in the form of printed instructions provided within the kit or the instructions can be printed on a portion of the kit itself. Instructions may be in the form of a sheet, pamphlet, brochure, CD-ROM, or computer-readable device, or can provide directions to instructions at a remote location, such as a website.

The Exemplary Embodiments and Examples below are included to demonstrate particular embodiments of the disclosure. Those of ordinary skill in the art should recognize in light of the present disclosure that many changes can be made to the specific embodiments disclosed herein and still obtain a like or similar result without departing from the spirit and scope of the disclosure.

(ix) Exemplary Embodiments.

1. An antibody or antigen binding fragment thereof including:
    (A) a heavy chain variable (VH) domain including a CDRH1 having the sequence set forth in SEQ ID NO: 3, a CDRH2 having the sequence set forth in SEQ ID NO: 4, and a CDRH3 having the sequence set forth in SEQ ID NO: 5, and a light chain variable (VL) domain including: a CDRL1 having the sequence set forth in SEQ ID NO: 6, a CDRL2 having the sequence set forth in SEQ ID NO: 7, and a CDRL3 having the sequence set forth in SEQ ID NO: 8 or
    (B) a VH domain including a CDRH1 having the sequence set forth in SEQ ID NO: 9, a CDRH2 having the sequence set forth in SEQ ID NO: 10, and a CDRH3 having the sequence set forth in SEQ ID NO: 11, and a VL domain including: a CDRL1 having the sequence set forth in SEQ ID NO: 12, a CDRL2 having the sequence set forth in SEQ ID NO: 13, and a CDRL3 having the sequence set forth in SEQ ID NO: 14.

2. The antibody or antigen binding fragment thereof of embodiment 1(A), including one or more of: a VH domain having the sequence set forth in SEQ ID NO: 15; a heavy chain having the sequence set forth in SEQ ID NO: 17; a VL domain having the sequence set forth in SEQ ID NO: 16; or a light chain having the sequence set forth in SEQ ID NO: 18.

3. The antibody or antigen binding fragment thereof of embodiment 1 or 2, wherein the VH domain has the sequence set forth in SEQ ID NO: 15 and the VL domain has the sequence set forth in SEQ ID NO: 16.

4. The antibody or antigen binding fragment thereof of any one of embodiments 1-3, wherein the heavy chain has the sequence set forth in SEQ ID NO: 17 and the light chain has the sequence set forth in SEQ ID NO: 18.

5. The antibody or antigen binding fragment thereof of embodiment 1(B), including one or more of: a VH domain having the sequence set forth in SEQ ID NO: 23; a heavy chain having the sequence set forth in SEQ ID NO: 25; a VL domain having the sequence set forth in SEQ ID NO: 24; or a light chain having the sequence set forth in SEQ ID NO: 26.

6. The antibody or antigen binding fragment thereof of embodiment 1 or 5, wherein the VH domain has the sequence set forth in SEQ ID NO: 23 and the VL domain has the sequence set forth in SEQ ID NO: 24.

7. The antibody or antigen binding fragment thereof of any one of embodiments 1, 5 and 6, wherein the heavy chain has the sequence set forth in SEQ ID NO: 25 and the light chain has the sequence set forth in SEQ ID NO: 26.

8. Use of an antibody of embodiment 1 in a method including
obtaining a biological sample derived from a subject;
digesting proteins from the biological sample with an enzyme to yield one or more peptides; enriching for:
a WASp signature peptide with an antibody or antigen-binding fragment thereof of embodiment 1(A); and/or
a BTK signature peptide with an antibody or antigen-binding fragment thereof of embodiment 1(B); and
performing liquid chromatography-multiple reaction monitoring mass spectrometry (LC-MRM-MS) on the enriched peptides to determine a concentration of each signature peptide.

9. The use of embodiment 8, wherein the biological sample is dried blood spot (DBS), a buccal swab, peripheral blood mononuclear cells (PBMCs), or white blood cells (WBCs).

10. The use of embodiment 8 or 9, wherein the enzyme is trypsin.

11. The use of any one of embodiments 8-10, further including
comparing the concentration of each signature peptide to that of a corresponding predetermined threshold concentration; and
diagnosing the subject with:
WAS when the concentration of the WASp signature peptide is lower than the corresponding predetermined threshold concentration or when the WASp signature peptide is absent; and
XLA when the concentration of the BTK signature peptide is lower than the corresponding predetermined threshold concentration or when the BTK signature peptide is absent.

12. The use of any one of embodiments 8-11, wherein the use is performed as part of a newborn screening (NBS) that additionally screens the subject for one or more of phenylketonuria, primary congenital hypothyroidism, cystic fibrosis, and sickle cell disease.

13. The use of any one of embodiments 8-12, wherein the use is performed in the absence of clinical symptoms of WAS and/or XLA in the subject.

14. The use of embodiment 11, wherein the corresponding predetermined threshold concentration for each signature peptide is calculated from a standard deviation of the mean concentration of each signature peptide in corresponding biological samples from a population of normal control subjects.

15. The use of embodiment 14, wherein the biological sample is DBS and the mean concentration of the WASp signature peptide in DBS from a population of normal control subjects includes a concentration in a range of 7000 pmol/L to 30000 pmol/L.

16. The use of embodiment 14 or 15, wherein the corresponding predetermined threshold concentration includes −1.75 standard deviation (SD) to −2.75 SD of the mean concentration of the WASp signature peptide in DBS from a population of normal control subjects.

17. The use of embodiment 14, wherein the biological sample is DBS and the mean concentration of the BTK signature in DBS from a population of normal control subjects includes a concentration in a range of 400 pmol/L to 2000 pmol/L.

18. The use of embodiment 14 or 17, wherein the corresponding predetermined threshold concentration includes −1.5 SD to −2.5 SD of the mean concentration of the BTK signature in DBS from a population of normal control subjects.

19. An assay for the screening of Wiskott-Aldrich Syndrome (WAS) and/or X-linked agammaglobulinemia (XLA) in a subject, the assay including:
(i) an antibody or antigen binding fragment thereof of embodiment 1 and
(ii) reference signature peptides including:
a WASp signature peptide of WAS of SEQ ID NO: 1; and/or
a BTK signature peptide of XLA of SEQ ID NO: 2.

20. The assay of embodiment 19, wherein the reference signature peptides are isotopically labeled.

21. The assay of embodiment 19 or 20, wherein the antibodies or antigen binding fragments thereof are attached to magnetic beads.

22. A kit including an assay of any one of embodiments 19-21 and one or more additional components selected from filter paper cards, buccal swabs, blood collection tubes, a punch tool, digestion enzymes, digestion buffers, solid supports for the antibodies or antigen-binding fragments thereof, and elution buffers.

(x) Experimental Examples. Example 1. Summary. A study was undertaken to evaluate whether a multiplex assay based on peptide immunoaffinity enrichment coupled with selected reaction monitoring mass spectrometry (immuno-SRM) could reliably and precisely distinguish affected patients with Wiskott-Aldrich Syndrome (WAS) and X-linked agammaglobulinemia (XLA) from one another and from unaffected normal control dried blood spot (DBS) samples. A blinded, multiplexed analysis of proteolytically-generated peptides from WASp and BTK (for WAS and XLA, respectively) in DBS samples from 42 primary immunodeficiency disorders (PIDD) patients, 40 normal adult controls, and 62 normal newborns was performed. The immuno-SRM assays reliably quantified the target peptides in DBS, including intra- and inter-assay precision (13 and 22%; 17 and 43%), linearity (1.39-2000 fmol peptide), and stability (50.06% difference in 72 h). Analysis of signature peptides found a statistically significant reduction (or absence) of peptide levels in affected patients compared to control groups (WASp and BTK: p=0.0001). Immuno-SRM-based quantification of proteotypic peptides from WASp and BTK in DBS distinguishes relevant PIDD cases from controls. The approach can be employed to conduct large-scale multiplexed newborn screening of selective PIDD. The data in FIGS. 2A-11B and Tables 5-7 were generated with polyclonal antibodies to WASp 289 and BTK 545.

Materials and Methods. Patient Samples. PIDD and normal control blood samples were obtained from Seattle Children's Immunology Diagnostic Laboratory. Newborn DBS were retrieved from the Washington State Newborn Screening Laboratory (Shoreline, WA) after Institutional Review Board approval. XLA DBS were collected from 20 suspected Vietnamese patients and shipped per regular mail to Seattle Children's Hospital. Genotypes of these patients by Sanger sequencing was previously reported (Segundo et al. Front Immunol. Frontiers; 2018; 9: 289). In total, DBS samples from 42 PIDD patients and 40 normal controls were obtained. Normal control and PIDD patient DBS were prepared by pipetting 70 μL of blood/12 mm spot onto filter paper cards (Protein Saver 903 Card, Whatman, Piscataway, NJ), allowed to dry at room temperature overnight, and stored in sealed plastic bags at −80° C. until use. Affected patient samples were shipped from collection locations and stored at −80° C. until use.

Selection of Surrogate Peptides and Antibody Production. Surrogate peptides for WASp and BTK were selected by in silico trypsin digestion and NCBI BLAST tools. Final peptide selections were made according to accepted major criteria for immuno-SRM development including peptide length, lack of post-transcriptional modifications, and uniqueness in the human genome by BLAST searching as previously described (Kerfoot et al. Proteomics Clin Appl. 2012; 6: 394-402; Abbatiello et al. Mol. Cell Proteomics. American Society for Biochemistry and Molecular Biology; 2015; 14: 2357-2374; Hoofnagle et al. Clin. Chem. 2016; 62: 48-69). Peptide selection and monoclonal antibody production for ATP7B signature peptides have been previously reported. Jung et al. 2017, supra. Crude peptides were then screened empirically to determine suitability for detection and quantification by liquid chromatography-tandem mass spectrometry (LC-MS/MS).

Monoclonal antibodies (mAb) were successfully generated against two peptides. Briefly, signature peptides were synthesized with an N-terminal cysteine extension and conjugated to keyhole limpet hemocyanin (KHL) for immunization. Two New Zealand white rabbits were injected per peptide. mAbs for the peptides successfully underwent affinity-purification from 25 mL of antiserum.

Immuno-SRM Assay Reagents. ProteaseMAX™ Surfactant (no. V2072) and proteomics grade trypsin (no. V5113) were purchased from Promega (Madison, WI). Bovine serum albumin standard (200 mg/mL), and (3-[3-cholamidopropyl)=dimethylammonio]-1-propanesulfonate) (Pierce™ CHAPS, no. P128300) detergent were obtained from Thermo Fisher Scientific (Waltham, MA). Ammonium bicarbonate (40867-50G-F) was purchased from Fluka Analytical (Munich, Germany). Acetonitrile (no. A955), water (no. W6, LCMS optima grade), formic acid (no. P128905), and phosphate-buffered saline (PBS, no. 10010-023) were obtained from Thermo Fisher Scientific (Waltham, MA).

Heavy stable isotope-labeled peptides were obtained from Anaspec (Fremont, CA). The stable isotope-labeled peptides were purified >95% by HPLC and the C-terminal arginine or lysine was labeled with $^{13}C$ and $^{15}N$ atoms, resulting in a mass shift of +8 or +10 Da, respectively. Aliquots were stored in 5% acetonitrile/0.1% formic acid at −20° C. until use.

Antibodies were immobilized on 2.8 µm Dynabeads Protein G magnetic beads (no.

10004D, Invitrogen, Carlsbad, CA) in a 1 µg antibody-to-2.5 µL of beads ratio. In brief, 250 µL of the beads were added to 1.5 mL Eppendorf tubes (022363204 Eppendorf) and washed twice with 250 µL of 1×PBS, followed by the addition of 100 µg of antibody and 1×PBS+0.03% CHAPS (no. 28300, Thermo Scientific, Waltham, MA) to yield a total 250 µL of volume. The antibodies were allowed to couple to the beads overnight with tumbling at 4° C. The next day, the antibodies were immobilized onto the beads with chemical cross-linking. Briefly, antibody beads were collected using magnetic pulldown, excess PBS was discarded, and 300 µL of freshly prepared 20 mM DMP (dimethyl pimelimidate dihydrochloride, no. D8388, Sigma Aldrich, St. Louis, MO) in 200 mM triethanolamine, pH 8.5 (no. T58300, Sigma Aldrich, St. Louis, MO) was added. The samples were tumbled for 30 min at room temperature, and the DMP in triethanolamine was discarded. 250 µL of 150 mM monoethanolamine (no. 411000, Sigma Aldrich, St. Louis, MO) was added and the beads were tumbled at room temperature for 30 min. The antibody beads were washed twice using 250 µL of 5% acetic acid+0.03% CHAPS (5 min of tumbling at room temperate each time), and washed once more using 250 µL of 1×PBS+0.03% CHAPS. The CD3ε, WASp, and BTK antibody-linked beads were then washed and incubated in 5% acetic acid +3% acetonitrile (ACN), washed with 250 µL of 1×PBS+0.03% CHAPS, and the latter two steps were repeated once. All antibody-linked beads were washed with 250 µL of 1×PBS+0.03% CHAPS until neutral pH (7.0) was achieved. The washed antibody-linked beads were then resuspended in 250 µL of 1×PBS+0.03% CHAPS and 2.5 µL of $NaN_3$ (52002-5G Sigma Aldrich) for anti-fungal properties and stored at 4° C. until use.

DBS Protein Extraction and Trypsin Digestion. For each sample (blinded normal controls or patients), one entire DBS spot (13 mm) containing 70 µL blood was perforated into 17 punches at 3-mm diameter with a standard leather punch tool. Final sample representation was WAS: n=11, XLA: n=26, and normal controls (n=40). The punches were placed in a 1.5 mL eppendorf tube, and 490 µL of 0.1% ProteaseMax™ in 50 mM ammonium biocarbonate (pH 8) was added into each tube. The tubes were vortexed for 1 h on the Eppendorf MixMate (Eppendorf, Hamburg, Germany), after which 10 µL of each sample were aliquoted and diluted 200-fold for Bradford assay to determine protein concentration. Disulfide bond reduction was performed with 2 M DTT at 5 mM, and an additional 490 µL of 0.1% ProteaseMax™ in 50 mM ammonium biocarbonate (pH 8) was added into each tube before incubation in 37° C. water bath for 30 minutes. Trypsin was then added at a 1:50 enzyme to protein ratio (w/w), and acetonitrile was added to a final concentration of 15%. The mixture was incubated in a 37° C. water bath overnight for digestion before centrifugation for 10 minutes at 13,000 RPM before each supernatant was transferred to a new tube and dried in the Savant™ SpeedVac™ High Capacity Concentrator (Thermo Fisher Scientific, Waltham, MA). All trypsinized DBS digests were stored at −80° C. until use.

For samples analyzed from the Washington State NBS laboratory, 5 or 6 3-mm punches were used for protein extraction and digestion (n=62). Procedures were identical to those for previous samples except that volumes were reduced as follows: 150 µL of 0.1% ProteaseMax™ and 0.78 µL DTT for each addition.

Peptide Immunoaffinity Enrichment. DBS digests were resuspended in 1×PBS+0.03% CHAPS to yield a 1 µg/µL nominal protein digest concentration. Cross-linked, antibody-coated beads were added to a total mass of 2 µg antibody for each target. Then 20 µL of 1M Tris pH 8.0 (15568-025 UltraPure, Invitrogen, Carlsbad, CA) was added. Isotope-labeled peptides were added as internal standards (IS). This suspension was incubated overnight with tumbling at 4° C. to achieve peptide capture. The next day, the antibody bead:peptide complexes were washed twice with 100 µL PBS+0.01% CHAPS and once in 100 µL 0.01% PBS+0.01% CHAPS. Finally, the peptides were eluted by incubation in 30 µL of 5% acetic acid/3% ACN. Released peptides were stored at −80° C. until analysis. For samples analyzed from the WA State NBS laboratory, procedures were identical to those for previous samples except that volumes were reduced as follows: 58.1 µL of 1×PBS+0.03% CHAPS, 0.59 µg pAb for each peptide, 3.13 µL internal standard (IS), and 12.5 µL TRIS.

Liquid Chromatography—Tandem Mass Spectrometry. Enriched samples were analyzed at two laboratory sites to examine the inter-laboratory variability in data acquisition, utilizing two separate LC-MS/MS systems and instrument configurations (described below). Measured peptide concentrations were then compared for method validation. Peptide parent and daughter ion spectra have been previously reported (Kerfoot et al. Proteomics Clin Appl. 2012; 6: 394-402).

Instruments included a Waters Xevo TQ-XS MS with ionkey source technology connected to Waters M-Class Gradient and Loading pumps (Waters, Milford, MA). Chromatographic solvents were A: $H_2O+0.1\%$ Formic Acid (FA) and B: ACN+0.1% FA. Initially, peptide mixtures were loaded onto a M-Class Trap Symmetry 300 µm×50 mm C18 column (100 Å, 5 µm) utilizing a constant flow of 98:2 A:B at 20 µL/min for 3 minutes. Subsequently, the flow was reversed and peptides were separated using gradient flow across a 150 µm×100 mm BEH C18 ikey (130 Å, 1.7 µm). Gradient method programming is shown in Table 4. The peptides monitored in this location included WASp 289.

TABLE 4

LC method setup for signature peptide.
A = $H_2O$ + 0.1% Formic Acid,
B = ACN + 0.1% Formic Acid
Lab site 1

| Time | % B |
| --- | --- |
| 0 | 5 |
| 1 | 5 |
| 11 | 45 |
| 13 | 85 |
| 15 | 85 |
| 17 | 5 |
| 20 | 5 |

Parameters for transitions and collision energy (CE) were taken from a linear regression of previously optimized values in Skyline and those generated using Waters intellistart technology to identify the most intense fragments upon ionization. SRM transitions were acquired at unit/unit resolution in both the Q1 and Q3 quadrupoles with 5 ms dwell time and 3 ms pause between mass ranges, resulting in a cycle time of 1.5 s. All samples were run in a blinded fashion.

Method Performance Assessment. A response curve was performed to determine assay linearity and sensitivity in a background matrix of DBS. Punches from normal control DBS (4 punches per sample) were extracted using extraction buffer (ProteaseMax™, ammonium bicarbonate) in triplicate. Trypsin digestion was performed on the extracted protein, and the digests were pooled to create a common background matrix. Heavy stable isotope standards were spiked into the digest and serially diluted to create samples with varying peptide amounts (2000, 200, 12.5, 4.17, 1.39, 0.69 fmol). Two micrograms of each antibody, covalently coupled to magnetic Protein G beads, were added to the background matrix and incubated overnight. The antibody beads were washed with PBS, and the eluate was analyzed by SRM.

Intra- and inter-assay variation were characterized by performing measurement of endogenous (light) peptide signal over 5 separate days to evaluate the precision and accuracy of the assay, respectively. Each sample was analyzed in 5 complete process replicates (including punches, extraction, digestion, enrichment, and mass spectrometry) per day.

Finally, stability was assessed by comparing the endogenous (light) peptide detected in DBS stored at room temperature for 1 day and 3 days to peptide detected in DBS at −80° C. in a sealed container. Each sample was processed as described above in process triplicate. Percent difference was calculated at each timepoint.

Data Analysis. All SRM data were analyzed and plotted using Skyline (MacCoss Lab Software, open source, Seattle, WA); MacLean et al. Bioinformatics. 2010; 26: 966-968) Endogenous target peptide concentrations were quantified by comparing the ratio of the peak area of the signature peptide to its IS added at a known concentration (100 fmol). Statistics were generated using Graphpad Prism (San Diego, CA). Receiver operating characteristic (ROC) curves were constructed using Graphpad Prism and a 95% confidence interval.

Results. Peptide Selection and Antibody Development. Selected peptide sequences, molecular weights, parent, and daughter ions are listed in FIG. 1. Fragmentation patterns for the peptides of interest have been previously reported. (Kerfoot et al. Proteomics Clin Appl. 2012; 6: 394-402). Antibodies (Pacific Immunology, Ramona, CA) were generated against the peptides and pursued for use in human samples because of their ability to successfully capture their target sequences and the absence of background signals brought on by copurified peptide contaminants.

Figure 2B:
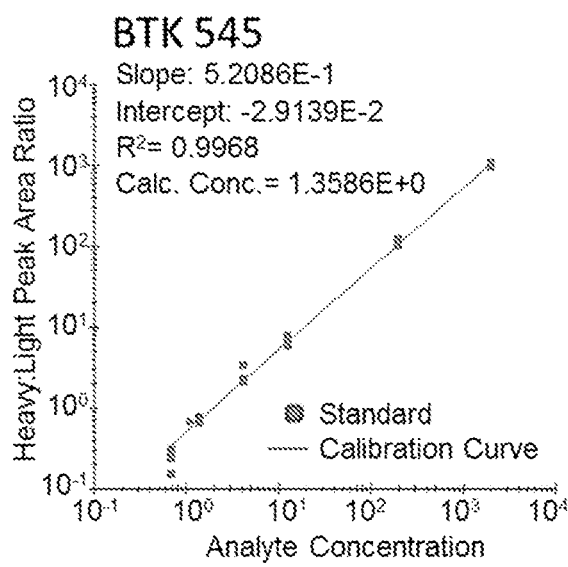

Method Performance Assessment. Analytical figures of merit are reported in Table 5. Overall, the linear response spanned a range from 1.39 to 2000 fmol of peptide (FIGS. 2A, 2B). The median coefficient of variation (CV) for all points on the response curve was 11%. Lower limits of quantification (LLOQ) were defined by the lowest point to yield CVs of 13 and 22%. LLOQs were 0.69 and 1.39 fmol. For the two peptides, the mean intra-assay (i.e. within-day) variability was 13 and 22% while the inter-assay (i.e. between-day) variability was 17 and 43%.

TABLE 5

Analytical performance of signature peptides

| Protein | Peptide | LLOD | ULOD | LLOQ | Median CV | Intra-assay CV | Inter-assay CV | Relative Difference | |
| --- | --- | --- | --- | --- | --- | --- | --- | --- | --- |
| | | (fmol) | | | % | | | 24 h | 72 h |
| BTK | BTK 545-558 | 0.69 | 2000 | 1.39 | 12 | 22 | 43 | 0.61 | 0.06 |
| WASp | WASp 289-304 | 1.39 | 2000 | 4.17 | 7 | 13 | 17 | −0.19 | 0.03 |

Figure 3A:
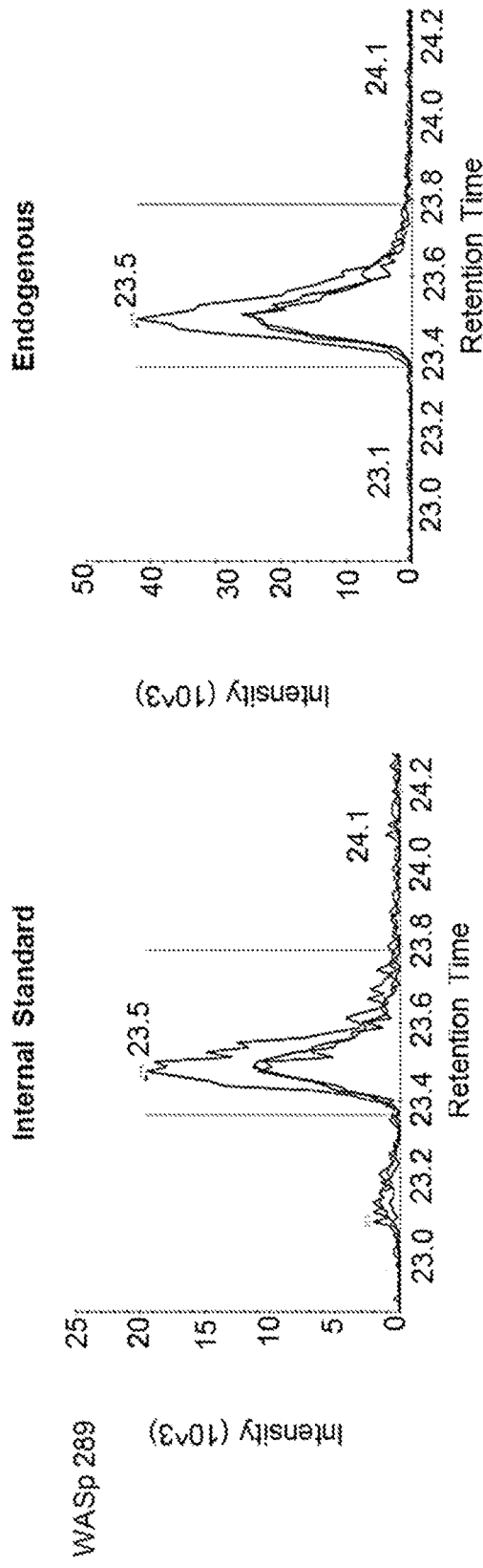
FIGS. 3A, 3B. MRM traces for internal standard (left panels) and endogenous (right panels) signature peptides.
Figure 3B:
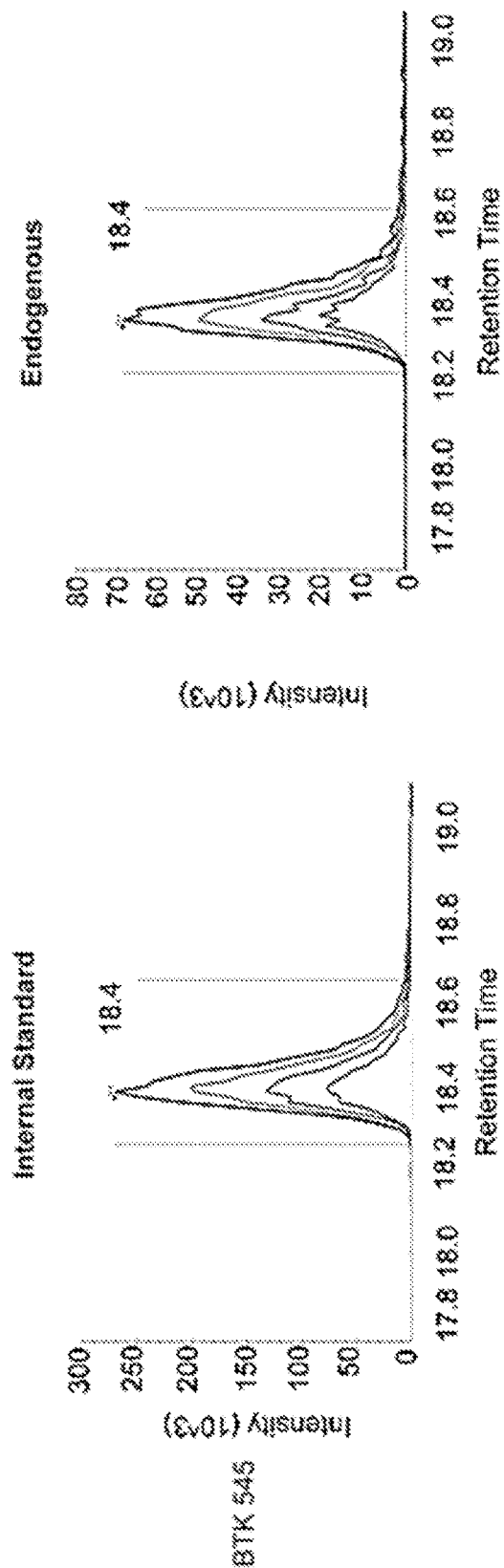

Finally, stability was assessed by comparing the endogenous (light) peptide detected in DBS stored at room temperature for 1 day and 3 days to peptide detected in DBS preserved at −80° C. in a sealed container. Results are reported in Table 5. The peptides had endogenous signal above the LLOQ and little variability overtime. Representative multiple reaction monitoring (MRM) chromatograms for each peptide are shown in FIGS. 3A, 3B.

Figure 4A:
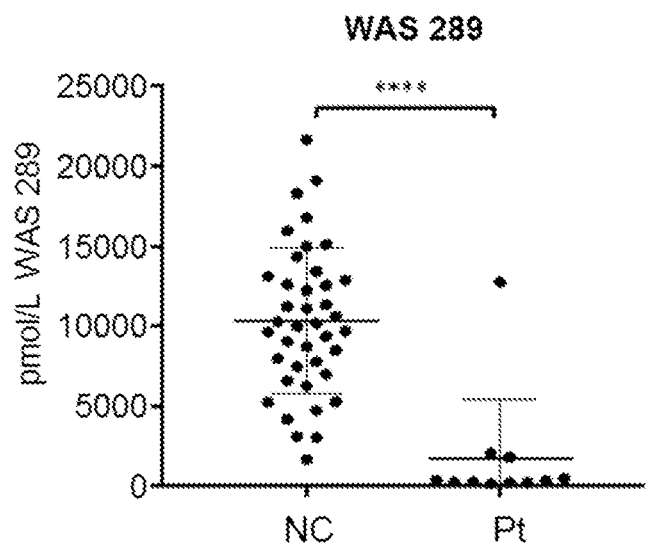
FIGS. 4A, 4B. Signature peptide concentrations in normal controls (n=40) and patients (Pt).
Figure 4B:
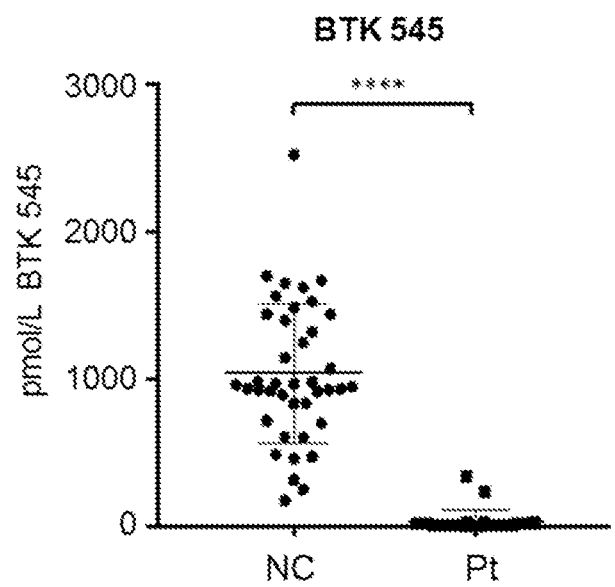

Peptide Concentrations. After analysis, normal controls were unblinded to define normal ranges for affected patient comparison. The average peptide concentrations from normal controls were as follows (average±SD): WASp 289=10326.98±4513.13 pmol/L and BTK 545=1038.44±465.77 pmol/L. Analysis of signature peptides found statistically significant (p<0.05-0.0001) reductions in patient peptide levels relative to control groups in each case (FIGS. 4A, 4B). Peptide levels in the majority of affected patients were significantly diminished or absent. For each patient, the concentration of ATP7B 1056 was also determined using previously developed immuno-SRM methodology (Jung et al. 2017, JProteome Res 16:862-871). These protein concentrations serve as quality control (QC) measurements and their consistency across samples is used to assess digestion and process reproducibility (FIG. 5).

Peptide concentration cutoffs for each PIDD diagnosis were set at −1.75 SD (WASp 289) and −2 SD (BTK 545). Use of these ranges resulted in 1 false positive indication in the normal controls. NC4 was indicated to be by WASP 289. NC signature peptide values are shown in FIG. 6. Cutoffs for positive identification of PIDD are shown in Table 6.

TABLE 6

Cutoffs for signature peptides by concentration using polyclonal antibodies that bind to BTK 545 and WASp 289.

|         | BTK 545 (pmol/L) | WASp 289 (pmol/L) |
|---------|------------------|-------------------|
| Average | 1038.44          | 10326.98          |
| SD      | 465.77           | 4513.13           |
| Cutoff  | 106.90           | 2428.99           |

Figures 8A, 8B:
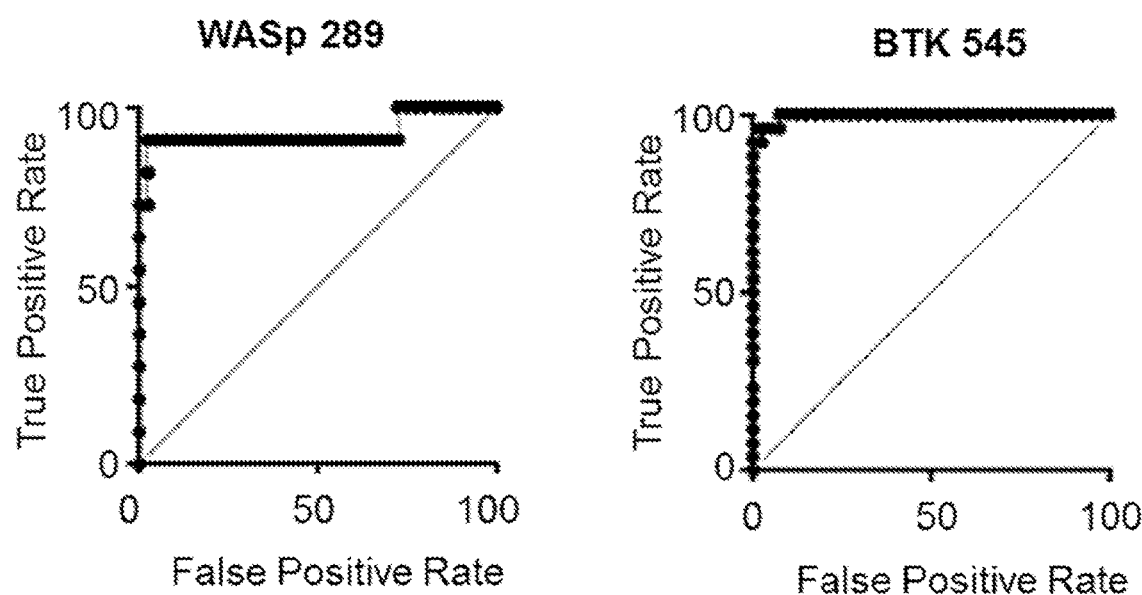
FIGS. 8A, 8B. Receiver operating characteristic (ROC) plots showing the diagnostic performance of immuno-SRM for PIDD.

Using these cutoffs, the specific PIDD diagnosis was predicted for each patient. Predicted diagnoses showed excellent agreement with clinical or genetic diagnoses as shown in FIG. 7. Every molecularly-confirmed case of WAS and BTK was also diagnosed by immuno-SRM analysis. Two patients, Patient 10 and 13, who were clinically diagnosed as agammaglobulinemia, had normal levels of BTK protein by immuno-SRM. Molecularly, no mutations in BTK were identified in these patients (Segundo et al. Front Immunol. Frontiers; 2018; 9: 289) Interestingly, patient 12 with agammaglobulinemia had low levels of BTK protein but no mutations were found in the coding regions of BTK. For each signature peptide utilized, area under the curve (AUC) analysis of the ROC plots reveal areas of 0.930 (for WASp 289) and 0.999 (BTK 545) with p-values <0.0001 (FIGS. 8A, 8B). Overall 97.6% of cases had concordance between the clinical diagnosis and the immuno-SRM assay results. Interesting outlier and discordant cases are discussed further below.

Signature peptide concentrations for NBS lab (newborns) samples are shown in FIG. 9. Each DBS sample had significant measured peptide concentrations above the previously set diagnostic cutoffs for PIDD, indicating unaffected status.

Immuno-SRM as a sensitive and specific proteomic screening method for the multiplex detection of patients with two life-threatening PIDD (i.e., WAS and XLA) from DBS has been demonstrated. The results clearly differentiate patients with PIDD from normal controls, with low levels of endogenous peptides of intracellular proteins WASp and BTK correlating with the target diseases (WAS and XLA, respectively). These diagnoses can be made in a single run with a runtime of 6.67 min per disease target. The disclosed results also demonstrate peptide stability in DBS, with minimal variability in concentrations after 72 hours of storage at room temperature (Table 5).

The immuno-SRM platform reliably detected endogenous peptide from normal control DBS in this highly multiplexed fashion. Normal control DBS (N=40) were unblinded and utilized to define the normal ranges and potential screen-positive cutoffs (FIG. 6). In clinical laboratories, reference ranges for diagnostic tests are determined by the normal distribution in the general population. Initial cutoffs for screening tests are typically conservative, aiming to detect all true positives without creating an excessively high screen positive rate relative to the incidence of disease (Table 6). However, these cutoffs are continually validated and adjusted in accordance with population-based studies. Given these parameters, the definition of screen-positive results were 1.75 and 2 standard deviation (SD) below the mean for the peptides in this example. The chosen cutoffs generated 1 false positive normal control, which screened as a WAS patient using WASP 289 (FIG. 6). In the case of NC4, rescreening showed WASp levels in the normal range. These preliminary cutoffs are not static and will become better defined as higher numbers of normal controls and patient samples are screened.

Using these cutoffs, every molecularly-confirmed WAS and BTK patient covering a broad range of mutations were positively identified (FIG. 7). As hypothesized, peptide concentrations are reduced in the majority of BTK and WAS cases, independent of genotype (Qasim et al. Br. J. Haematol. 2001; 113: 861-865; Jin et al. Blood. American Society of Hematology; 2004; 104: 4010-4019; Futatani et al. British Journal of Haematology. 2001; 114(1): 141-9). These peptides therefore provide biomarkers for diagnosis and screening.

ROC curves were constructed to assess the diagnostic ability of immuno-SRM analysis. These plots relate the true positive rate to the false positive rate with increasingly stringent cutoff values. As diagnostic cutoffs are lowered, the test will have greater ability to note true positives, but this process is also more likely to lead to false positives. A screening test maintaining a high true positive rate and a low false positive rate will therefore lead to graphs lying close to the y axis and a large AUC (FIGS. 8A, 8B). These values indicate high diagnostic accuracy for immuno-SRM analysis of signature peptides of PIDD.

QC monitoring of digestion and process performance is included in the current immuno-SRM multiplex in the form of ATP7B signature peptide measurements. As not all detected metabolites are helpful NBS targets, the calculation of metabolite ratios and secondary metabolite analysis are employed to improve the sensitivity and specificity of NBS for certain diseases, such as the C3:C2 ratio and 2-methylcitric acid analysis in methylmalonic aciduria (Lindner et al. J. Inherit. Metab. Dis. 2nd ed. 2008; 31: 379-385). In addition, target ratioing can account for variability between samples brought on by a number of factors including sample collection quality, storage, extraction and digestion efficiency, and blood characteristics (Razavi et al. Bioanalysis. Future Science Ltd London, UK; 2016; 8: 1597-1609). Here, ATP7B concentrations were found to be largely consistent across the screened samples (FIG. 6). Absent ATP7B could serve to flag improperly processed or handled specimens. As an initial experiment, each PIDD peptide was compared by ratio to the endogenous concentration of ATP7B in the same sample. The resulting predictions based on peptide concentrations showed complete agreement with the clinical diagnosis, demonstrating immuno-SRM and ATP7B ratioing is an effective and complementary tool for PIDD diagnosis (FIG. 10 and Table 7). These types of ratios have utility in clinical immuno-SRM screening, provided the chosen peptide is proven to be a ubiquitous and significantly invariant signal across a large cohort of samples.

TABLE 7

Cutoffs for Signature Peptides by the Ratios against ATP7B peptide using polyclonal antibodies that bind to BTK 545 and WASp 289

|  | BTK 545 ATP7B Ratio | WASp 289 ATP7B Ratio |
| --- | --- | --- |
| Average | 9.31 | 92.47 |
| SD | 4.62 | 48.79 |
| Cutoff | 1.23 | 24.16 |

It was notable that normal levels of BTK were found in two clinically defined agammaglobulinemic patients (sample #10 and #13) who lacked mutations in BTK by Sanger sequencing (FIG. 7). These patients therefore likely do not have XLA but may have other autosomal forms of agammaglobulinemia, although broader genetic testing was not performed. Another patient (sample #12) had diminished levels of BTK protein but no identifiable mutation in BTK. This suggests the mutation may have been missed during sequencing of the coding region and intron-exon junctions or the patient may harbor a BTK mutation affecting either the regulatory elements, Poly-adenylation signal, or intronic regions. These cases highlight the clinical utility of immuno-SRM.

Additionally, two samples were obtained from the same WAS patient pre- and post-bone marrow transplant (BMT) (samples #29 and 30 in FIG. 7, respectively). Pre-BMT, immuno-SRM analysis identified the patient as having WAS. Post-BMT, the patient was identified as normal. This case highlights the ability of immuno-SRM to follow the therapeutic course of BMT and confirm successful reconstitution of the immune system. A similar principle can be applied to patients with monogenetic disorders undergoing gene therapy.

Overall, the analysis demonstrates that the disclosed assay has a broad linear range and acceptable precision to determine the concentrations of target peptides in DBS (Table 5).

Randomly selected newborn samples provided by the NBS laboratory of Washington State were used to test the feasibility of utilizing immuno-SRM analysis in the context of NBS. Due to limited sample availability and to test the utility of signature peptide analysis from a smaller sample, the amount of DBS used was reduced from 1 whole spot to 5 or 6 3-mm punches. Peptides of interest were readily enriched and analyzed with minimal change to sample processing. The concentrations of signature peptides were all greater than the pre-defined cutoffs obtained from analysis of known normal controls (FIG. 9). These patients would therefore be designated as normal. The ability to robustly perform this analysis with a greatly reduced sample input makes immuno-SRM analysis more amenable to translation into NBS. This high-throughput multiplexed method may effectively decrease run time per disease, making it suitable for NBS where current automated methods have a typical run time of less than three minutes (Rashed et al. Clin. Chem. 1997; 43: 1129-1141; Khalid et al. J Med Screen. SAGE Publications, Sage UK: London, England; 2008; 15:112-117). The successful prediction of BTK patients using DBS shipped at ambient temperature via traditional post from Vietnam also highlights the potential utility for diagnostic testing in resource poor settings where collection and shipping of DBS is economical.

Figure 11A:
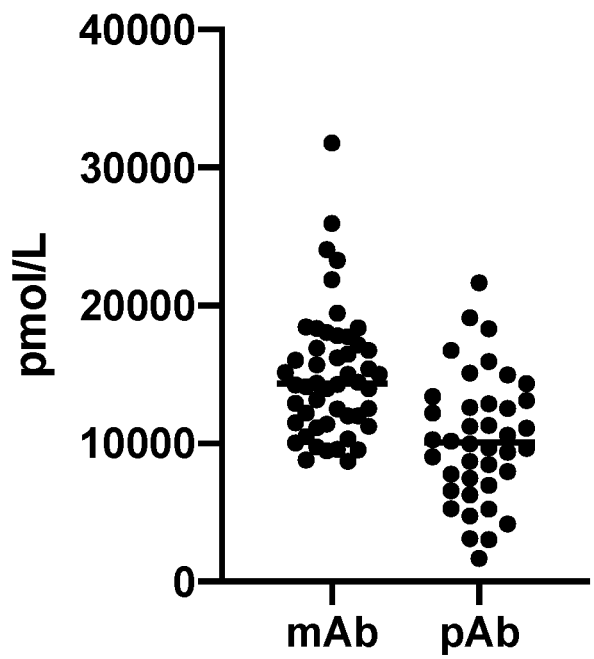
FIGS. 11A, 11B. Measured peptide differences between monoclonal antibodies (BTK 545, n=55; WASp 289, n=50) and polyclonal antibodies (n=40) in normal control dried blood spots.
Figure 11B:
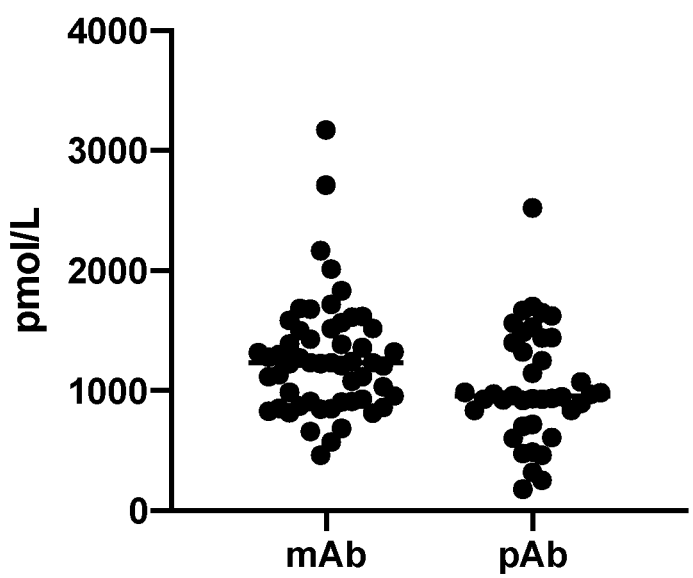

Example 2. This study describes results obtained from monoclonal antibodies described herein that bind to WASp 289 and BTK 545 signature peptides. Monoclonal antibodies are preferred to polyclonal antibodies for use in clinical, diagnostic, and newborn screening assays because of their reproducibility and consistency. Monoclonal antibodies perform equivalently to polyclonal antibodies in an immuno-SRM assay in their ability to enrich signature peptides from dried blood spots, generate normal control ranges, and differentiate patients from controls. Monoclonal and polyclonal antibodies for WASp 289 and BTK 545 were found to produce normal control ranges with equivalent standard deviations (FIGS. 11A, 11B, and Table 8). In these populations, average peptide concentrations were found to be moderately increased when using monoclonal antibody reagents. This is possibly due to the uniformity of the reagent relative to polyclonal antibodies, which may have greater non-specific binding or a reduced population of peptide binding epitopes.

TABLE 8

Normal control population average differences between monoclonal antibodies (BTK 545, n = 55; WASp 289, n = 50) and polyclonal antibodies (n = 40).

|  | Monoclonal (Average ± SD) | Polyclonal (Average ± SD) |
| --- | --- | --- |
| BTK 545 | 1267.8 ± 478.2 pmol/L | 1038.4 ± 465.8 pmol/L |
| WASp 289 | 14905.9 ± 4608.6 pmol/L | 10327.0 ± 4513.1 pmol/L |

Figure 12:
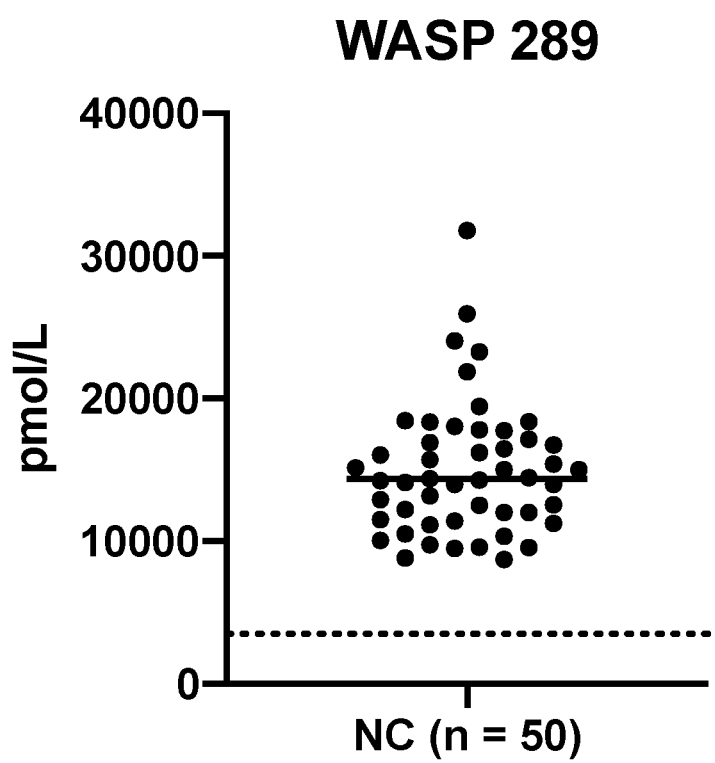
FIG. 12. Normal control (n=50) range for WASp 289 monoclonal antibody.

Using monoclonal anti-peptide antibodies for WASp 289, target peptides were enriched from normal control DBS. Target signature peptides were present in an average concentration of 14905.9±4608.6 pmol/L (FIG. 12).

Figure 13:
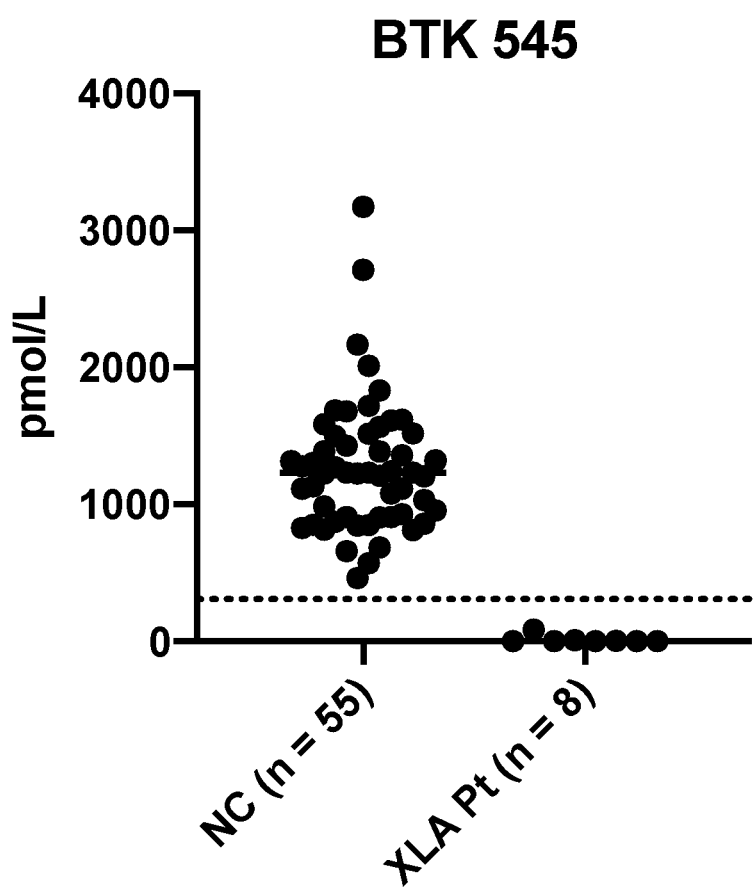
FIG. 13. Normal control (n=55) range for BTK 545 monoclonal antibody and BTK 545 values in XLA patients (n=8).

Using monoclonal anti-peptide antibodies for BTK 545, target peptides were enriched from normal control DBS. Target signature peptides were present in an average concentration of 1267.8±478.2 pmol/L. Utilizing this marker for analysis of XLA patients (n=8), it was found that every clinically confirmed case of XLA was diagnosed by immuno-SRM analysis of BTK 545 (FIG. 13 and Table 9).

TABLE 9

Immuno-SRM analysis of XLA patients using BTK 545.

| Pt | BTK 545 (pmol/L) | Immuno-SRM Diagnosis | Clinical Diagnosis | Mutation |
| --- | --- | --- | --- | --- |
| 1 | 6.2 | XLA | XLA | BTK c.1855C > G (p.P619A) |
| 2 | ND | XLA | XLA | N/A |
| 3 | ND | XLA | XLA | BTK c.1630A > G (p.R544G) |
| 5 | 84.9 | XLA | XLA | BTK c.1573C > G (p.R525G) |
| 7 | ND | XLA | XLA | BTK c.1940T > C (p.L647P) |
| 8 | 8.2 | XLA | XLA | BTK c. 1587_1589delA (p.N530Tfs26*) |
| 9 | ND | XLA | XLA | BTK c. 1587_1589delA (p.N530Tfs26*) |
| 10 | ND | XLA | XLA | BTK c.1940T > C (p.L647P) |

ND = Not detected.

The amino acid change in patient 3, p.R544G, eliminates the tryptic cleavage site directly before the BTK 545 biomarker peptide. This change blocks BTK 545 peptide release by trypsin digestion and similarly causes an absence of the wild type endogenous BTK 545 due to the molecular weight difference of the additional amino acids. Signature peptides which contain sites of mutations are not detectable by MS due to the mass shift associated with an amino acid change. This causes a change in the total peptide mass which renders the mutated peptide undetectable in the mass spectrometer and leads to an absent wild-type biomarker signal.

Therefore, BTK 545 levels are not detectable in patient 3. Thus, cases that may be missed by the previously described signature peptide BTK 407 (PCT/US2019/054856) can potentially be identified using BTK 545 because BTK 545 includes the site of the point mutation in patient 3. This shows that using multiple signature peptides can increase the likelihood of patient identification, particularly if there are known mutations which would cause a false negative by immuno-SRM.

Based on monoclonal antibody analysis, WASp 289 cutoffs were set at 3384.4 pmol/L (−2.5 SD) and BTK 545 cutoffs were set at 311.4 pmol/L (−2 SD) (Table 10).

TABLE 10

Normal control ranges, standard deviations, and cutoffs for BTK 545 and WASp 289 using monoclonal antibodies.

| | Average ± SD | Cutoff (pmol/L) | Cutoff (SD) |
|---|---|---|---|
| BTK 545 | 1267.8 ± 478.2 | 311.4 | −2 SD |
| WASp 289 | 14905.9 ± 4608.6 | 3384.4 | −2.5 SD |

NBS has been one of the most successful public health initiatives in modern times but relies on the detection of accumulated metabolites due to downstream enzyme deficiency. However, many genetic disorders including PIDD are characterized by absent or decreased proteins, limiting the scope of current NBS methods (Qasim et al. Br. J. Haematol. 2001; 113: 861-865; Jin et al. Blood. American Society of Hematology; 2004; 104: 4010-4019). By being able to detect PIDD-related peptides from DBS, immuno-SRM bridges this gap in current coverage, allowing for the expansion of NBS to treatable diseases currently without metabolite biomarkers. Immuno-SRM would rapidly provide quantified evidence of protein deficiency and could be performed simultaneously with initial screening and molecular analysis from DBS without further invasive procedures. Quantification of these signature peptides lays the foundation for immuno-SRM as a highly multiplexable screening and diagnostic tool for various congenital diseases.

Prophetic Example 1. Immuno-SRM assay of WASp and/or BTK signature peptide for diagnosis of Wiskott-Aldrich Syndrome (WAS) and X-linked agammaglobulinemia (XLA). DBS (as described above), buccal swab samples, peripheral blood mononuclear cells (PBMCs), or white blood cells (WBCs) from patients with WAS or XLA or from patients suspected of having WAS or XLA, along with the corresponding samples from normal controls, will be analyzed by immuno-SRM using signature peptides WASp 289, BTK 545, or a combination thereof, and their associated monoclonal antibodies as described in Example 2 and elsewhere herein.

Buccal Swab Samples. The controlling institutional review board will approve the protocol for buccal swab samples and all subjects will give written informed consent. Normal control buccal swab samples will be obtained from commercial vendors. All buccal swab samples will be stored in the lab at −20° C. or −80° C. Blind samples will be labeled with an ID provided by the sender and identified and consented patient samples will be given a lab ID upon receipt. Nylon Flocked Dry Swabs in Peel Pouches, Copan Diagnostics 502CS01 will be obtained from Fisher Scientific (Chicago, IL; Cat no. 23-600-951). 2-mL Cryogenic Storage Vials Internal Thread will be obtained from Fisher Scientific (Chicago, IL; Cat no. 12-567-501). Buccal swab sample collection can follow protocols described in: CHLA. (2016, April 4). Buccal Swab Collection Procedure. CHLA-Clinical Pathology; (2016, July 27). Buccal DNA Collection Instructions. Pathway Genomics; (2017, Dec. 14). Instruction for Buccal Swab Sample Collection. Otogenetics; PDXL PDXL. (2017, Nov. 28). *Buccal Swab collection procedure—PersonalizedDx Labs* [Video]. YouTube. On World Wide Web at youtube/3ftvHkfM71o?t=146; and Centers of Disease Control and Prevention (CDC). (2020, July 8). Interim Guidelines for collecting, handling, and testing clinical specimens for Covid-19. On World Wide Web at cdc.gov/coronavirus/2019-ncov/lab/guidelines-clinical-specimens.html. The tip of a buccal swab containing cells can be clipped into a tube for solubilization and digestion as described above for DBS.

Peripheral Blood Mononuclear Cells (PBMCs) and White Blood Cells (WBCs). PBMCs and WBCs will be collected by protocols known in the art, such as ones described in Kerfoot et al., Proteomics Clin Appl, 2012. 6(7-8):394-402; Grievink et al. (2016) Biopreserv Biobank 14(5):410-415; Corkum et al. (2015) BMC Immunol. 16:48; and Jia et al. (2018) Biopreserv Biobank 16(2):82-91; and Zhou et al. (2012) Clinical and Vaccine Immunology 19(7):1065-1074.

The isolated PBMCs or WBCs can be solubilized and proteins from the cells digested as described above for DBS.

The immuno-SRM diagnoses will be compared to clinical diagnoses. If available, genetic information for the WAS and/or BTK genes and treatment information will be obtained for each patient. The immuno-SRM assay can be multiplexed with other signature peptides for other diseases. These studies will show that immuno-SRM assays utilizing the monoclonal antibodies described herein can be used to detect the disclosed WASp and/or BTK signature peptides in a biological sample including DBS, buccal swab samples, PBMCs, or WBCs and to diagnose whether subjects have WAS and/or XLA based on the detected levels of the signature peptides.

(xi) Closing paragraphs. The precise amino acid sequence boundaries of a given CDR or FR can be readily determined using any of a number of well-known schemes, including those described by: Kabat et al. (1991) "Sequences of Proteins of Immunological Interest," 5th Ed. Public Health Service, National Institutes of Health, Bethesda, Md. (Kabat numbering scheme); AI-Lazikani et al. (1997) J Mol Biol 273: 927-948 (Chothia numbering scheme); Maccallum et al. (1996) J Mol Biol 262: 732-745 (Contact numbering scheme); Martin et al. (1989) Proc. Natl. Acad. Sci., 86: 9268-9272 (AbM numbering scheme); Lefranc M P et al. (2003) Dev Comp Immunol 27(1): 55-77 (IMGT numbering scheme); and Honegger and Pluckthun (2001) J Mol Biol 309(3): 657-670 ("Aho" numbering scheme). The boundaries of a given CDR or FR may vary depending on the scheme used for identification. For example, the Kabat scheme is based on structural alignments, while the Chothia scheme is based on structural information. Numbering for both the Kabat and Chothia schemes is based upon the most common antibody region sequence lengths, with insertions accommodated by insertion letters, for example, "30a," and deletions appearing in some antibodies. The two schemes place certain insertions and deletions ("indels") at different positions, resulting in differential numbering. The Contact scheme is based on analysis of complex crystal structures and is similar in many respects to the Chothia numbering scheme. In particular embodiments, the antibody CDR sequences disclosed herein are according to Kabat numbering.

The nucleic acid and amino acid sequences provided herein are shown using letter abbreviations for nucleotide bases and amino acid residues, as defined in 37 C.F.R. § 1.822 and set forth in the tables in WIPO Standard ST.25 (1998), Appendix 2, Tables 1 and 3. Only one strand of each nucleic acid sequence is shown, but the complementary strand is understood as included in embodiments where it would be appropriate.

To the extent not explicitly provided herein, coding sequences for proteins disclosed herein and protein sequences for coding sequences disclosed herein can be readily derived from one of ordinary skill in the art.

Each embodiment disclosed herein can comprise, consist essentially of or consist of its particular stated element, step, ingredient or component. Thus, the terms "include" or "including" should be interpreted to recite: "comprise, consist of, or consist essentially of." The transition term "comprise" or "comprises" means has, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment. A material effect would cause a statistically significant reduction in the ability of an antibody or antigen binding fragment disclosed herein to bind to its cognate peptide biomarker.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; 19% of the stated value; ±18% of the stated value; 17% of the stated value; 16% of the stated value; ±15% of the stated value; 14% of the stated value; ±13% of the stated value; 12% of the stated value; 11% of the stated value; 10% of the stated value; 9% of the stated value; 8% of the stated value; 7% of the stated value; ±6% of the stated value; 5% of the stated value; 4% of the stated value; ±3% of the stated value; 2% of the stated value; or +1% of the stated value.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context.

Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents, printed publications, journal articles and other written text throughout this specification (referenced materials herein). Each of the referenced materials are individually incorporated herein by reference in their entirety for their referenced teaching.

It is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

Definitions and explanations used in the present disclosure are meant and intended to be controlling in any future construction unless clearly and unambiguously modified in the examples or when application of the meaning renders any construction meaningless or essentially meaningless. In cases where the construction of the term would render it meaningless or essentially meaningless, the definition should be taken from Webster's Dictionary, 3rd Edition or a dictionary known to those of ordinary skill in the art, such as the Oxford Dictionary of Biochemistry and Molecular Biology (Eds. Attwood T et al., Oxford University Press, Oxford, 2006).

The invention claimed is:

1. An antibody or antigen binding fragment thereof that binds to Wiskott-Aldrich Syndrome protein (WASp) 289 signature peptide for Wiskott-Aldrich Syndrome (WAS) of SEQ ID NO: 1 or Bruton's Tyrosine Kinase (BTK) 545 signature peptide for X-linked agammaglobulinemia (XLA) of SEQ ID NO: 2, the antibody or antigen binding fragment comprising:

(A) a heavy chain variable (VH) domain comprising a CDRH1 having the sequence of SEQ ID NO: 3, a CDRH2 having the sequence of SEQ ID NO: 4, and a CDRH3 having the sequence of SEQ ID NO: 5, and a light chain variable (VL) domain comprising: a CDRL1 having the sequence of SEQ ID NO: 6, a CDRL2 having the sequence of SEQ ID NO: 7, and a CDRL3 having the sequence of SEQ ID NO: 8 or (B) a VH domain comprising a CDRH1 having the sequence SEQ ID NO: 9, a CDRH2 having the sequence of SEQ ID NO: 10, and a CDRH3 having the sequence of SEQ ID NO: 11, and a VL domain comprising: a CDRL1 having the sequence of SEQ ID NO: 12, a CDRL2 having the sequence of SEQ ID NO: 13, and a CDRL3 having the sequence of SEQ ID NO: 14.

2. The antibody or antigen binding fragment thereof of claim 1(A), comprising one or more of: a VH domain having the sequence of SEQ ID NO: 15; a heavy chain having the sequence of SEQ ID NO: 17; a VL domain having the sequence of SEQ ID NO: 16; or a light chain having the sequence of SEQ ID NO: 18.

3. The antibody or antigen binding fragment thereof of claim 2, wherein the VH domain has the sequence of SEQ ID NO: 15 and the VL domain has the sequence of SEQ ID NO: 16.

4. The antibody or antigen binding fragment thereof of claim 2, wherein the heavy chain has the sequence of SEQ ID NO: 17 and the light chain has the sequence of SEQ ID NO: 18.

5. The antibody or antigen binding fragment thereof of claim 1(B), comprising one or more of: a VH domain having the sequence of SEQ ID NO: 23; a heavy chain having the sequence of SEQ ID NO: 25; a VL domain having the sequence of SEQ ID NO: 24; or a light chain having the sequence of SEQ ID NO: 26.

6. The antibody or antigen binding fragment thereof of claim 5, wherein the VH domain has the sequence of SEQ ID NO: 23 and the VL domain has the sequence of SEQ ID NO: 24.

7. The antibody or antigen binding fragment thereof of claim 5, wherein the heavy chain has the sequence of SEQ ID NO: 25 and the light chain has the sequence of SEQ ID NO: 26.

8. A method of determining a concentration of WASp 289 signature peptide of WAS of SEQ ID NO: 1 or BTK 545 signature peptide of XLA of SEQ ID NO: 2 in a subject, comprising:
obtaining a biological sample derived from the subject;
digesting proteins from the biological sample with an enzyme to yield one or more peptides;
enriching for:
a WASp signature peptide with the antibody or antigen-binding fragment thereof of claim 1(A); and/or
a BTK signature peptide with the antibody or antigen-binding fragment thereof of claim 1(B); and
performing liquid chromatography-multiple reaction monitoring mass spectrometry (LC-MRM-MS) on the enriched peptides to determine a concentration of each signature peptide.

9. The method of claim 8, wherein the biological sample is a dried blood spot (DBS), a buccal swab, peripheral blood mononuclear cells (PBMCs), or white blood cells (WBCs).

10. The method of claim 8, wherein the enzyme is trypsin.

11. The method of claim 8, further comprising:
comparing the concentration of each signature peptide to that of a corresponding predetermined threshold concentration; and
diagnosing the subject with:
WAS when the concentration of the WASp signature peptide is lower than the corresponding predetermined threshold concentration or when the WASp signature peptide is absent; and
XLA when the concentration of the BTK signature peptide is lower than the corresponding predetermined threshold concentration or when the BTK signature peptide is absent.

12. The method of claim 11, wherein the method is performed as part of a newborn screening (NBS) that additionally screens the subject for one or more of phenylketonuria, primary congenital hypothyroidism, cystic fibrosis, and sickle cell disease.

13. The method of claim 11, wherein the method is performed in the absence of clinical symptoms of WAS and/or XLA in the subject.

14. The method of claim 11, wherein the corresponding predetermined threshold concentration for each signature peptide is calculated from a standard deviation of the mean concentration of each signature peptide in corresponding biological samples from a population of normal control subjects.

15. The method of claim 14, wherein the biological sample is DBS and the mean concentration of the WASp signature peptide in DBS from a population of normal control subjects comprises a concentration in a range of 7000 pmol/L to 30000 pmol/L.

16. The method of claim 14, wherein the biological sample is DBS and the mean concentration of the BTK signature in DBS from a population of normal control subjects comprises a concentration in a range of 400 pmol/L to 2000 pmol/L.

17. An assay for the screening of Wiskott-Aldrich Syndrome (WAS) and/or X-linked agammaglobulinemia (XLA) in a subject assay comprising:
(i) an antibody or antigen binding fragment thereof of claim 1 and
(ii) reference signature peptides comprising:
a WASp signature peptide for WAS of SEQ ID NO: 1; and/or
a BTK signature peptide for XLA of SEQ ID NO: 2.

18. The assay of claim 17, wherein the reference signature peptides are isotopically labeled.

19. The assay of claim 17, wherein the antibodies or antigen binding fragments thereof are attached to magnetic beads.

20. A kit comprising the assay of claim 17 and one or more additional components selected from filter paper cards, buccal swabs, blood collection tubes, a punch tool, digestion enzymes, digestion buffers, solid supports for the antibodies or antigen-binding fragments thereof, and elution buffers.

* * * * *